United States Patent [19]
Leberl et al.

[11] Patent Number: 6,122,078
[45] Date of Patent: Sep. 19, 2000

[54] SELF CALIBRATING SCANNER WITH SINGLE OR MULTIPLE DETECTOR ARRAYS AND SINGLE OR MULTIPLE OPTICAL SYSTEMS

[75] Inventors: Franz W. Leberl; Christian Jorde; Michael Gruber, all of Graz, Austria

[73] Assignee: Vexcel Imaging GmbH, Austria

[21] Appl. No.: 08/518,920

[22] Filed: Aug. 24, 1995

[51] Int. Cl.[7] .................................................. H04N 1/04
[52] U.S. Cl. ...................... 358/474; 358/487; 358/488; 358/494; 358/497; 356/400; 250/208.1
[58] Field of Search ................................ 358/402, 474, 358/406, 424, 483, 487, 489, 494, 497, 409, 412, 413, 473; 382/315, 318, 287; 348/145, 135, 136; 250/548, 208.1; 356/400, 401

[56] References Cited

U.S. PATENT DOCUMENTS

| | | | |
|---|---|---|---|
| 4,731,668 | 3/1988 | Satomura et al. | 358/409 |
| 4,742,559 | 5/1988 | Fujiwara et al. | 358/473 |
| 4,829,373 | 5/1989 | Leberl et al. | 348/139 |
| 4,928,169 | 5/1990 | Leberl et al. | 382/112 |
| 4,984,287 | 1/1991 | Massoudi | 358/473 |
| 5,532,845 | 7/1996 | Gusmano | 358/497 |

FOREIGN PATENT DOCUMENTS

4211550  6/1992  Germany.

Primary Examiner—Edward L. Coles, Sr.
Assistant Examiner—Mark Wallerson

[57] ABSTRACT

A system for scanning and digitizing large images using a reseau for accuracy without obscuring the image to be scanned. The system uses two separate CCD photoreceptor arrays which are fixed in a rigid position with respect to each other and any accompany lenses and mirrors. In one embodiment, a first CCD photoreceptor array is used to scan the image while the second CCD photoreceptor array simultaneously scans the reseau. In a second embodiment, a single CCD photoreceptor array is used to first scan the reseau and then to scan the image. One illumination source illuminates the reseau while second illumination source illuminates the image. The arrangement of the lens(es) and the photoreceptor arrays allows the determination of any displacement of the scanner along the X-axis, Y-axis, and Z-axis, as well as the determination of any rotation of the scanner around the X-axis, Y-axis, or Z-axis. The position and attitude of the scanner, as determined by scanning the reseau, is used to correct any errors in the resulting image that are caused by displacement or rotation of the scanner. A large image can be scanned in separate but overlapping swaths, the overlap being used to align the swaths to create a final seamless digital image from the assembled swaths.

32 Claims, 26 Drawing Sheets

SELF CALIBRATING SCANNER WITH SINGLE OR MULTIPLE DETECTOR ARRAYS AND SINGLE OR MULTIPLE OPTICAL SYSTEMS

BACKGROUND OF THE INVENTION

1. Field of the Invention

This invention relates to image scaning devices, particularly to image scanning for purposes of digitizing large visual images with multiple passes of a small scanner that digitizes adjacent portions of the image in sequential passes for storage in a computer memory or other data storage system and using a calibration device, e.g., a reseau, to position and align the adjacent portions of the scanned images accurately. Such devices include photogrammetric apparatus and prepress systems.

2. Description of the Prior Art

With the advent of digital computers, it has been found desirable to store complex object images, such as maps, photographs, documents, and the like as digital signals for storage in memory and on data recording media. Thereafter, the images can be retrieved from the memory or data recording media for reproduction, enhancement, scaling, displaying, or other processing. Scanning and recognition of text can be accomplished with relatively coarse mechanical position to pixel image registration. However, digitizing aerial photographs, radar images, and maps, for example, requires great precision and detail, especially because the stored digital object images can be processed by computers to produce scaled-up portions or enhanced sections to clarify or display detailed features. Similarly, great precision and detail can be required in graphic arts and color separation.

Scanning also has industrial applications, such as automated manufacturing where parts are scanned to verify conformity of the parts to the specifications for their manufacture. Accurate measurement and locations of holes on parts, for example, are an important application. It is also desirable to scan objects in segments and then merge the resulting images of the adjacent segments into composite images of the whole objects, which requires great precision and detail so as to avoid the appearance of "seams" or "splices" at intersections of adjacent images.

The use of reseaus, i.e., networks of fine lines or other reference marks on a sheet of glass, plastic film, or other material, to provide reference marks or points for scanned features has been adapted to such applications. In aerial photography, a reseau has been used within a camera to produce reference points on the photograph itself. Several problems are associated with such an approach and are discussed in U.S. Pat. No. 4,149,788.

A prior art preferred method of impressing a reseau on an object image to be scanned is to overlay the object, such as a photograph or transparency that contains the image to be scanned, with the reseau so as to superimpose the reseau marks on the object image. In very fine, detailed work, however, the reseau marks can obscure or cover some details in the object image that are desired to be scanned and digitized. To address that problem, U.S. Pat. No. 4,928,169, which is incorporated herein by reference, discloses an apparatus for scanning object images where the reseau is positioned directly atop the object image to be scanned. The reseau marks can be illuminated to make them visible and then scanned, digitized, and their positions stored in computer memory. Then, the reseau illumination is turned off to make the reseau marks invisible and, in turn, illuminating, scanning, digitizing, and storing the object image. However, that apparatus was never really able to make the reseau totally invisible. Therefore, there was still some distortion of gray values and obscuring of some detail of the object image by the reseau marks, especially when digitizing at very high geometric resolutions, e.g., less than ten to twenty micrometers, and gray value precisions, e.g., to twelve binary digits.

Another additional problem common to some prior art scanning methods including the method disclosed in U.S. Pat. No. 4,928,169, is that they use square arrays of photoreceptor elements to scan the object images. With such a square photoreceptor array, the array must first be positioned over the area of the object image being scanned. All movement of the square array must then stop while that area of the object image is captured or "grabbed" and digitized. After the digitizing is completed for a particular area, the square array is repositioned so that it digitizes a new area of the object image, and it stops again while that new area of the object image is digitized. This method, referred to in the imaging and scanning arts as "stop and stare," is repeated until the entire object image is scanned or digitized. The "stop and stare" method requires a speed control capability to initiate and terminate movement of the photoreceptor array, which necessarily involves repeated accelerating and decelerating the moving photoreceptor array. This requirement increases the complexity of the device and increases probability of errors due to mechanical limitations inherent in such speed controls and in the motor and drive assemblies that position the photoreceptor arrays. Furthermore, square photoreceptors used with the "stop and stare" method generate an electrical signal for every photoreceptor element in the array. Square photoreceptor arrays that have 500 photoreceptor elements in each of 500 rows would, therefore, create 250,000 electrical signals simultaneously during each "stop and stare" step of the object image scanned. In turn, complex methods are needed to process (amplify, filter, digitize, and store) all of the signals simultaneously before the square photoreceptor array can be repositioned to digitize another part of the object image.

SUMMARY OF THE INVENTION

Accordingly, it is a general object of the present invention to provide a system for image scanning and digitizing using a reseau for accuracy, but without obscuring the image to be scanned.

A more specific object of this invention is to provide an image scanner and digitizer that uses a reseau for accuracy, while eliminating reseau marks from the object image and their effects of distorting the scanned object image.

Another object of the present invention is to provide a high speed, yet highly accurate image scanner and digitizer that can scan and digitize large area object images at lower cost than would otherwise be possible if the photoreceptor must be positioned by a mechanically precise mechanism.

Another object of the present invention is to provide a highly accurate image scanner using linear photoreceptor arrays without a need to position the linear photoreceptor arrays very precisely.

Additional objects, advantages, and novel features of the invention shall be set forth in part in the description that follows, and in part will become apparent to those skilled in this art upon examination of the following or may be learned by the practice of the invention. The objects and the advantages may be realized and attained by means of the instrumentalities and in combinations particularly pointed out in the appended claims.

In accordance with the invention, two photoreceptor arrays are provided with optics systems for scanning—one array scanning the object image and the other array scanning a reseau which is placed outside the imaging view of the object image scanner. The reseau marks are not detected by the object image scanner and the object image is not detected by the reseau scanner. The reseau marks are used to determine the scanner's position (X, Y, Z) and attitude (tip $\psi$, roll $\omega$, yaw $\alpha$) accurately and precisely and to correct errors in the scanner's movements.

BRIEF DESCRIPTION OF THE DRAWINGS

The accompanying drawings, which are incorporated in and form a part of the specifications, illustrate the preferred embodiments of the present invention, and together with the descriptions serve to explain the principles of the invention.

In the Drawings.

DETAILED DESCRIPTION OF THE PREFERRED EMBODIMENTS

For purposes of explanation, object images as they relate to this invention can include visual images of objects, such as aerial, medical, or other photographs, radar images of earth's surface, geographical terrain or objects in the terrain, maps, documents, graphic art work or any other graphics or pictures that are to be digitized and stored in an electronic memory or other data storage system for later recall, display, or manipulation. An object image may also be a three-dimensional object, such as a manufactured part, but only two-dimensional scanning is performed.

Figure 1:
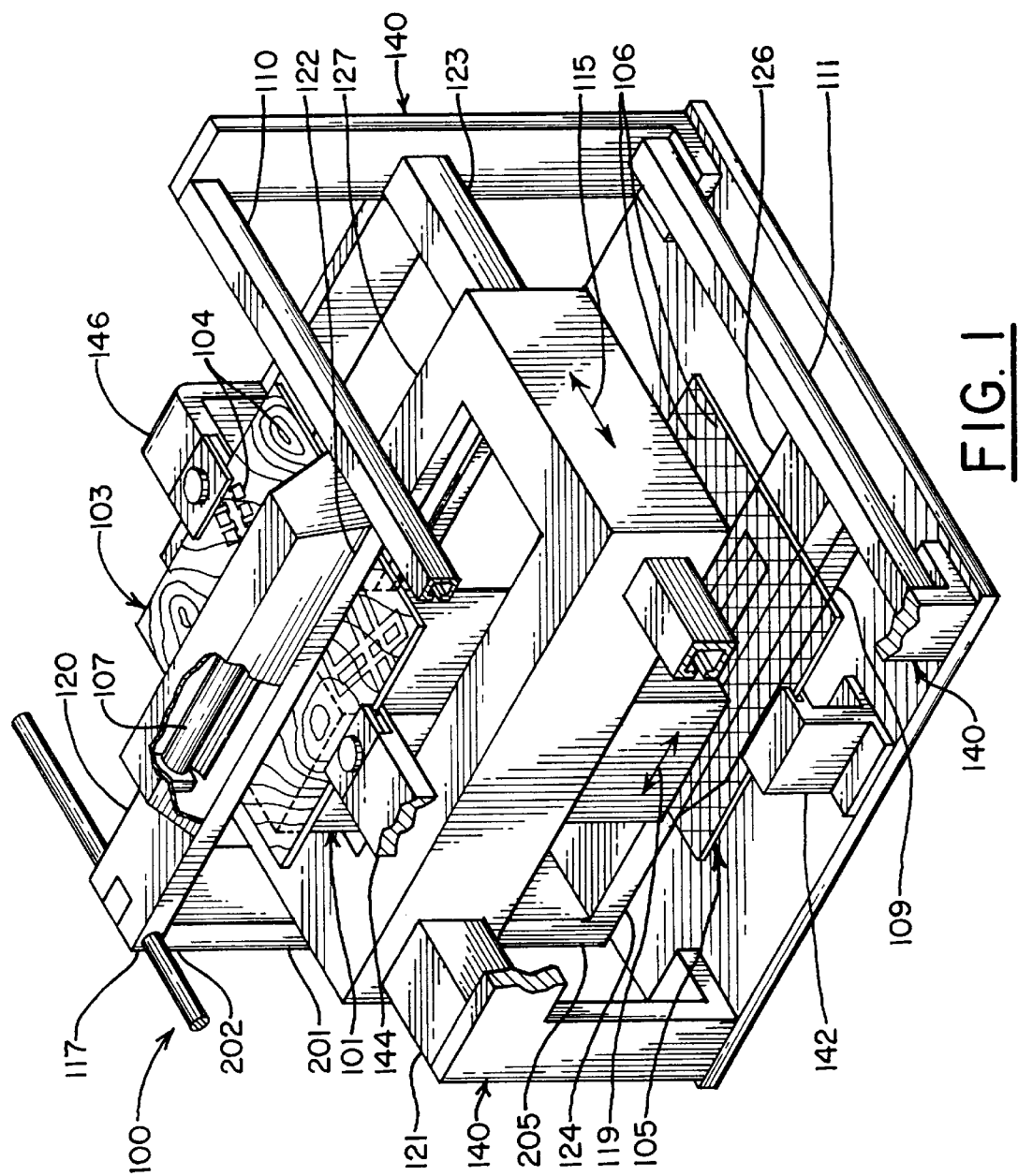
FIG. 1 is an isometric representation of the essential mechanisms of a scanner according to the invention including an object with an image to be scanned mounted in fixed spatial relation to a reseau.

A scanning apparatus 100 according to this invention, as illustrated in FIG. 1, scans an image 104 on an illuminated object 103 with an array of photosensor devices (not shown in FIG. 1, but contained in the movable scan head 101) that are focused by optics (also not shown in FIG. 1, but contained in the movable scan head 101) on the object image 104. It also has optics that scan a reseau 105, which reseau is outside the field of scan of the scanning optics for the object image 104, as will be described in more detail below. The separate optics for scanning the reseau 105, which is spatially separated from the object 103, avoids any obstruction of the object image 104 by the reseau marks 106 on the reseau 105.

Figure 2:
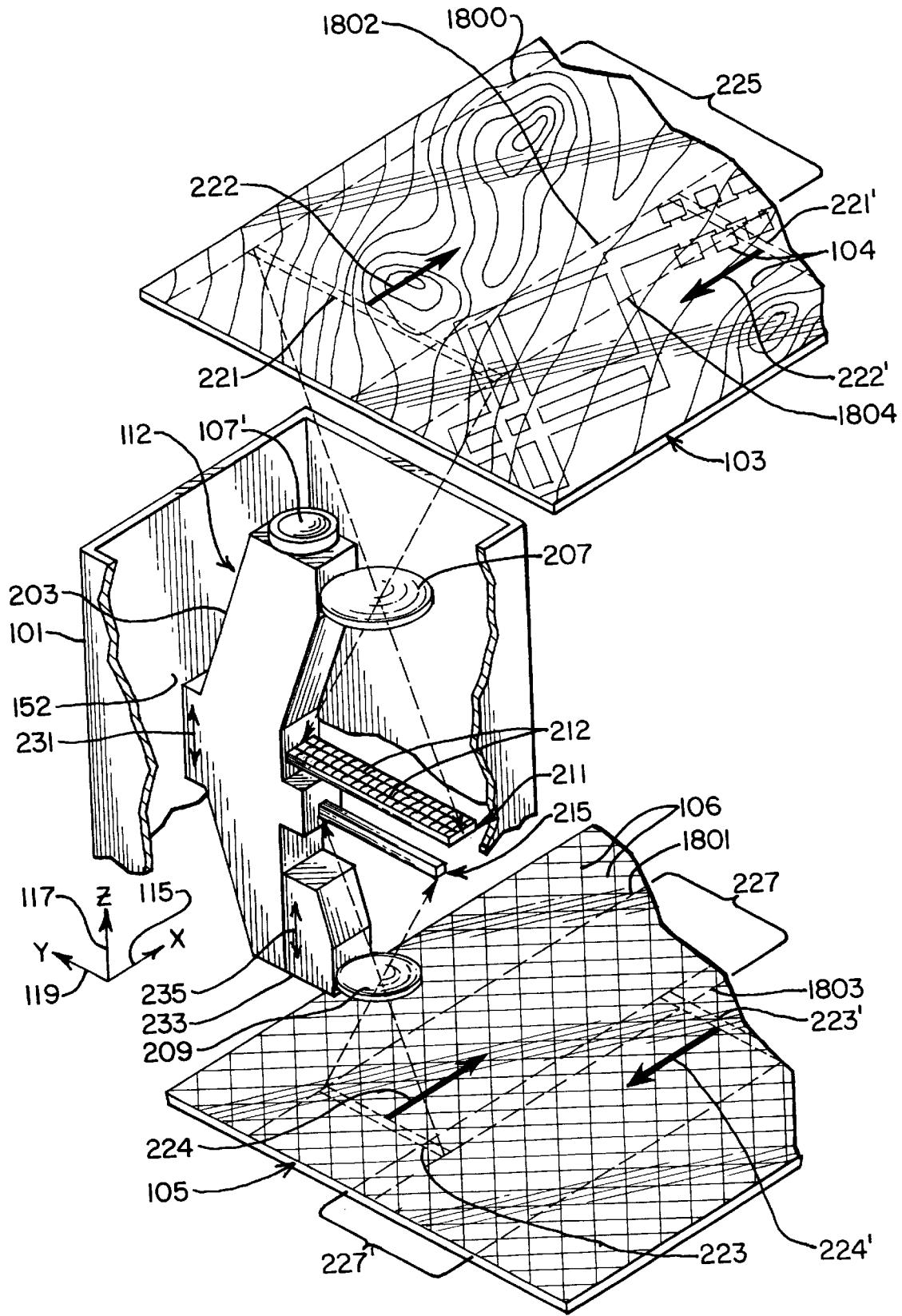
FIG. 2 is a cutaway illustration showing the relationship of the movable structure comprising the scanning array and optics and the fixed structure of the object to be scanned and the reseau in spatially separated relation to each other.

The scanner 112 used with this invention, which can be contained in movable scan head 101 of FIG. 1, is best seen in FIG. 2. In this embodiment, the scanner comprises two arrangements of linear photoreceptor arrays 211, 215. The photoreceptor array 211, which is oriented toward the object 103, may comprise m rows of n photoreceptor elements 212 (m×n), which photoreceptor elements 212 are individual photoreceptors, such as photosensitive charge-coupled devices (CCDs), photodiodes, or any type of light-sensitive device for producing an electrical signal in proportion to light incident thereon. The photoreceptor array 211 is an m×n array of photoreceptor elements 212 with m equal to one (1) for black and white object images or three (3) or more for color (or enhanced black and white by averaging the three or more values) and n arbitrarily large, typically 100, 1000, 2000, 4000, 5000, 6000, or 8000 elements. The photoreceptor elements 212 of photoreceptor array 215 cannot be seen in FIG. 2, because they are exposed downwardly toward the reseau 105. Since photoreceptor array 215 only detects the reseau marks 106 on the reseau 105, a single row of photoreceptor elements 212 is sufficient. Consequently, the photoreceptor array 215, m is equal to one. Also, the number n of individual photoreceptor elements 212 in photoreceptor array 215 can be, but does not have to be, the same as the number n of individual photoreceptor elements 212 in photoreceptor array 211. The linear photoreceptor array 215 is illustrated in FIG. 2 as being shorter than the linear photoreceptor array 211, thus having fewer photoreceptor elements 212 than linear photoreceptor array 211. The operative goal is to have the linear photoreceptor array 215 long enough to detect and image a sufficient portion of reseau 105 to provide reseau mark 106 locations that are recognizable as specific locations in relation to the system frame and mechanical mensuration components. In other words, when the mechanical system positions the linear array in a specific position, the linear array has to detect enough reseau marks 106 known to be in that position to verify and correct for any inaccuracies or variations in the mechanical positioning components.

Large object images 104 can be scanned by moving the scanner 112 over the object images 104 along adjacent paths or "swaths". For example, an i×j pixel object image 104 can be scanned by moving the scanner 112 over the object image 104 in contiguous parallel swaths. Each swath detects i×n pixels until j÷n' swaths are scanned, where n' is somewhat smaller than n to allow for overlaps between adjacent swaths. The position of the scan head 101 of the scanner 112 for each scan of i×n pixels is a scan line. Therefore, there are j÷i scan lines for each swath.

The details of a mensuration apparatus for moving and controlling a photoreceptor array scanning in three mutually orthogonal X, Y, and Z directions for scanning an object image is shown and described in U.S. Pat. No. 4,928,169, which is incorporated herein by reference. Even though the scanning in that patent disclosure was done with a rectangular array of photoreceptors, which "grabbed" adjacent rectangular frames of the object image, rather than using a linear array to sweep contiguous swaths of the object image, construction of scanner drive mechanisms, object mounting structures, and illumination to implement this invention can be accomplished by the apparatus and components of U.S. Pat. No. 4,928,169 with perhaps some modifications that will be clear to persons of ordinary skill in this art in the light of the description of this invention. Therefore, further details of the structures and components of such drive mechanisms, mounting structures, and illumination are not needed here for purposes of understanding the principles and components of this invention.

Detection of pixels is also shown in detail in U.S. Pat. No. 4,928,169. The pixels are stored, for example, in raster mapped memories. In the system described in that patent, each pixel of an image, represented by one or more binary digits depending on the gray scale or color resolution, is stored in a memory which can be visualized as a rectangular or square array of storage cells, each individually addressable. If an object image 216×280 square millimeters (8½×11 square inches) is to be scanned to an accuracy of five micrometers per pixel, then 2.42 billion storage locations would be required. Data compression techniques are known in the art to reduce the storage requirements, but for purposes of explanation, it is considered that the requisite amount of memory is available.

Since each pixel on the object image 104 being scanned and digitized has a corresponding location in the memory, the scanner measures the pixel's gray or color value and, according to the scanner location, the address of each pixel is calculated for storing pixels in the proper location.

Scanning along several paths and misalignment of the scanning head may cause some overlapping of scan swaths, so that some pixels near an edge of the swath might be included in more than one scan swath. The raster map type of storage of the pixels, however, will correct for any overlap, because any pixel that is scanned more than once by different swaths will, after the positional errors are corrected, be stored in the proper memory location, viz., in the same location at which it was stored by virtue of being scanned by a previous swath. The reseau marks 106 are used to make the corrections for these positional errors, as will be explained in more detail below. Suffice it to say at this point that a raster sweep or swath of the image photoreceptor array 211 to detect and digitize a corresponding series of scan lines 221 of the object image 104 moving in the X-axis 115 direction, as indicated by arrow 222 in FIG. 2, is accompanied by a complementary raster sweep or swath of the reseau photoreceptor array 215 to detect and digitize reseau marks 106, which are positioned in fixed spatial relation to the object 103. The swath 225 is contained within the dashed lines 1800, 1804 shown in FIGS. 2, 18, and 20. Therefore, as the swath 225 containing the scan line 221 is collected in the path indicated by arrow 222, the complementary swath 227 containing the scan line 223 corresponding to photoreceptor array 215 sweeps a raster path indicated by arrow 224 as it detects the positions of the reseau marks 106 in that swath 227. The swath 227 is contained within the dashed lines 1801, 1803 shown in FIG. 2. After completing the swath 225, the scanner 112 moves laterally in the Y-axis 119 direction before making a return swath 225' in the opposite direction, collecting image information as indicated by the scan line 221' moving as indicated by arrow 222', while also collecting complementary reseau mark positions as indicated by the scan line 223' moving as indicated by arrow 224' to create the swath 227'. Specific spatial relations of the reseau marks 106 to each other and to the optical head frame 203 can be used to properly and accurately align pixels detected in the swath 225' containing the scan line 221' in relation to corresponding pixels of the object image 104 detected in the swath 225 containing the scan line 221.

Referring now to the scanning apparatus 100 in FIG. 1, a movable scan head 101 supports and encloses a scanner 112, as shown in FIG. 2. An object 103 containing an object image 104 to be scanned is shown in FIGS. 1 and 2 positioned above the movable scan head 101 (FIG. 1) and scanner 112 (FIG. 2). The reseau 105 is positioned below the movable scan head 101 and scanner 112 and is scanned simultaneously with the object image 104. The object 103 and reseau 105 are mounted immovably in or to the frame member 201 so that they are also immovable in relation to each other. An object image backlight 107 is positioned over object 103 or in the movable scan head 101 for illumination of the object image 104 and an optional reseau backlight 109 is positioned under the reseau 105 to illuminate the reseau 105. In this illustration, the object 103 is considered to be a transparency or plastic film that contains the object image 104, so illumination of the object image 104 is accomplished with a backlight source 107 that radiates light through the object 103 to illuminate the object image 104. Alternatively, an object image that is on an opaque object, such as a conventional photograph developed on photographic paper, would of course need front illumination, which could be from a light source mounted anywhere on or in proximity to the scanner 112 that does not obscure the scanner field of view, which would be well within the skill and capabilities of persons skilled in this art. For example, the alternate front light source 107' shown in FIG. 2 would illuminate the front (bottom) surface of object 103.

An object image backlight guide bearing 110 and a reseau backlight guide bearing 111 support the distal ends 122, 126 of the respective backlight support frames 120, 124 for the object image backlight 107 and reseau backlight 109. The guide bearings 110, 111 are mounted in a system frame 140, part of which is shown cut away in FIG. 1 to reveal other components, are described herein. The proximal ends 128, 130 of respective backlight support frames 120, 124 extend from opposite ends 202, 205 of a rigid mounting frame member 201, which is attached to the main carrier housing 127.

The main carrier housing 127 is movably mounted on elongated guide bearings 121, 123, which allow movement of the main carrier housing in the X-axis 115 direction. The guide bearings 121, 123 are supported by the system frame 140. The movable scan head 101 is movably mounted in the main carrier housing 127 for movement back and forth in the Y-axis direction, as indicated by the arrow 119 in FIG. 1. Example bearing and drive mechanisms for moving the main carrier housing 127 in the X-axis 115 direction and for moving the movable scan head 101 in the Y-axis 119 direction can include worm gear and follower components driven by stepper motors similar to those shown and described in U.S. Pat. No. 4,928,169, which is incorporated herein by reference, or by any other suitable mechanisms and components.

The reseau 105 is held in an immovable position in relation to the system frame structure by a suitable reseau mounting structure 142 such that movement of the main carrier housing 127 in the X-axis 115 direction also moves the reseau backlight 109 in unison under the reseau 105. A similar reseau mounting structure, which cannot be seen in FIG. 1, is also positioned to support the opposite edge of the reseau 105. Likewise, the object 103 is mounted by suitable mounting brackets 144, 146 in immovable relation to the system frame 140, thus also in immovable relation to the reseau 105. The object image 104 can be sandwiched between two transparent glass sheets (not shown) for support, as would be obvious to persons skilled in this art. Further, as mentioned above, as the main carrier housing 127 moves in the X-axis 115 direction, it moves the object image backlight assembly 107, which is attached to the main carrier housing 127 by frame member 201, in unison in the X-axis 115 direction in relation to the object 103.

A removable pin 117 connecting the proximal end of the support frame 120 to the upper end 202 of frame member 201 permits the object image backlight 107 to be removed to accommodate mounting and removing an object 103 to be scanned.

Figure 6:
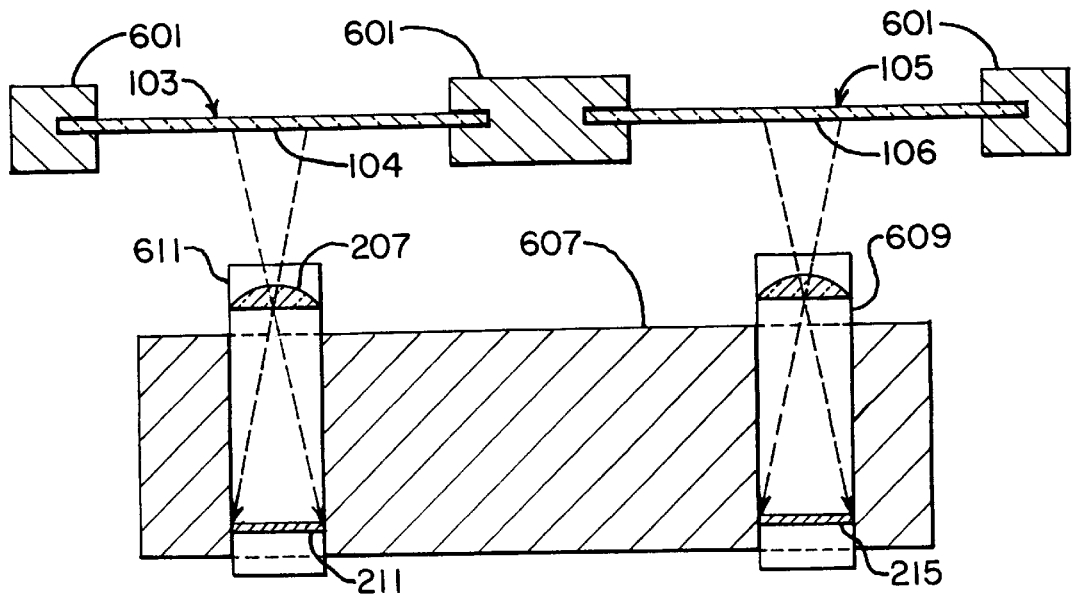
FIG. 6 is a representation of an alternate orientation of the object image and reseau according to this invention.

The main carrier housing 127, the backlights 107 and 109, and the movable scan head 101 move in unison in the X-axis 115 direction relative to the object 103 and the reseau 105 which are held securely by the mounting brackets 144, 146 and system frame 140 so that their positional relationship to each other remains constant. The movable scan head 101, which contains the optical scanning components to be described in more detail below, is also movable in the Y-axis 119 direction in relation to the object 103, reseau 105, main carrier housing 127, and system frame 140, as described above. The positions of the object 103 and reseau 105 can be interchanged (not shown) or even juxtaposed as illustrated in FIG. 6, or they may be placed on the same side of the scanner head as described below with respect to FIG. 9.

The details of the optical components of the scanning apparatus 100 are best seen in FIG. 2, where the movable scan head 101 is shown positioned between the object 103 and the reseau 105 and with two sides and the bottom cut away to reveal the optical components. The optical components comprise an optical head frame 203 mounted to a wall 152 of the movable scan head 101, and it supports an object scanning photoreceptor array 211 oriented toward the object 103 and a reseau scanning photoreceptor array 215 oriented toward the reseau 105. The optical head frame 203 also mounts and supports a lens 207 for focusing the object image onto the object scanning photoreceptor array 211 and a lens 209 for focusing the reseau marks 106 onto the reseau scanning photoreceptor array 215. With the optical head frame 203 mounted on the wall 231 of movable scan head 101 in this manner, any X-axis 115 direction or Y-axis 119 direction motion imparted to the movable scan head 101 is also imparted to the photoreceptor arrays 211, 215 and lenses 207, 209.

The optical head frame 203 can also be mounted on the wall 152 in such a manner that it is movable up and down in relation to the movable scan head 101 in the Z-axis 117 direction, as indicated by the arrow 231, for effecting proper optical positioning and focussing of the object image 104 on photoreceptor array 211. The reseau lens mount 233 on the lower portion of the optical head frame 203 can also be mounted in such a manner that reseau lens mount 233 and lens 209 are movable up and down in relation to the optical head frame 203 in the Z-axis 117 direction, as indicated by the arrow 235, for focussing the reseau marks 106 on the photoreceptor array 215 after the object image 104 is focussed on the photoreceptor array 211. Factory settings or one-time settings of these Z-axis adjustments may be sufficient to obtain and keep the desired distances and focus for the object image 104 and reseau marks 106, or they can be made user adjustable, as desired. If user adjustment is desired, suitable mountings and mechanisms to effect the movable mountings of optical head frame 203 and lens mount 233 can be easily used or adapted from those Z-axis mountings described and shown in U.S. Pat. No. 4,928,169, which is incorporated herein by reference. Therefore, further description of Z-axis drive or control components for moving the optical head frame 203 and lens mount 233 up and down in the Z-axis is not required here for an understanding of the principles and components of this invention. Other adjustments can also be provided for the lenses 207, 209, as desired by persons skilled in this art.

The object image optical system 207 scans a swath 225 on the object image 104, and the reseau optical system 209 scans a swath 227 on the reseau 105. The swaths 225 containing the scan line 221 and the swath 227 containing the scan line 223 are not necessarily the same width in the Y-axis 119 direction. The width of the swath 225 on the object 103 is balanced to optimize pixel detail desired in the detected object image 104 with sufficient width to gather image from a reasonably large area in a swath. The width of swath 227 on the reseau has to be sufficient to gather images of a sufficient number of reseau marks 106 within the path 224 of the swath to create accurate positioning coordinate information for use in correlating spatial positions of image pixels gathered in one swath with object image pixels gathered in another swath across the object 103.

The width of the swath 225 on the object 103 in the Y-axis 119 direction is partly dependent on the focal length of the lens 207 and the position of the lens 207 relative to the object 103. The width of the swath 225 on the object 103 in the Y-axis 119 direction can be altered by replacing the lens 207 with a another lens (not shown) having a different focal length and by repositioning the new lens relative to the object 103 accordingly so that the entire swath containing the scan line 221 remains focused on the photoreceptor array 211. An optional embodiment of the present invention includes a second lens (not shown), and possibly additional lenses (not shown), having a different focal length than the lens 207 that can be positioned so as to replace the lens 207 and alter the width of the swath 225 on the object 103 in the Y-axis 119 direction. The additional lens(es) (not shown) provides the capability to alter the resolution of the resulting image copy of the object image 104 and to alter the time required to scan the object image 104. In addition, this embodiment eliminates the requirement for "zooming" that is common to m any single lens systems that provide the capability of changing the resolution of the resulting image copy of an object image.

Figure 9:
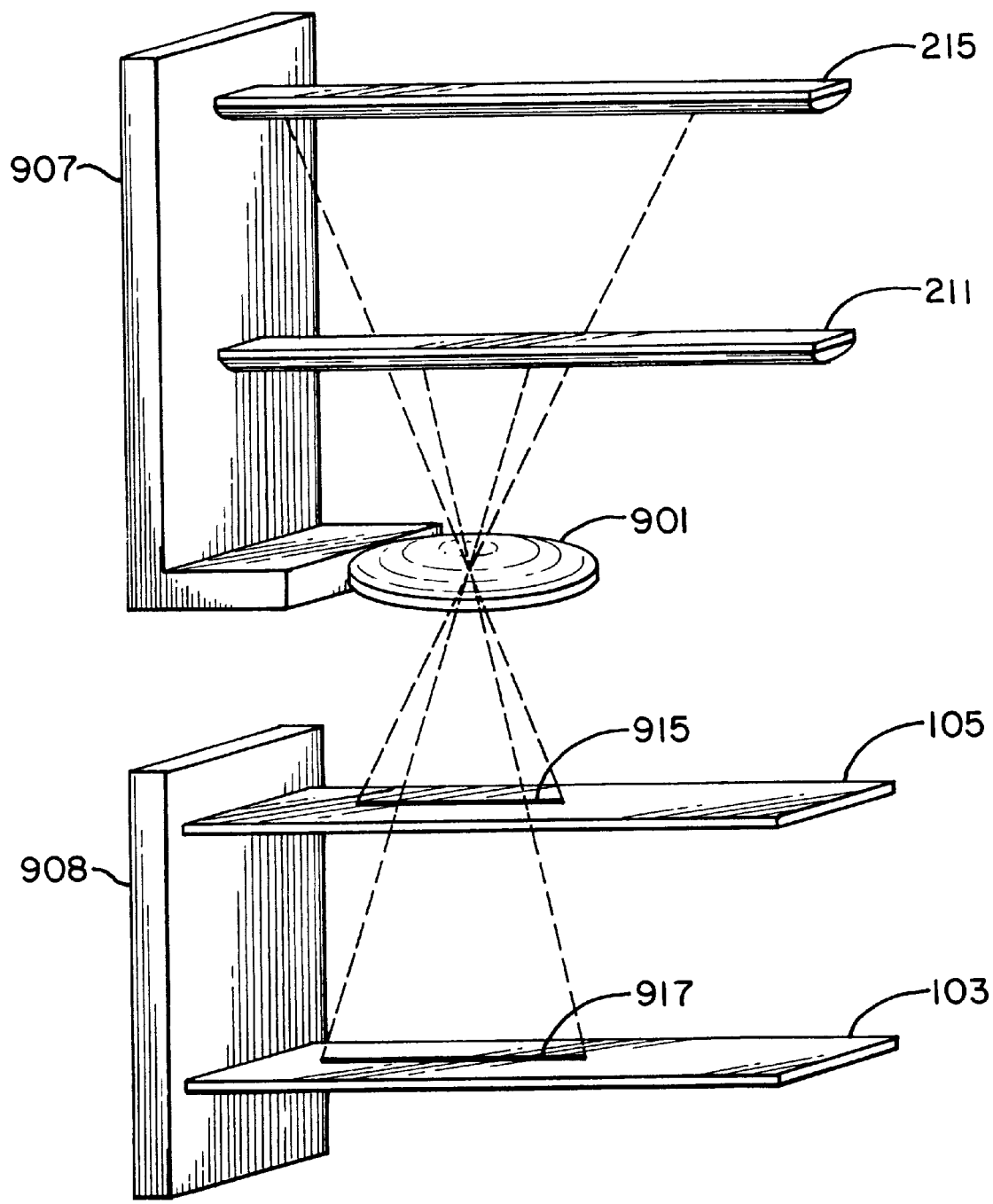
FIG. 9 is a representation of an alternative single optics scanner for simultaneously scanning an object image and reseau image so that the reseau image is not superimposed on the object image.

Another alternate embodiment with a single lens system is possible as shown in FIG. 9 with the photoreceptor arrays 211 and 215 on the same side of the lens system 901, but at respectively different distances from the lens system 901. This arrangement establishes the plane of the object 103 and the plane of the reseau 105 at respectively different distances on the same side of the lens system 901. The positions of the object 103 and the reseau 105 and their respective photoreceptor arrays 211, 215 can be switched.

The photoreceptor arrays 211 and 215 in FIG. 9 with the lens system 901 are held by a frame 907 and the object image 104 and reseau 105 are supported by a second frame 908 to permit relative movement between the photoreceptor arrays 211, 215 and object 103 and reseau 105. Again, suitable adjustable vertical or Z-axis mountings and, if desired, drive mechanisms can be adapted readily by persons skilled in this art from the mounting structures and mechanisms shown and described in FIG. 2 and in U.S. Pat. No. 4,928,169, which is incorporated herein by reference. A scan line 917 on the object image 104 is scanned simultaneously with a scan line 915 on the reseau 105. The photoreceptor arrays 211, 215 and object 103 and reseau 105 may be offset or spaced apart from each other to some extent as shown in FIG. 9 to aid in the separation and noninterference of an image from object 103 with the image of reseau marks from the reseau 105. The amount of offset or distances between the respective components (photoreceptor arrays 211 and 215, object 103, and reseau 105) is limited or determined by the parameters of the lens system 901, as will be readily apparent to persons skilled in this art.

In an implementation as shown in FIG. 9, the reseau image will disappear to the object image scanner if the distance between the object image 104 and the reseau 105 is comparable to the focal length of the lens system 901. For a 50 millimeter lens system, the distance would be on the order of 30 millimeters to insure the reseau image did not appear on the photoreceptor array 215. This arrangement has the advantage of fewer optic elements and better geometry with minimal interference between scanned images.

Figure 3:
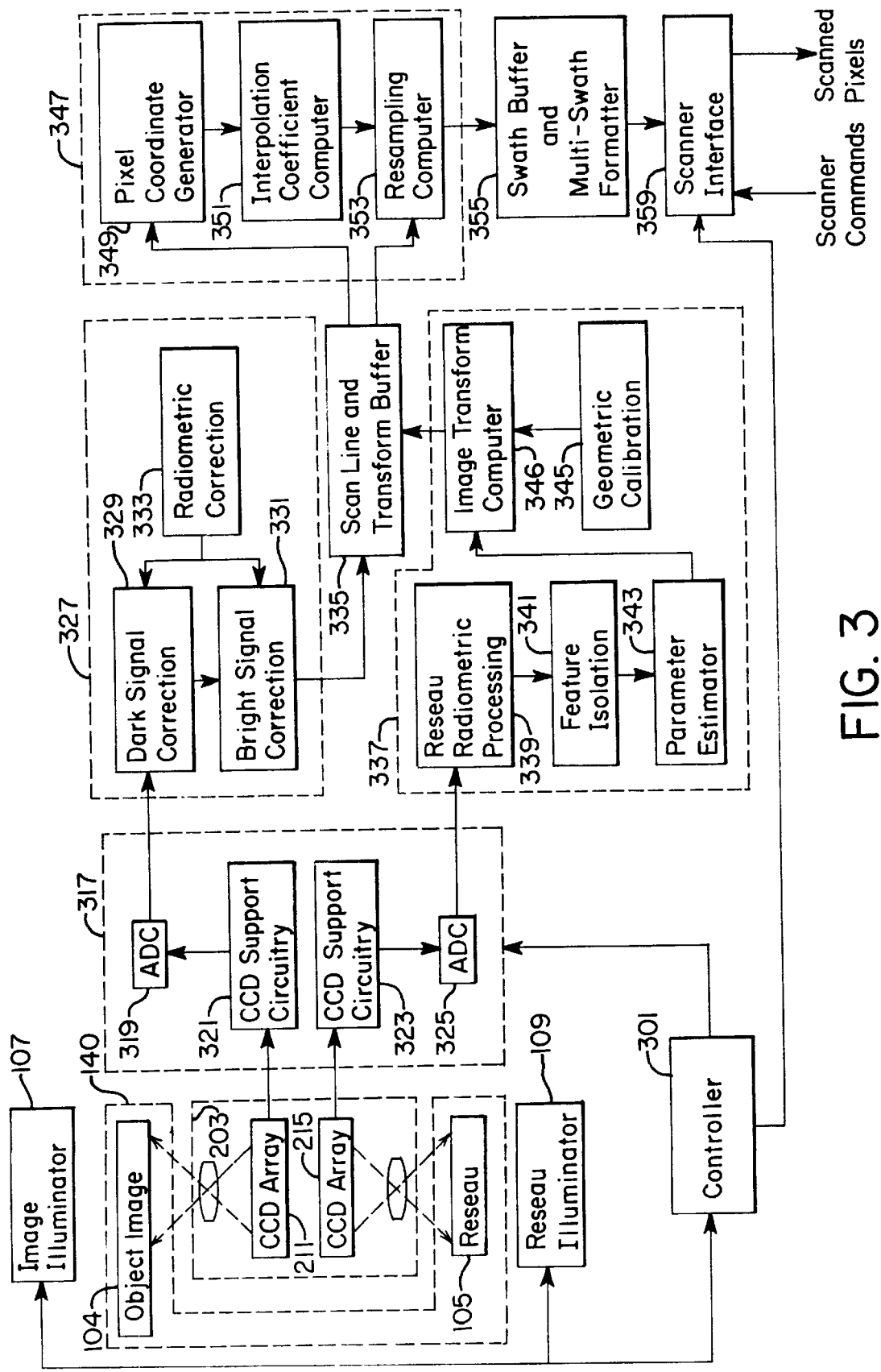
FIG. 3 is a block diagram of a control system for the scanner.

The photoreceptor elements 212 and photoreceptor arrays 211 and 215, as illustrated in FIG. 2 and discussed briefly above, are exemplified as photosensitive charge-coupled devices (CCD array elements) which are commercially available. In FIG. 2, as the movable scan head 101 moves the optical components to sweep the scanned swaths 225 and 227 over the object image 104 and reseau 105 being scanned, the incident light on each CCD photoreceptor element 212 creates an electrical charge proportional to the intensity of the incident light. The magnitudes of the charges are then transferred to processing elements as explained in more detail below. Wiring for carrying the electrical charges from the CCD elements are well known to persons skilled in this art and do not form any part of this invention, so they are not shown in the drawings or explained further herein. The length of the photoreceptor arrays 211, 215 and complexity, such as multiple-row arrays for color imaging, are well known design choices, thus are not part of this invention, but may be used in making and implementing the invention by persons having ordinary skill in the art, given the teachings of this invention. Further, increased resolution obtainable by multiple linear arrays along the line of scan motion is also a well known expedient that can be implemented with this invention by persons having ordinary skill in the art, once they understand the principles of this invention as described and shown herein. Therefore, while such expedients are considered to be useful in implementing this invention, they are not part of this invention and need not be described in more detail herein. A block diagram of a control and processing system that can be used with the invention is shown in FIG. 3. The fixed system frame 140 is shown with the object image 104 and the reseau marks 106. The optical head frame 203 includes the CCD photoreceptor arrays 211 and 215. The backlights (illuminators) 107 and 109 are controlled by a controller 301.

Figure 4:
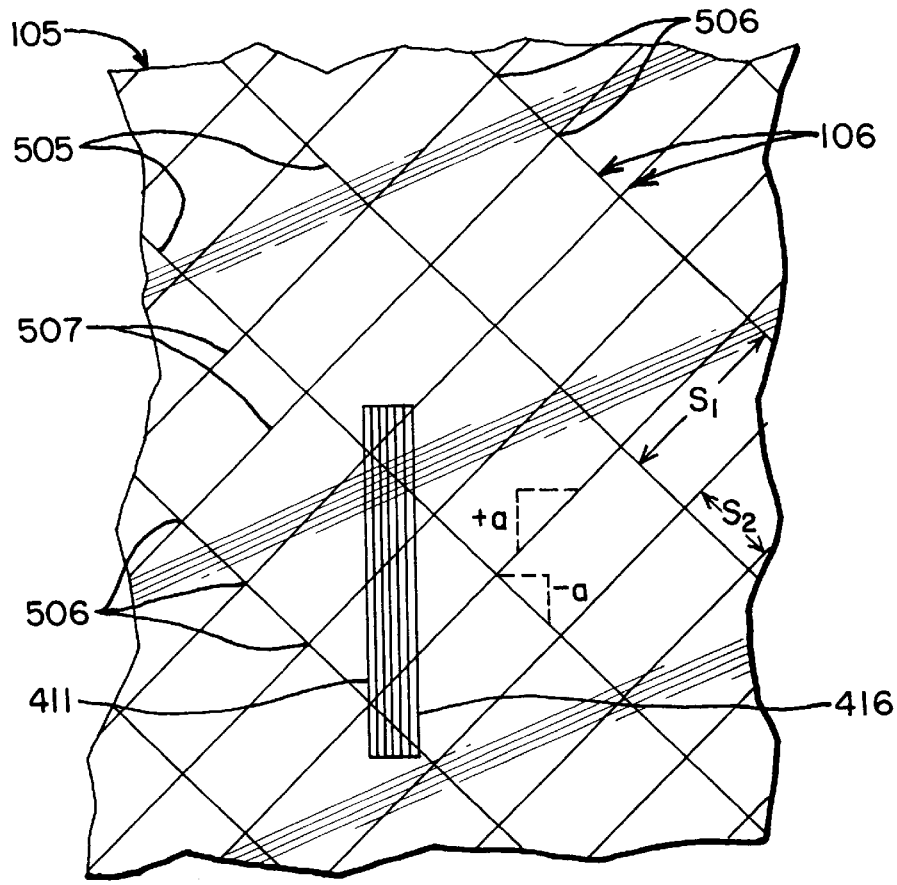
FIG. 4 is an illustration of a reseau relative to several adjacent scan lines that form a swath.

FIG. 4 provides an illustration of an enlarged segment of reseau 105. Reseau 105 includes a grid composed of two sets of reseau marks 106, all of which lie in the same plane as reseau 105. The first set (the NW/SE set) of reseau marks 106 is comprised of parallel reseau marks 505 that extend NW/SE in this illustration. The reseau marks 505 in the NW/SE set are separated by a distance $s_1$. The second set (the SW/NE set) of reseau marks 106 is comprised of reseau marks 507 that extend SW/NE in this illustration. The reseau marks 507 in the SW/NE set are separated by a distance $s_2$. The distances $s_1$ and $s_2$ are preset by manufacturer and the two distances can be equal but they are not required to be equal. The reseau marks 505 in the NW/SE set are illustrated perpendicular to the reseau marks 507 in the SW/NE set, which is convenient, but not essential to this invention. As shown in FIG. 2, the reseau marks 106 are oriented on reseau 105 such that they are at approximately forty-five degree angles to swath 227, which is also convenient, but not essential to the invention. A few degrees variance from forty-five degrees is desired to avoid having the CCD array 215 from passing over and scanning two or more reseau grid intersections 506 at the same time.

Figure 5A:
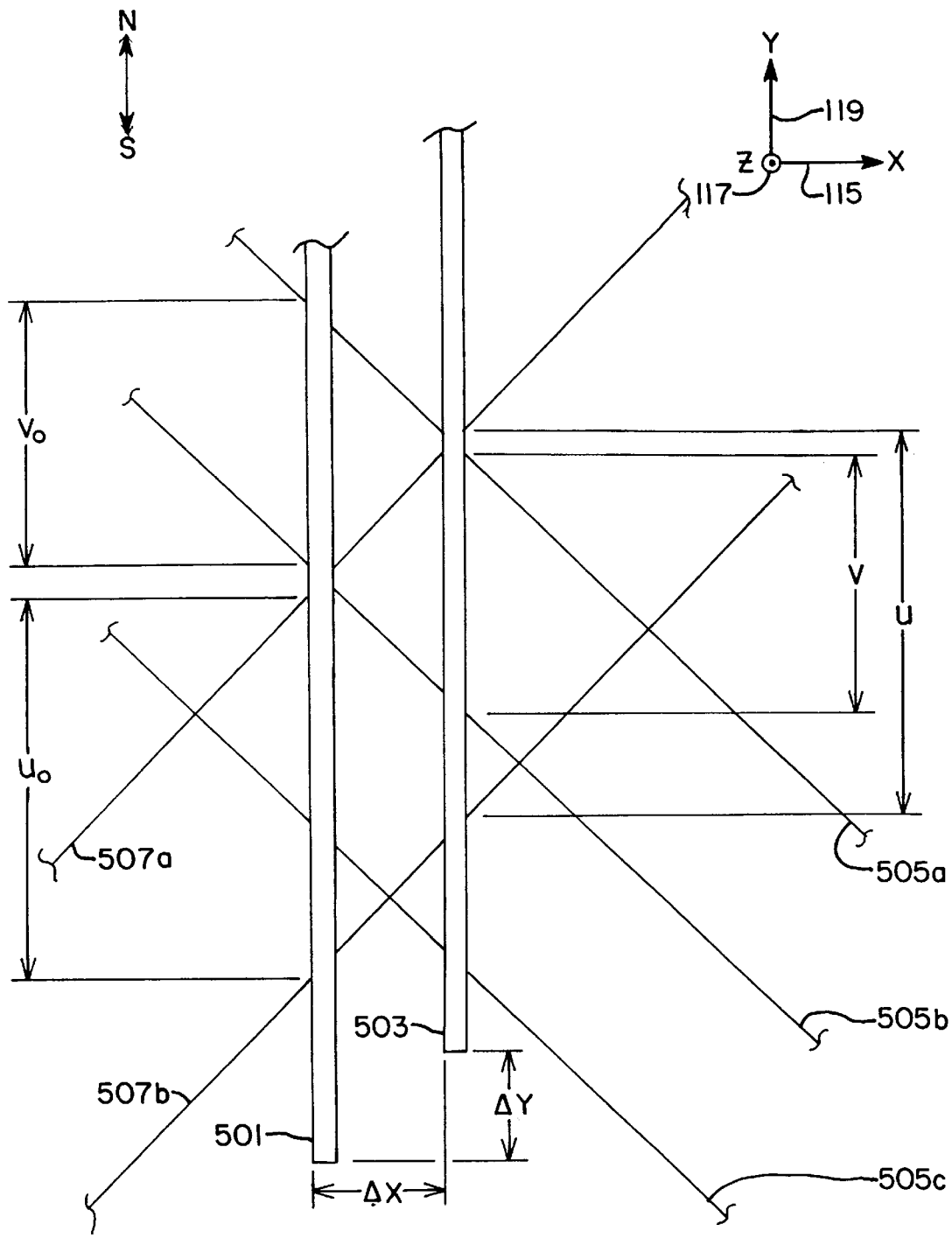
FIG. 5A is an enlarged illustration of mensuration points associated with a reseau scan swath showing the sources of error in location.
Figure 5B:
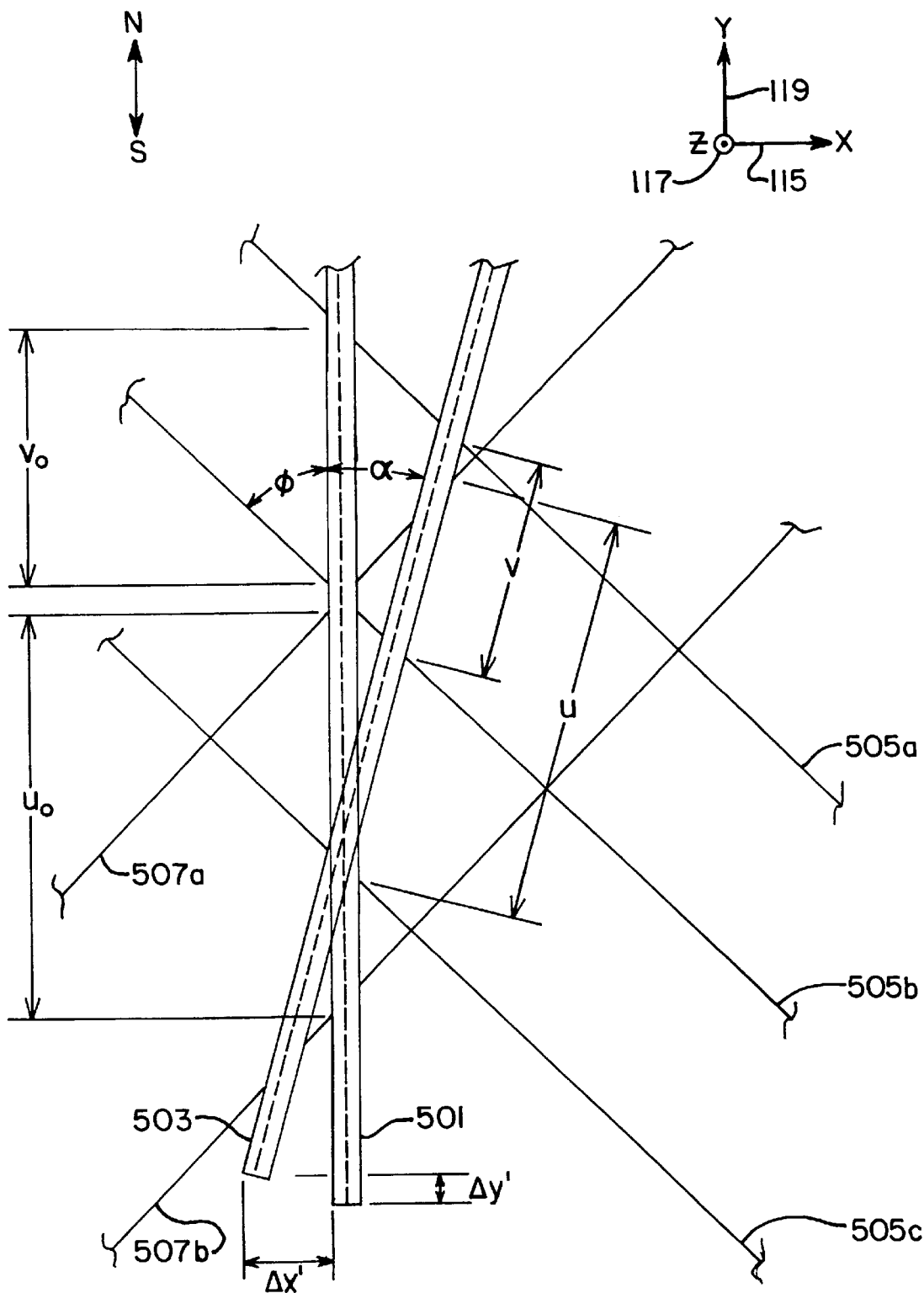
FIG. 5B is an another enlarged illustration of mensuration points associated with a reseau scan swath showing the sources of error in location.

As shown in FIG. 5A and FIG. 5B, which illustrate an even further enlarged segment of the reseau 105, the rectangle position 501 represents the image one CCD photoreceptor array 215 looking at the reseau (FIG. 2) as the photoreceptor array 215 sweeps across successive SW/NE reseau marks 505 (designated individually in FIG. 5A and FIG. 5B as 505a–505c) and across the successive NW/SE reseau marks 507 (designated individually in FIG. 5A and FIG. 5B as 507a–507b). In a more abstract sense, which is appropriate for mathematical calculations, the rectangle 501 can represent the position of the scan head 101 at one location along the swath 227 (FIG. 2) as it sweeps either north or south across the reseau 105. The smaller angle between the reseau marks 505 and the scan path position 501 is denoted as φ. The angle φ is preset by the user or the manufacturer and will be discussed further below. Better results and accurate location calculations the scan head 101 and for pixel correlation when scanning the object image 104 can be obtained if the angle φ is at an angle slightly different than forty-five degrees, for example, forty-seven degrees, particularly if distances $s_1$ and $s_2$ are equal. Such scan head 101 location and pixel correlation steps are described in more detail below.

As discussed above, the operation of scanning apparatus 100 includes scanning the object image 104 and reseau 105 simultaneously with the movable scan head 101. As shown in FIG. 3, the analog electrical signals created by photoreceptor arrays 211 and 215 are converted to digital electrical signals in data collection subsystem 317. The object image digital signal from analog-to-digital converter (ADC) 319 in the data collection subsystem 317 and the reseau digital signal from ADC 325 in the data collection subsystem 317 are further processed and corrected by the radiometric processing system 327 and the reseau processing system 337 respectively before they are transmitted and stored in the scan line and transform buffer 335, which serves as a temporary high-speed storage area. The radiometric processing system 327 corrects errors in the digital object image signals created by inherent differences in the electronic response of the photoreceptor elements 212. Similarly, the reseau processing system 337 corrects the digital reseau signals. The reseau processing system 337 also determines the geometric position of the center of each scanned reseau mark 106. The stored image and reseau data are transmitted from the scan line and transform buffer 335 to a geometric processing system 347, which further corrects any distortions and geometric deviations in the digitized and stored image by referencing information created by scanning the reseau 105 that indicates the actual positions of the scanner 112 (FIG. 2) when the respective image data was collected. The digital output from geometric processing system 347 in FIG. 3 is then transmitted to an optional swath buffer and multiswath formatter 355, which creates images in the format desired by the user. Each step of this process will be discussed in further detail below.

As shown in FIG. 3, object image backlight 107 and reseau backlight 109 are controlled and activated by controller 301. As shown in FIGS. 1 and 2, as the scanner 112 moves in the X-axis 115 direction, the moving positions of the photoreceptor arrays 211 and 215 scan a swath 225 on object image 104 and a swath 227 on reseau 105 respectively. The object image backlight 107 illuminates the object image 104, while reseau backlight 109 illuminates the reseau 105. Illumination of the object image 104 causes light waves to propagate through the object 103 (FIG. 1) in proportion to various features in the object image 104 throughout the scan line 221 and through lens 207, which focuses the light waves onto photoreceptor array 211, where they are detected and transduced to electrical signals. Likewise, illumination of the reseau 105 causes light to propagate through reseau 105 along the scan line 223 and through lens 209, which focuses the propagated light onto the photoreceptor array 215. The reseau marks 106 are preferably opaque, however, so any light from the reseau backlight 109 that is incident on a reseau mark 106 would not be transmitted through the reseau 105 to the detector array 215. Each photoreceptor element 212 in photoreceptor arrays 211 and 215 creates an analog electrical signal that is proportional to, and dependent on, the amount of light the photoreceptor element 212 receives.

The analog object image signals generated by photoreceptor 211 are transmitted to CCD support circuit 321, which is part of the data collection subsystem 317. Likewise, the analog reseau signals generated by photoreceptor array 215 are transmitted to CCD support circuit 323, which is also part of the data collection subsystem 317. CCD support circuits 321 and 323 are used to condition the analog voltage of the signal created by each photoreceptor element 212. Typical conditioning includes adapting the voltage range of the analog signal so that it falls within the range allowed by ADC 319 and ADC 325, "freezing" the voltage level in a sample-and-hold process prior to input to ADCs 319, 325, correcting the known non-uniformities between the photoreceptor elements 212, and applying dark current compensation. The Operation Amplifier AD811, manufactured by Analog Devices of Norwood, Mass., and Erasable Programmable Logic Device EPM7128, manufactured by Altera, of San Jose, Calif., are suitable and typical CCD support devices that can be used for the CCD support circuits 321, 323 of this invention, and the use of such devices for this kind of CCD signal processing is well known in the art.

Since the output version of the scanned object image 104 is to be stored in a computer, it is desirable to convert the analog signals generated by the photoreceptors in CCD arrays 211, 215 into digital signals. Therefore, the analog object image signal outputs from CCD support circuit 321 are transmitted to ADC 319, which converts the analog object image signals for each photoreceptor element of the CCD array 211 into digital signals for each photoreceptor element. The digital signals are represented by a digital number which has typically ten to twelve bits or more. In a twelve-bit digital output signal, the values range between zero and 4,095. Likewise, the reseau signal outputs from CCD support circuit 323 are transmitted to ADC 325, converts the analog reseau into eight-bit digital signals. In an eight-bit digital output signal, the values range between zero and 255. It is possible for ADC 319 and ADC 325 to be part of a single, multi-channel analog-to-digital converter (ADC) so that the same ADC may be used to convert the analog object image signals and the reseau signals. It is also possible to use an ADC that converts analog signals to digital signals using other than eight (8) or twelve (12) bits. Analog to digital conversion techniques are well known in the art.

The digital object image signals are transmitted from ADC 319 to the radiometric processing system 327, which includes the dark signal correction circuit 329, the bright signal correction circuit 331, and the radiometric correction circuit 333. The digital object image signals from ADC 319 are transmitted first to the dark signal correction circuit 329. The digital output image signals from dark correction circuit 329 are then transmitted to bright signal correction circuit 331.

The radiometric processing system 327 is used to correct the known errors or inherent differences in the electronic response of each photoreceptor element 212 of photoreceptor array 211 to any given incident light intensity. Under ideal conditions, each photoreceptor element 212 would create an identical signal when under equal illumination conditions. In reality, because of slight variations in materials, manufacturing conditions, and other causes the different photoreceptor elements 212 create different output signals for the same level of illumination. These errors are known or can be determined from calibrations performed periodically on the photoreceptor elements 212 and during testing of the scanning apparatus 100. Such calibrations can be accomplished by scanning gray images having known gray values. By storing the measurement of the analog signal created by each photoreceptor element under various illumination conditions, such as zero illumination conditions and high illumination conditions, radiometric processing system 327 can interpolate the necessary corrections for all other levels of illumination.

The circuits of radiometric processing system 327 can be implemented through the use of commercially available digital signal processors, such as Texas Instruments 320C40, whose use for this purpose is well known in the art. Alternatively, since the object image signals are digitized by ADC 319 before they are transmitted to the radiometric processing system 327, a software correction algorithm implemented in a standard high-performance microprocessor can be used. Software solutions to correct the disparities in photoreceptor elements of photoreceptor arrays are well known in the art.

The digital reseau signals are transmitted from ADC 325 (or a combined ADC 319 and 325) to the reseau radiometric processing system 337, which is used to correct the digital reseau signals and to determine the geometric position of the center of the scanned reseau mark 106. The precision to which the geometric position of the center of the scanned reseau mark 106 can be determined is directly related to the precision to which the position of scanner 112 can be determined. The principal functional components of the reseau radiometric processing system 337, all of which are described in more detail below, include the reseau radiometric processing circuit 339, the feature isolation circuit 341, the parameter estimator circuit 343, the image transform circuit 346, and the geometric calibration circuit 345. The digital reseau signals from ADC 325 are transmitted first to the reseau radiometric processing circuit 339. The digital signal outputs from the reseau processing circuit 339 are then transmitted to the feature isolation circuit 341. The digital signal outputs from the feature isolation circuit 341 are transmitted to the parameter estimator circuit 343. The digital signal outputs from the parameter estimator circuit are transmitted to the image transform circuit 346.

Reseau radiometric processing circuit 339 performs the same functions for the output signals created by the photoreceptor elements 212 scanning the reseau 105 as radiometric processing system 327 does for the output signals created by the photoreceptor elements 212 scanning the object image 104. More specifically, reseau radiometric processing circuit 339 corrects for the deviations in the signals generated by the individual photoreceptor elements 212 in scanning the reseau 105 for given incident radiation intensities.

Figure 13:
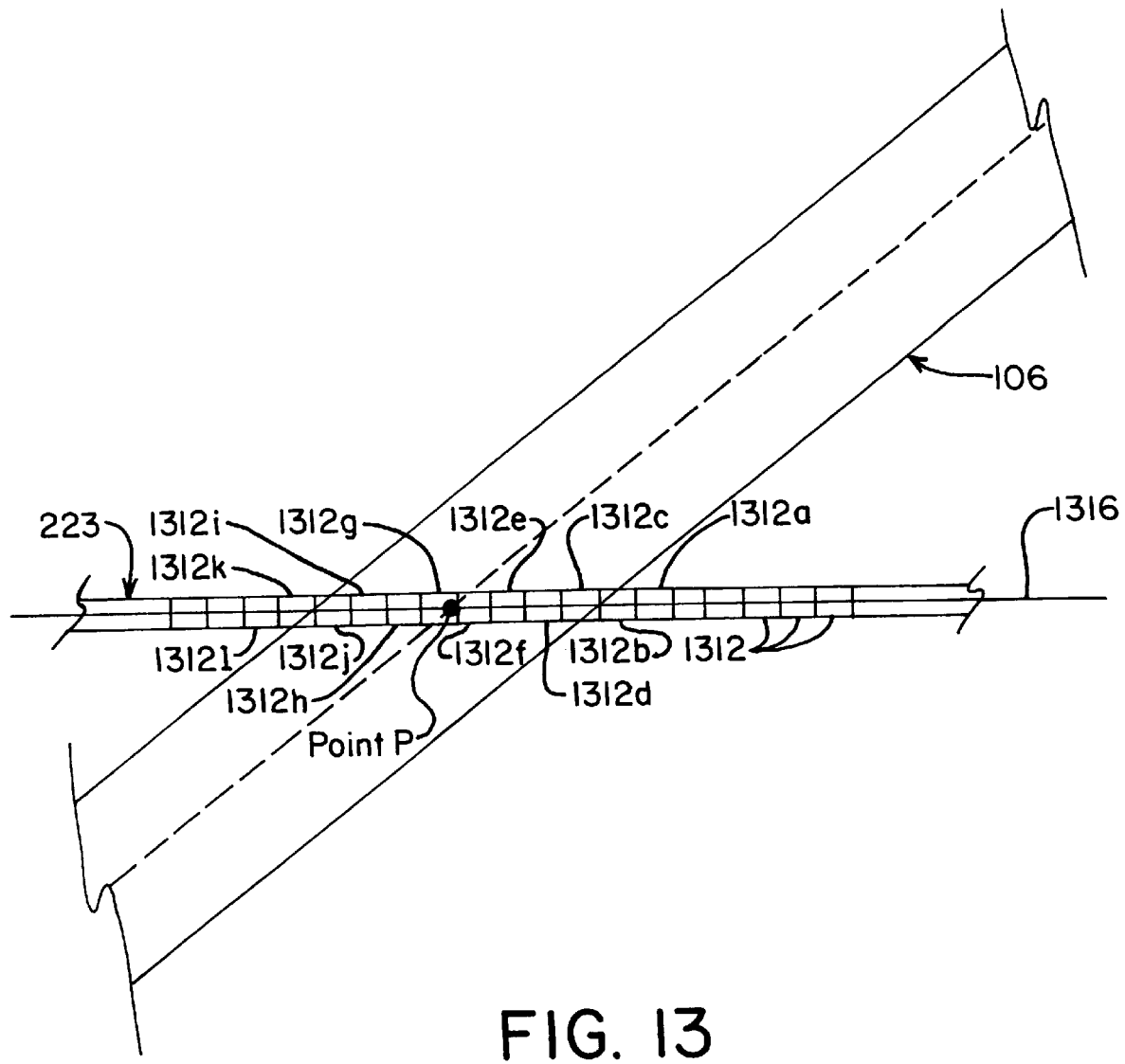
FIG. 13 is a representation of the linear photoreceptor array scanning a single reseau mark.

The digital signal outputs from the reseau radiometric processing circuit 339 are transmitted to the feature isolation circuit 341, which determines which photoreceptor elements 212 are currently scanning reseau marks 106. FIG. 13 is a plane view of an instantaneous position of a linear array of the image pixels 1312 in a scan line 223 as it sweeps across a reseau mark 106. The scan line 223 intersects reseau mark 106, and each pixel 1312 on the scan line 223 has a corresponding CCD photoreceptor element in the CCD photoreceptor array 215 illustrated in FIG. 2 above. With the moveable scan head 101 (FIG. 2) in a position to place the scan line 223 in the position illustrated, for example, in FIG. 13, pixels 1312a and 1312l are not coincident with reseau mark 106, so their corresponding photoreceptor elements in array 215 (FIG. 2) are not currently detecting reseau mark 106. In other words, light from bottom light 126 (FIG. 1) passes unimpeded through the reseau 105 in the positions of the image pixels 1312a, 1312l, and through other such image pixels 1312 in the scan line 223 that are not coincident with the reseau mark 106 (FIG. 13) and is focused by the lens system 209 (FIG. 2) onto the corresponding CCD photoreceptor elements in the photoreceptor array 215. Those corresponding photoreceptor elements in array 215 produce electric signals that are indicative of the light incident on them, which signals are processed and utilized by the computer system as indicating no reseau mark 106 at those image pixel locations. Scan line image pixels 1312b, 1312c, 1312j, and 1312k in FIG. 13 are partially coincident with reseau mark 106 so their corresponding CCD photoreceptor elements in array 215 (FIG. 2) are currently scanning and imaging parts of the reseau mark 106. In other words, some of the light from bottom light 126 (FIG. 1) aligned with the image pixels 1312b, 1312c, 1312j, and 1312k (FIG. 13) is blocked by the opaque reseau mark 106, while the rest of the light aligned with those image pixels 1312b, 1312c, 1312j, and 1312k is focused on the corresponding CCD elements in array 215 (FIG. 2). Swath image pixels 1312d, 1312e, 1312f, 1312g, 1312h, and 1312i (FIG. 13) are completely coincident with opaque reseau mark 106 and no light aligned with those image pixels reaches their corresponding CCD photoreceptor elements in array 215 (FIG. 2). Therefore, those CCD photoreceptor elements in array 215 corresponding to pixel images 1312d, 1312e, 1312f, 1312g, 1312h, and 1312i (FIG. 13) do not produce electric signals (other than some base level), and the computer utilizes the absence of electric signals from those CCD photoreceptors to indicate the presence of the reseau mark 106 at the positions of those image pixels 1312d, 1312e, 1312f, 1312g, 1312h, and 1312i (FIG. 13).

In order to obtain a high level of precision and detail, it is desirable and useful to determine the position of point A (FIG. 13) where the reseau mark midline 1314 intersects the image pixel midline 1316 of scan line 223. Feature isolation circuit 341 (FIG. 3) determines the exact center of the reseau mark 106 being scanned. As discussed above, each CCD photoreceptor element in array 215 corresponding to each image pixel 1312 in the scan line 223 on the reseau creates an analog electric signal that is converted into a digital signal by ADC 325. The digital signal represents the gray value of the image pixel on the reseau 105 being scanned. Through the use of a threshold established by calibration, all image pixels that are detected as producing no (or only base level) signals below the threshold are identified as belonging to reseau mark 106. In this threshold calibration, all pixels having a gray value lower than a predetermined threshold gray value indicate image pixels where substantial light is transmitted by the reseau 105 and are designated as the reseau pixels. In FIG. 13, the reseau pixels are currently being scanned by the photoreceptor elements corresponding to image pixels 1312a, 1312l, and the image pixels 1312 outside of those two pixels 1312a and 1312l. All pixels having a gray value greater than or equal to the threshold gray value are designated as reseau mark pixels. In FIG. 13, the image pixels 1312b, 1312c, 1312d, 1312e, 1312f, 1312g, 1312h, 1312i, 1312j, and 1312k are reseau mark pixels.

The reseau mark image pixels 1312b, 1312c, 1312j, and 1312k will have different gray values from each other and from the reseau mark image pixels 1312d–1312i, since they are only partially coincident with reseau mark 106, and some light from those image pixels reaches the corresponding CCD photoreceptor elements in array 215 (FIG. 2). After the gray values undergo correction in reseau radiometric processing subsystem 339 (FIG. 3), as discussed above, the resulting corrected signals from CCD photoreceptor elements corresponding to image pixels 1312d–1312i will show nearly identical gray values, because those image pixels are all coincident with the opaque reseau mark 106.

Figure 14:
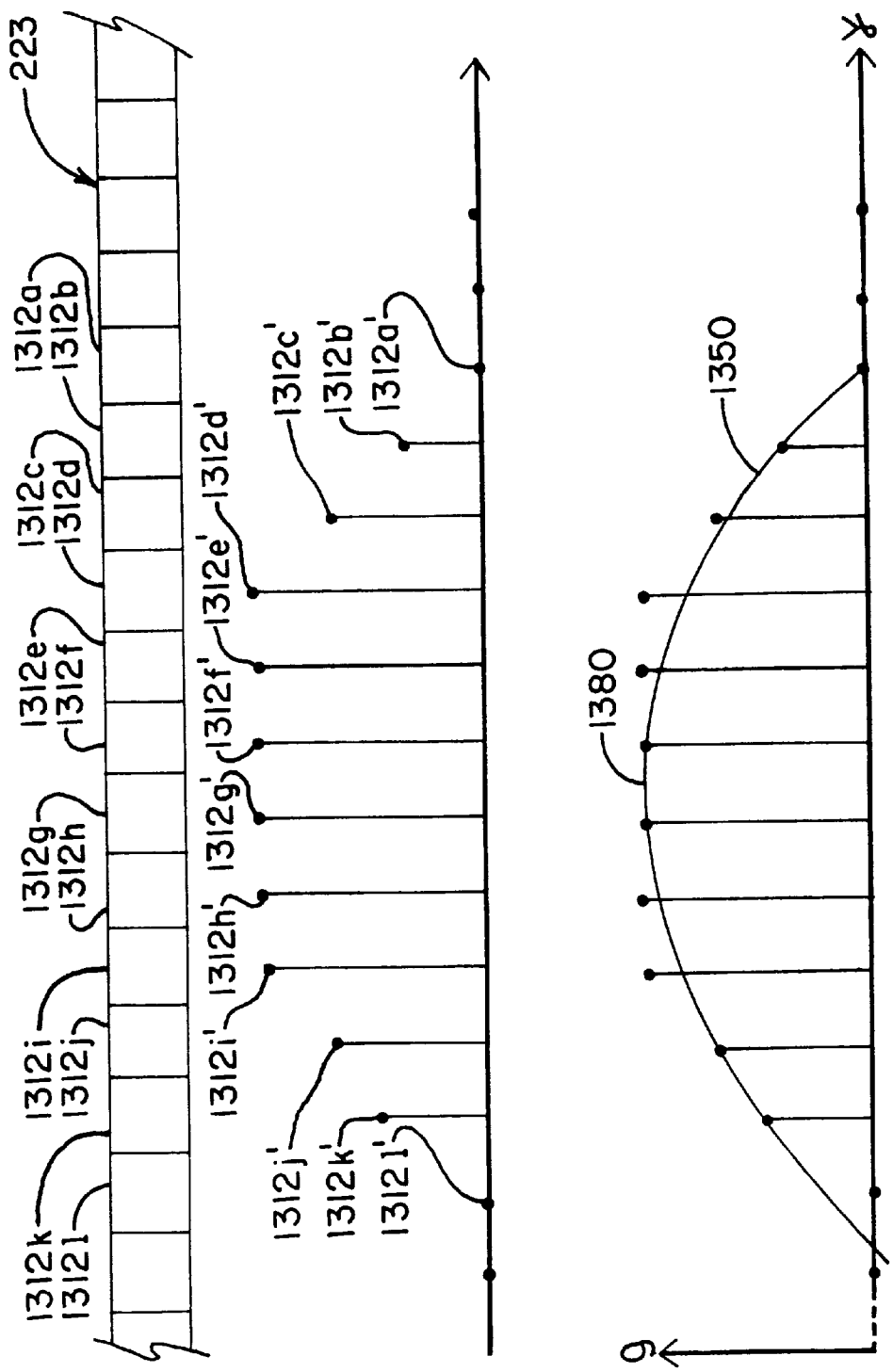
FIG. 14 is a representation of the line fitting function performed by the feature isolation method.

A line fitting function is used to determine the position of reseau mark midline 1314. As shown in FIG. 14, the peak pixel gray values represent the coincidence of the scan line 223 with the reseau mark 106. The corresponding pixel gray values are indicated by 1312a'–1312l' and range between zero (0) and 255 if an eight-bits-per-pixel representation is used. Peak gray values 1312d'–1312i' in FIG. 14 result from the low or no electric signals produced by the CCD photoreceptor elements in array 215 that correspond to the image pixels 1312d–1312i. Using the gray values associated with a fixed number of pixels, for example four, an equation can be created whose maximum point is approximately the location of the position of the reseau mark midline 1314 in FIG. 13. For example, using four of the pixel gray values allows the line fitting equation:

$$g = a_0 + a_1 y + a_2 y^2 + a_3 y^3 \quad (1)$$

to be used to approximate the curve 1350 in FIG. 14, where g is the grey value and y is the coordinate of individual CCD elements within the photoreceptor array. The point 1380 at the summit of the curve 1350 in FIG. 14 represents and corresponds to the midline 1314 of the reseau mark 106 in FIG. 13. Point 1380 can be determined mathematically by talking the mathematical derivative of equation (1) which provides the maximum value on the curve 1350 in FIG. 14, which maximum value occurs at the summit point 1380. Therefore, the position of reseau mark midline 1314, in FIG. 13 can be determined mathematically by a computer from the gray values of the image pixels 1312b–1312k that are coincident with the reseau mark 106 as described above. Line fitting functions and methods for creating an equation representing a series of point values are well known in the art. If a line fitting equation like equation (1) is applied with more than four pixel gray values, then it is necessary to solve an overdetermined system of equations. The problem of finding a solution for an overdetermined set of equations is well known in the mathematical and photogrammetric arts and solutions can be found by many well known methods, for example, the method of least squares.

The output signal of the feature isolation circuit 341 in FIG. 3 is transmitted to a parameter estimator circuit 343, implemented on the same digital signal processor (DSP) for the other circuits or as a separate DSP to increase the throughput rate. The parameter estimator circuit 343 uses the coordinates of the reseau mark midline 1314 in FIG. 13 computed by the feature isolation circuit 341 and the position and attitude information as determined by controller 301 to determine the actual position and attitude of the movable scan head 101 (FIGS. 1 and 2) for each scan line 223. The actual position and attitude of the moveable scan head, or more specifically, the scanner 112 and its lenses 207, 209 and CCD photoreceptor arrays 211, 215, is necessary to correlate positions of image pixels sensed from the object image 104 being scanned with the X-Y coordinate system used as the reference for storing, recalling, and displaying the pixel images in a composite of the scanned object image 104. In other words, when a CCD element 212 in array 211 in FIG. 2 detects and produces a signal indicative of a gray value or color for an image pixel in the image scam line 221 of the object image 104, the system computer has to know the proper X-Y location to assign that gray value or location so that it can be correlated properly with other gray values or colors of neighboring image pixels for storage, recall, and display of the scanned object image 104. The actual position and attitude of the scanner 112 and its optical and CCD detector components is a critical link to determining those position locations.

Processing the identified reseau midline pixels for the purpose of determining the actual position and attitude of the movable scan head 101 can begin when the identified reseau midline pixel data from a set of n reseau marks 106 have been accumulated within a single photoreceptor line at one position of the movable scan head 101 (FIGS. 1 and 2). In other words, at each position of the movable scan head 101, the movable scan head 101 is imaging multiple reseau marks 106. The reseau midline pixel information can be determined for each of the reseau marks 106 currently being imaged by the movable scan head 101. The processing of the information determined by identifying the reseau midline pixels, which is used to determine the position and attitude of the movable scan head 101 for a specific position of the movable scan head 101, can begin once the reseau midline pixel information for n reseau marks 106 currently being imaged by the movable scan head 101 has been computed. The number n of reseau marks 106 for whose midline pixel information is computed is necessarily less than or equal to the total number of reseau marks 106 being imaged by the movable scan head 101 at each position of the movable scan head 101. Data from more than one reseau mark 106 can be used, since multiple reseau marks 106 are being scanned simultaneously by the scanner 112 for each position of the movable scan head 101. In addition, depending on the desired geometric accuracy, the reseau mark midline information from more than one position of the scan head 101 can be used to increase the accuracy by increasing the information known about the position and attitude of the movable scan head 101. The number of positions of the movable scan head 101 used may vary from K=1 to 51, for example, or some other appropriate odd number. An odd number of movable scan head 101 positions must be used to ensure that the additional position and attitude information is based on an equal number of additional scan head positions on either side of, and parallel to, the current scan head 101 position in need of a refinement of its position and attitude.

Figure 16:
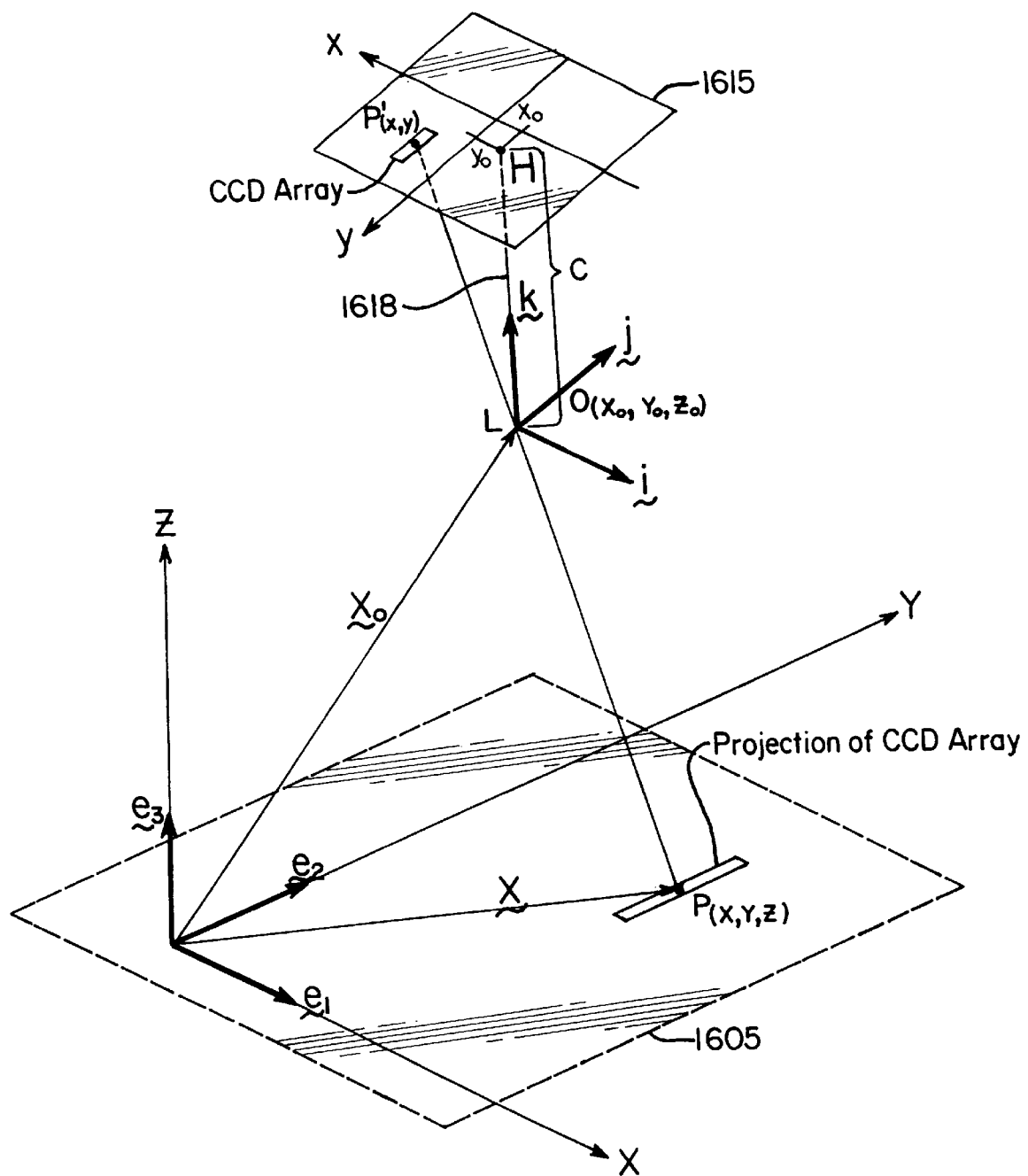
FIG. 16 is a representation of the relationship between a point P on the reseau and it's corresponding point P' on the photoreceptor array scanning the reseau.

Each reseau mark 106 being imaged by photoreceptor array 215, at each position of scan head 101, has a midline 1314, as shown in FIG. 13. As discussed above, the reseau mark midline 1314 includes a point P which is a point on reseau mark midline 1314 that is currently being imaged by photoreceptor array 215 and represents the intersection of reseau mark midline 1314 with image pixel midline 1316. The point P on the reseau mark midline 1314 is imaged by one, and only one, photoreceptor element 212 of photoreceptor 215. As shown in FIG. 13, point P in this example is being imaged by photoreceptor element 212 of the photoreceptor array 215 corresponding to reseau mark image pixel 1312g. As shown in FIG. 16, Point P on the reseau mark 106 has an associated set of coordinate system values X, Y, Z. The point P also has a corresponding point P' on the photoreceptor array 215. The point P' represents the photoreceptor element 212 that is currently imaging the point P. In the example shown in FIGS. 13 and 16, point P is being imaged by the photoreceptor element 212 in photoreceptor array 215 that corresponds to reseau mark image pixel 1312g.

As discussed above, for each position of movable scan head 101, photoreceptor array 215 images a plurality of reseau marks 106. Each individual reseau mark 106 being imaged by photoreceptor array 215 has a corresponding point P that represents the intersection of image pixel midline 1316 of scan line 223 with the reseau mark midline 1314. The feature isolation circuit 341 determines point P for n reseau marks 106 currently being imaged by the photoreceptor array 215. The number n of reseau marks 106 for which point P is determined is necessarily less than or equal to the total number of reseau marks 106 currently being imaged by photoreceptor 215. Each of the points P for the n reseau marks 106 has an associated point P' on the photoreceptor 215, as shown in FIG. 16, where 1615 is the plane containing photoreceptor array 215. Each image point P' has reseau point P with a set of coordinate system values X, Y, Z. In the reseau image, tthe image coordinates x,y are determined by the feature isolation circuit 341 based on the position of the movable scan head 101 as determined by controller 301.

The input to the parameter estimator circuit 343, as shown in FIG. 3, will receive the information for locations for point P' for all $1 \leq i \leq n$ and all $1 \leq j \leq K$ identified with a specific position of movable scan head 101. With a K value of 51 positions of the moveable scan head 101 and imaging ten or so reseau marks 106, an approximate total of 500 P' locations will be transmitted as input signals to the parameter estimator circuit 343.

Parameter estimation includes solving for the six unknowns of the movable scan head's 101 position and attitude. The outcome is denoted as exterior orientation, consisting of the three values for position of the scan head 101 on an X, Y, Z orthogonal, three-dimensional coordinate system (see FIG. 16) and of the three angles of attitude, tip ($\psi^r$), roll ($\omega^r$), and yaw ($\alpha^r$), as follows:

$$X_o^r, Y_o^r, Z_o^r, \omega^r, \psi^r, \alpha^r,$$

which are also denoted in the field of photogrammetry as the "elements of the exterior orientation" of one particular position of the movable scan head 101 (FIGS. 1 and 2). The index r refers to the sensing subassembly looking at the reseau 105, including lens 209 and CCD photoreceptor array 215 (FIG. 2). The variables $X_o$, $Y_o$, and $Z_o$ are the coordinates of a reference point location L (see FIG. 16), which represents the center of the lens 209, which is connected structurally to the movable scan head 101. The variable c represents the angle that the movable scan head 101 is rotated about the X-axis 115 and can be referred to as the roll rotation angle. The variable $\psi$ represents the angle that the movable scan head 101 is rotated about Y-axis 119 and can be referred to as the tip rotation angle. The variable $\alpha$ represents the angle that the movable scan head 101 is rotated about the Z-axis 117 and can be referred to as the yaw rotation angle.

The parameter estimation function to determine the position and attitude of movable scan head 101 is based on the mathematical tools of a central perspective, as described in modern photogrammetric textbooks, such as Manual of Photogrammetry, Fourth Edition, 1980, edited by Chester C. Slama, published by the American Society of Photogrammetry, Falls Church, Va. The basic premise of central perspective is a relationship between a point P in the plane 1605 of the reseau 105 with coordinates X, Y, and Z, and its counterpoint P' with coordinates x, y in the image plane 1615, a distance c away from the origin O, as shown in FIG. 16. The relationship is given by the following equations:

$$\frac{X - X_o^r}{Z - Z_o^r} = \frac{(x - x_o)r_{11} + (y - y_o)r_{12} + cr_{13}}{(x - x_o)r_{31} + (y - y_o)r_{32} + cr_{33}} \quad (2)$$

$$\frac{Y - Y_o^r}{Z - Z_o^r} = \frac{(x - x_o)r_{21} + (y - y_o)r_{22} + cr_{23}}{(x - x_o)r_{31} + (y - y_o)r_{32} + cr_{33}} \quad (3)$$

where c is the distance from the center point L of the lens 209 to the plane 1615 that contains the CCD photoreceptor array 215 (not shown in FIG. 16) measured along the optical axis 1618 of the lens 209; $x_o$, $y_o$ are the coordinates of the point H which is the intersection of the line 1618 with the plane 1615 that contains the CCD photoreceptor array 215 (the line 1618 is perpendicular to the plane 1615); and X, Y, Z are the coordinates of the point P that is on the plane 1605 of the reseau 105 (not shown in FIG. 16), which corresponds to the point P' in plane 1615. Z is constant for all of the reseau marks 106, since all the reseau marks 106 are on one plane of the glass plate of the reseau 105, and it represents the distance from the point L shown in FIG. 16 on the movable scan head 101 to the plane 1605 containing the reseau 105. Equations (2) and (3) provide the mathematical relationship between point P and point P', including where the movable scan head 101 is unintentionally laterally displaced along the X-axis 115, Y-axis 119, or Z-axis 117, where the movable scan head 101 is unintentionally rotated about the X-axis 115, Y-axis 119, or Z-axis 117, and where the movable scan head 101 is both unintentionally laterally displaced and unintentionally rotated.

In the following discussion, the X,Y,Z coordinates of the reseau are consistently used as the reference coordinates. They are found from equations (2) and (3) as applied to the pixel coordinates x,y in the digital image, and the elements of the inner orientation ($x_o$, $y_o$, c) as well as the elements of the exterior orientation ($X_o^r$, $Y_o^r$, $Z_o^r$, $r_{11}$, ..., $r_{33}$) as known at the time.

The rotation of the scanner 112 (FIG. 2) around the X-axis 115 (roll rotation $\omega$), Y-axis 119 (tip rotation $\psi$), or Z-axis 117 (yaw rotation a) creates the rotation elements $r_{ij}$ of a rotation matrix R. In general, as is well known in the art, a rotation matrix R provides the mathematical relationship between the X, Y, and Z coordinate location of a point on an object and the new X, Y, and Z coordinate location of the same point on the same object after the object has been rotated about X-axis, Y-axis, or Z-axis, or a combination of rotations about two or three of the axes. After the rotation of the object about the X-axis, Y-axis, or Z-axis, the point on the object is rotationally displaced from its initial position, which may be designated by $X_1$, $Y_1$, and $Z_1$, to its new position, which may be designated $X_2$, $Y_2$, and $Z_2$. Thus, the rotation matrix R provides the mathematical relationship between the coordinates $X_1$, $Y_1$, and $Z_1$ of the point before the rotation of the object and the coordinates $X_2$, $Y_2$, and $Z_2$ of the point after the rotation of the object. The mathematical relationship, and hence the rotation matrix R, are determined from the angles of rotation of the object about each of the X-axis, Y-axis, and Z-axis. The rotation matrix R includes nine elements, $r_{11}$ ... $r_{33}$, arranged as follows:

$$R = \begin{bmatrix} r_{11} & r_{12} & r_{13} \\ r_{21} & r_{22} & r_{23} \\ r_{31} & r_{32} & r_{33} \end{bmatrix} \quad (4)$$

It is important to recognize that the rotation matrix R is only concerned with the rotation of the object about the X-axis, Y-axis, or Z-axis. The rotation matrix R does not include changes in the coordinates of the point when the object is laterally displaced in the X-axis 115 direction, Y-axis 119 direction, or Z-axis 117 direction.

During operation of the scanner 112, the movable scan head 101 may unintentionally rotate about the X-axis 115 an angle of w degrees, called roll rotation. The movable scan head 101 may also unintentionally rotate about the Y-axis 119 an angle of ψ degrees, called tip rotation. Furthermore, the movable scan head 101 may unintentionally rotate about the Z-axis an angle of α degrees, called yaw rotation. Each of the unintentional rotations, which may happen simultaneously, creates a rotational displacement for each point on the movable scan head 101, including those points associated with the photoreceptor arrays 211, 215 and the lens system 209.

Therefore, it is customary to describe the rotation of the scanner 112 in the form of a rotation matrix R with nine elements $r_{11} \ldots r_{33}$, which in turn are defined by the attitude angles ω, ψ, and α of the movable scan head 101 in the reseau system X, Y, Z. More specifically, the rotation elements $r_{ij}$ of rotation matrix R are determined by the following equations:

$$r_{11} = \cos\psi^r \cos\alpha^r \quad (5)$$

$$r_{12} = \cos\omega^r \sin\alpha^r + \sin\omega^r \sin\psi^r \cos\alpha^r \quad (6)$$

$$r_{13} = \sin\omega^r \sin\alpha^r - \sin\omega^r \sin\psi^r \cos\alpha^r \quad (7)$$

$$r_{21} = -\cos\psi^r \sin\alpha^r \quad (8)$$

$$r_{22} = \cos\omega^r \cos\alpha^r - \sin\omega^r \sin\psi^r \sin\alpha^r \quad (9)$$

$$r_{23} = \sin\omega^r \cos\alpha^r + \cos\omega^r \sin\psi^r \sin\alpha^r \quad (10)$$

$$r_{31} = \sin\psi^r \quad (11)$$

$$r_{32} = \sin\omega^r \cos\psi^r \quad (12)$$

$$r_{33} = \cos\omega^r \cos\psi^r \quad (13)$$

For the parameter estimation, it is necessary to compute the six unknown values of $X_o^r$, $Y_o^r$, $Z_o^r$, $\omega^r$, $\psi^r$, $\alpha^r$ for the scan head 101 position from equations (2) and (3). The value of c is a fixed spatial relation of the actual distance between the lens 209 and the photoreceptor array 215, as described above and illustrated in FIG. 16. The values $x_o$ and $y_o$ are determined from calibration of the movable scan head 101. Calibration is a factory or manufacturer based process performed by scanning the reseau marks with precisely known values for $X_o^r$, $Y_o^r$, $Z_o^r$, $\omega^r$, $\psi^r$, $\alpha^r$ and using equations (2) and (3) to solve for c, $x_o$, and $y_o$. Knowledge of the precise values used during the calibration is available in a precision optical structure that holds a reseau plate and a scan-head in a fixed relationship and moves one with respect to the other by precisely known distances in the X-axis 115 direction, Y-axis 119 direction, and Z-axis 117 direction, and at angles $\omega^r = \psi^r = \alpha^r = 0$.

The solution of six unknown variables $X_o^r$, $y_o^r$, $Z_o^r$, $\omega^r$, $\psi^r$, $\alpha^r$ requires a minimum of six equations (2) and (3). Each observed point P on the reseau 105 produces two equations, so a minimum of three reseau points P is sufficient to solve the equations. It is preferable, however, to use more than three reseau points P, so that any errors in detecting a reseau mark 106 have less effect. Using more than three reseau points P will cause more than six equations to be used to solve for the six unknown variables $X_o^r$, $Y_o^r$, $Z_o^r$, $\omega^r$, $\psi^r$, $\alpha^r$ of the scan head 101 position, creating an overdetermined system of equations since there will be more equations than unknown variables. The problem of finding a solution for an overdetermined set of equations is well known in the mathematical and photogrammetric arts and solutions can be found by many well known methods, for example, the method of least squares.

Equations (2) and (3) are nonlinear, which makes them difficult to solve. One standard method of dealing with nonlinear equations is to linearize them by using approximations. The new linear equations are much easier to solve using standard mathematical techniques, for example, the method of least squares, and the techniques to do so are well known in the mathematical and photogrammetric arts.

One way to linearize a set of nonlinear equations is to make approximations about the unknown variables and then substitute the linear approximations into the nonlinear equations. For example, the following approximations can be made for the variables $X_o^r$, $Y_o^r$, $Z_o^r$, $\omega^r$, $\psi^r$, $\alpha^r$, which define the position and attitude of scan head 101:

$$X_o^r = (X_o^r)' + \Delta X_o^r \quad (14)$$

$$Y_o^r = (Y_o^r)' + \Delta Y_o^r \quad (15)$$

$$Z_o^r = (Z_o^r)' + \Delta Z_o^r \quad (16)$$

$$\alpha^r = (\alpha^r)' + \Delta\alpha^r \quad (17)$$

$$\omega^r = (\omega^r)' + \Delta\omega^r \quad (18)$$

$$\psi^r = (\psi^r)' + \Delta\psi^r \quad (19)$$

Linearization of equations (2) and (3) is well known in the art and includes substituting the approximations given by equations (14)–(19) into the original equations (2) and (3) and then taking the Taylor series expansion of the resulting equation. All higher order terms are dropped, since they will have a negligible effect on the resulting equations. Linearization results in the following two equations:

$$\Delta X = \Delta X_o^r + \frac{X}{Z}\Delta Z_o^r + \left(1 + \frac{X^2}{Z^2}\right)Z\Delta\psi^r + \frac{XY}{Z}\Delta\omega^r - Y\Delta\alpha^r \quad (20)$$

$$\Delta Y = \Delta Y_o^r + \frac{Y}{Z}\Delta Z_o^r + \left(1 + \frac{Y^2}{Z^2}\right)Z\Delta\omega^r + \frac{XY}{Z}\Delta\psi^r + X\Delta\alpha^r \quad (21)$$

Figure 17:
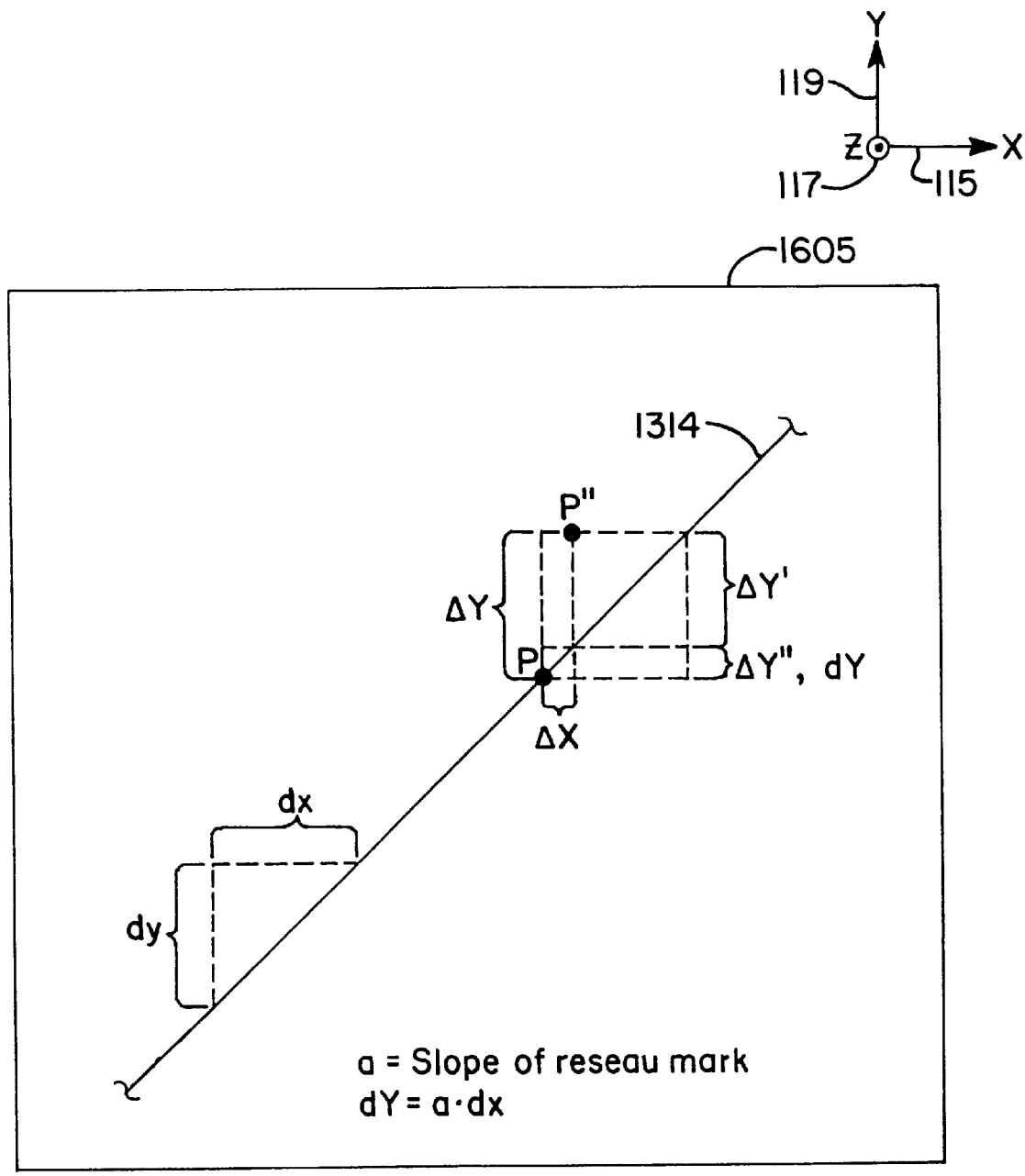
FIG. 17 is a representation of the projection of the point P' on the photoreceptor array onto the reseau plane containing the point P.

In the linearized equations, the six unknown variables for the position and attitude of scan head 101 are $\Delta X_o^r$, $\Delta Y_o^r$, $\Delta Z_o^r$, $\Delta\omega^r$, $\Delta\psi^r$, and $\Delta\alpha^r$. $\Delta X$ and $\Delta Y$ represent differences between the actual location of a known reseau point P on the reseau plane 1605 and the calculated point P" on the plane 1615 as shown in FIG. 17, which difference results from the mathematical method used above. Once $\Delta X_o^r$, $\Delta Y_o^r$, $\Delta Z_o^r$, $\Delta\omega^r$, $\Delta\psi^r$, and $\Delta\alpha^r$ have been determined, their values are substituted back into equations (14)–(19) above. Equations (14)–(19) are then substituted into equations (20) and (21) and new values for $\Delta X_o^r$, $\Delta Y_o^r$, $\Delta Z_o^r$, $\Delta\omega^r$, $\Delta\psi^r$, and $\Delta\alpha^r$ are computed. This iterative process is continued until the differences in successive values of $\Delta X_o^r$, $\Delta Y_o^r$, $\Delta Z_o^r$, $\Delta\omega^r$, $\Delta\psi^r$, and $\Delta\alpha^r$ becomes negligible.

The parameter estimation process thus far has used conventional and well known photogrammetric methods, such as those described in the Manual of Photogrammetry. The parameter estimation process described thus far used the coordinates for a known point P in the plane 1605 of reseau 105. In the present invention, however, the exact X, Y, Z coordinates of P on the reseau mark 106 that correspond to the coordinates of point P' on the plane 1615 of the photoreceptor array 215 are not known. Instead, only the fact that point P lies along the midline 1314 of a reseau mark 106 scanned by the CCD photoreceptor array 215 and is detected at coordinates x,y on the plane 1615 of array 215 is known. See FIGS. 2, 13, 16, and 17. As will be discussed in more detail below, the fact that the precise coordinates X, Y, Z, of point P on midline 1314 are not known requires that six points P on the reseau mark 106 be used instead of three to solve equations (2) and (3).

There are two sets of parallel reseau marks 106 and they are given by the following equations:

$$Y = \alpha X + s_1 b_1 \qquad (22)$$

$$Y = -\alpha X + s_2 b_2 \qquad (23)$$

Equations (22) and (23) are standard and conventional equations for straight lines. As best seen in FIG. 4, $s_1$ is the distance between parallel reseau marks 505 extending in one direction in the first set, and $s_2$ is the distance between the parallel reseau marks 507 extending in another direction in the second set. The slope of one of the two sets of parallel reseau marks is +a (for example, forty-seven degrees) and −a for the second set of parallel reseau marks (for example, forty-seven+ ninety degrees). It is preferred, but not necessary, that the reseau marks 505 in one set be perpendicular to the reseau marks 507 in the other set, as shown in FIG. 4. The slope +a of a midline 1314 of a reseau mark 106 is also illustrated in FIG. 17. The variables $b_1$ and $b_2$ are integers and represent specific reseau marks 106. For example, for $b_1=1$ there is a specific reseau mark 106, for $b_1=2$ there is another specific reseau mark 106 and it is parallel to the reseau mark corresponding to $b_1=1$. Likewise, for $b_2=1$ there is a specific reseau mark 106, for $b_2=2$ there is a specific reseau mark 106 parallel to the reseau mark 106 corresponding to $b_2=1$.

The approximate position of the scan head 101 in relation to the fixed position of the reseau 105 can be determined sufficiently accurately by mechanical or electronic sensors or by stepper motor controls, as described above and in U.S. Pat. No. 4,149,788, such that for each point P' detected along the CCD photoreceptor array 215, it is known on which reseau mark 106 the corresponding point P is coincident and being imaged by the scan line 223. As discussed above, however, the exact coordinates X, Y, Z, of point P are not known. Referring to FIGS. 16 and 17, projecting the point P' from the plane 1615 of the CCD photoreceptor array 215 onto the plane 1605 containing the midline 1314 of the reseau mark using standard projection methods creates projected point P''' on the plane 1605 of the reseau instead of point P. P''' is determined by using approximate values for the exterior orientation variables $X_o^r$, $Y_o^r$, $Z_o^r$, $\omega^r$, $\psi^r$, $\alpha^r$ as described above. If the exact values for the exterior orientation variables $X_o^r$, $Y_o^r$, $Z_o^r$, $\omega^r$, $\psi^r$, $\alpha^r$ were used, the projected point P''' would coincide with point P.

Equation (22) can be linearized using conventional numerical techniques and leads to:

$$dY = adX \qquad (24)$$

As shown in FIG. 17:

$$\Delta Y' = \Delta Y - dY \qquad (25)$$

and $$\Delta Y' = \Delta Y - adX \qquad (26)$$

There is also a relationship, as shown in FIG. 17, between ΔX and dX, namely:

$$\Delta X = dX \qquad (27)$$

Therefore, $$\Delta Y' = \Delta Y - a\Delta X \qquad (28)$$

which, from equations (2), (3), (20), and (21) produces:

$$\Delta Y' = -a\Delta X_o^r + \Delta Y_o^r - \left(\frac{aX}{Z} - \frac{Y}{Z}\right)\Delta Z_o^r + \qquad (29)$$

$$\left(-aZ\left(1 + \frac{X^2}{Z^2}\right) = \frac{XY}{Z}\right)\Delta \psi^r +$$

$$\left(-\frac{aXY}{Z} + Z\left(1 + \frac{Y^2}{Z^2}\right)\right)\Delta \omega^r + (X + aY)\Delta$$

Since there is a relationship between ΔY' and ΔX, they are not independent variables. The same is true for ΔX and ΔY. Therefore, each point P on the reseau plane 1605 only produces one independent variable and only one equation, since an error ΔX of a point P affects the point P's distance ΔY from the midline 1314 of the reseau mark by means of equation (28). As a result, a minimum of six reseau points P are needed, not three as described above for the general photogrammetric theory. More reseau points P (fifty for example) may be used so that the accuracy of the results is improved so long as a method is used, for example the least squares method, that allows a solution for an overdetermined system of equations. An iterative process similar to the one described above is used to solve the system of equations. The approximate values for $X_o^r$ and $Y_o^r$ are known from mechanical or electronic sensors or by stepper motor controls. $Z_o^r$ is a constant since the reseau 105 is flat. The angles $\omega^r$, $\psi^r$, $\alpha^r$ are set to zero (0) for the initial iteration. The values for $\Delta X_o^r$, $\Delta Y_o^r$, $\Delta Z_o^r$, $\Delta \omega^r$, $\Delta \psi^r$, and $\Delta \alpha^r$ are substituted back into equations (14)–(19) above. Equations (14)–(19) are then substituted into equations (20) and (21) and new values for $\Delta X_o^r$, $\Delta Y_o^r$, $\Delta Z_o^r$, $\Delta \omega^r$, $\Delta \psi^r$, and $\Delta \alpha^r$ are computed. This iterative process is continued until the differences in successive values of $\Delta X_o^r$, $\Delta Y_o^r$, $\Delta Z_o^r$, $\Delta \omega^r$, $\Delta \psi^r$, and $\Delta \alpha^r$ becomes negligible. The system of equations is solved for each scan line or for every sixth (for example) scan line, depending on the desired accuracy and acceptable throughput rate, to determine the attitude and position of the movable scan head 101.

One way to generate approximate starting values for the error variables $\Delta X_o^r$, $\Delta Y_o^r$, $\Delta Z_o^r$, $\Delta \omega^r$, $\Delta \psi^r$, $\Delta \alpha^r$ used in equations (14)–(21) is to have the scanning apparatus 100 scan an object image 104 having known and preset coordinates for specific features of the object image 104 a large number of times to determine errors that are repeated for corresponding positions of the scan head 101 during repeated scans of the object image 104. For example, an object image 104 can be scanned one hundred times and each scan of the object image 104 will produce exterior orientation variables $X_o^r$, $Y_o^r$, $Z_o^r$, $\omega^r$, $\alpha^r$ and corresponding errors $\Delta X_o^r$, $\Delta Y_o^r$, $\Delta Z_o^r$, $\Delta \omega^r$, $\Delta \psi^r$, $\Delta \alpha^r$ for the exterior orientation variables $X_o^r$, $Y_o^r$, $Z_o^r$, $\omega^r$, $\psi^r$, $\alpha^r$. The portion of the errors $\Delta X_o^r$, $\Delta Y_o^r$, $\Delta Z_o^r$, $\Delta \omega^r$, $\Delta \psi^r$, $\Delta \alpha^r$ that are repeated for each of the scans of the object image 104 for corresponding positions of the scan head 101 are the "repeatable" errors for the scan head 101. The "repeatable" errors for the exterior orientation variables $X_o^r$, $Y_o^r$, $Z_o^r$, $\omega^r$, $\psi^r$, $\alpha^r$ of the scan head 101 can be determined in the factory and stored in the parameter estimator 343. During use of the scanning apparatus 100, the "repeatable" errors can be used as starting values for the $\Delta X_o^r$, $\Delta Y_o^r$, $\Delta Z_o^r$, $\Delta\omega^r$, $\Delta\psi^r$, $\Delta\alpha^r$ variables in equations (14)–(21).

By the calibration means 345 in FIG. 3, the equivalents of the values:

$$X_o^r, Y_o^r, Z_o^r, \omega^r, \psi^r, \alpha^r$$

which describe the position and attitude of the lens 209 looking at the reseau are converted through the image transform circuit 346 into the values of the lens 207 looking at the object image 104; these position and attitude values looking at the object image 104 are denoted as $X_o^i$, $Y_o^i$, $Z_o^i$, $\omega^i$, $\psi^i$, $\alpha^i$. Calibrations and conversions from the exterior orientation position coordinates $X_o^r Y_o^r$, $Z_o^r$, $\omega^r$, $\psi^r$, $\alpha^r$ to $X_o^i$, $Y_o^i$, $Z_o^i$, $\omega^i$, $\psi^i$, $\alpha^i$ are accomplished by three-dimensional translation and rotation, standard photogrammetric procedures using matrix arithmetic. These values of exterior orientation are then stored in a scan line and transform buffer 335 which will store up to ρ image lines where ρ will be between one and several hundreds.

The circuits of reseau processing system 337 can be implemented through the use of commercially available digital signal processors, such as a Texas Instruments 320C40. Alternatively, since the reseau signals are digitized by ADC 325 before they are transmitted to reseau processing system 337, a software algorithm implemented in a standard high-performance microprocessor can be used.

The output signals from the radiometric processing system 327 (image line pixel data) are combined with the data from the reseau processing system 337 (scan line transform data) and also stored in the scan line and transform buffer 335. This buffer is a fast, local temporary storage of the radiometrically corrected object image scan lines, e.g., twelve bits at a high resolution spacing of five microns, as well as the geometric data in the form of "exterior orientation" of each scan line. The exterior orientation information describes the orientation of the movable scan head 101 for each scan line. In other words, it contains the position (X, Y, Z) and orientation (α, ψ, ω) of the movable scan head 101 as determined while the movable scan head 101 is scanning the reseau 105. The combination of the output signals defines the image line's geometry.

The digital signal outputs from the scan line and transform buffer 335 are transmitted to the geometric processing system 347, which includes the pixel coordinate generator 349, the interpolation coefficient circuit 351, and the resampling circuit 353. This system 347 converts the input pixels to the desired output pixel swath which would have been detected had there been no geometric deviations in the position and attitude of the imaged pixels from an actual, true set of values. The difference between the actual scan head 101 position and attitude from the assumed ones is by $\Delta X$, $\Delta Y$, $\Delta Z$, α, ψ, and ω. In an ideal scanning situation, X, $\Delta Y$, $\Delta Z$, α, ψ, and ω are all equal to zero. In other words, the scanner 112 is in exactly the position and orientation that controller 301 has determined it that it is in. In reality, errors due to mechanical and other limitations will be introduced so that the scanner 112 deviates in position and orientation from the position and orientation that controller 301 has determined it to be in. This will be discussed in greater detail below. Thus position errors will be introduced in the X-axis 115 direction, Y-axis 119 direction, and Z-axis 117 direction. In addition, orientation or rotational errors will be caused by rotation of the scanner 112 around the X-axis (roll rotation), Y-axis (tip rotation), and Z-axis (yaw rotation). Despite the position and orientation errors, scanning apparatus 100 accordingly to this invention will create an output image that corresponds to the input image that would have been detected had the position and orientation errors not existed.

Figure 15A:
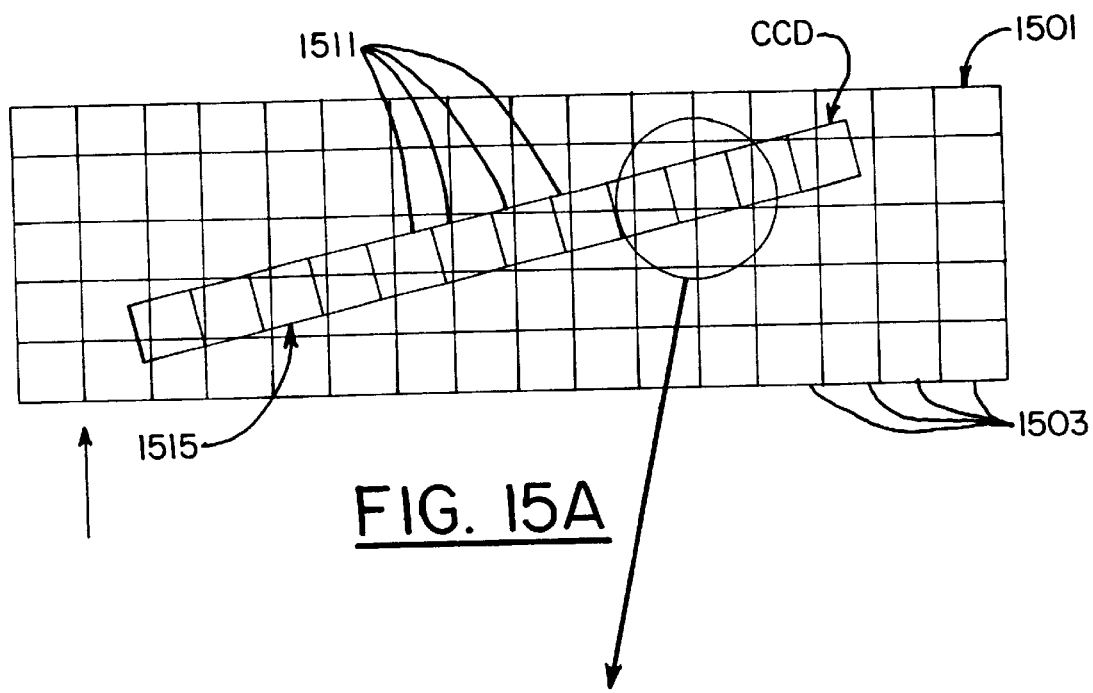
FIG. 15A is a representation of the overlap of the input pixel swath with the output pixel array.
Figure 15B:
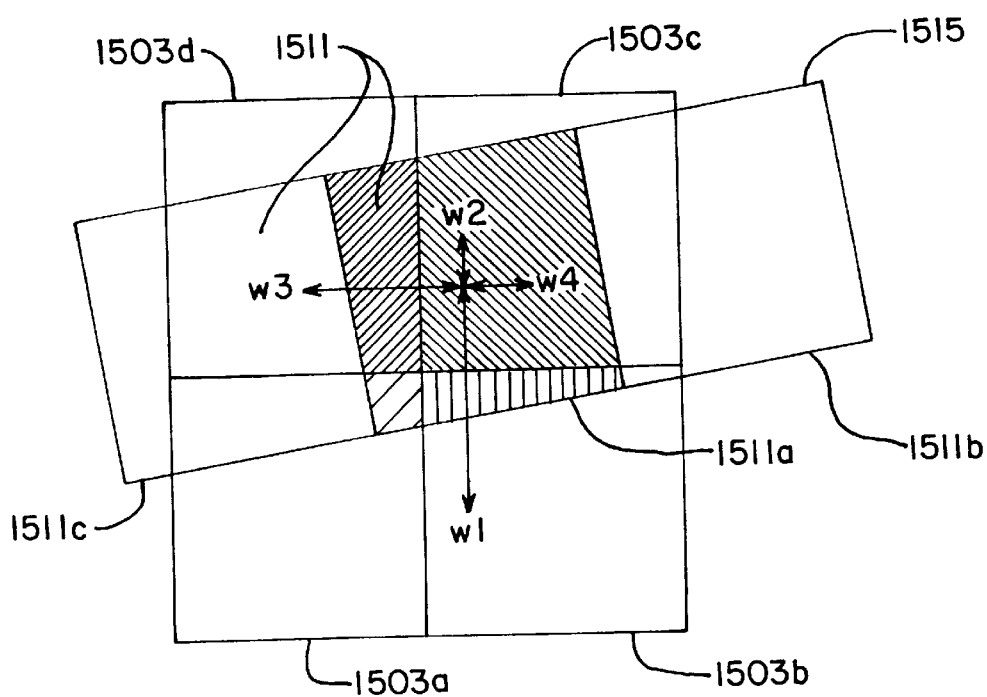
FIG. 15B is a representation of the transformation process from the input pixel swath with the output pixel array.

In FIG. 15A, the grid 1501 is the desired output array of pixels 1503. Had there been no geometric deviations between the position and attitude of the movable scan head 101 in its actual position and the position and attitude of the movable scan head 101 as determined by the controller 301, the pixels 1511 in the input scan line 1515 would be perfectly aligned with the pixels 1503 in the output array 1501. The geometric deviations are created when $\Delta X$, $\Delta Y$, $\Delta Z$, α, ψ, and ω are not all equal to zero. Therefore, as shown in FIG. 15B, each pixel 1511 in input scan line 1515 covers portions of four pixels 1503a–1503d on the desired output array 1501. Had there been no position or orientation errors, each pixel 1511 on the input scan line 1515 would completely cover one pixel 1503 on the output array 1501.

The signal from the scan line and transform buffer 335 transmitted to the pixel coordinate generator 349 contains the six position (X, Y, Z) and orientation (α, ψ, ω) values corresponding to the input scan line 1515. The pixel coordinate generator 349 then computes the input pixel's position on the output swath 1501 and which four output pixels 1503a–d the input pixel 1511 overlaps. It accomplishes this computation by using the exterior orientation values $\Delta X$, $\Delta Y$, $\Delta Z$, α, ψ, and ω for each nth pixel 1511 of input scan line 1515.

The information computed by the pixel coordinate generator 349 is transmitted to the interpolation coefficient circuit 351. The respective output pixel 1503 positions on the output swath 1501 of the remaining input pixels 1511 in between every nth pixel is interpolated from the information computed by the pixel coordinate generator 349 above for every nth input pixel 1511. The smaller the value of n, the higher the precision and detail of the final output image, since less interpolation of the output pixel 1503 position is done.

The output swath 1501 position information for every input pixel 1511 is transmitted from the interpolation coefficient circuit 351 to the resampling circuit 353. Gray value information for each of the input pixels 1511 is also transmitted to the resampling circuit 353 from the scan line and transform buffer 335.

The creation of the output pixel swath 1501 is accomplished by standard image processing methodology as described in handbooks on "Digital Image Processing" under the headings Image Warping, Image Resampling, or Forward Sampling. In a forward sampling method, the resampling circuit 353 computes the percentage of the single input pixel that corresponds to the four output pixels 1503 it overlaps. For example, in FIG. 15B, input pixel 1511a overlaps portions of each of the output pixels 1503a–1503d. Thus, the gray value associated with input pixel 1511a needs to be apportioned among the four output pixels 1503a–1503d in the same proportion as the geometric areas of the input pixel 1511a that overlap each output pixel 1503a–1503d. The gray value associated with input pixel 1511b will also be apportioned among four output pixels 1503, including output pixels 1503b and 1503c. Likewise, the gray value associated with input pixel 1511c will be apportioned among four output pixels 1503, including output pixels 1503a and 1503d. When the process is completed for one input scan line 1515, the process is repeated for the next successive input scan line and continues until all of the input scan lines and swaths are done.

Resampling circuit 353 keeps track of the sum of the gray values apportioned from input pixels 1511 to each output pixel 1503 and will not let an output pixel 1503 get a total computed gray value that exceeds the maximum possible actual value. Recalibration of all of the output pixels 1503 may be necessary in order to ensure that a single output pixel 1503 does not exceed the maximum allowable gray value.

The interpolated signals from the resampling circuit 353 are stored and formatted in an optional swath buffer and multiswath formatter 355. This constitutes a memory and programmed processor, preferably separate and independent from the scanner, viz., on a user host computer system where the desired user's image formats are created. Since there are many different formats (pixel, line, or sequential for color, TIFF, TGA, COT, GIF, DIF, etc.), the task of creating a deliverable output image format is best handled independently from the scanning process.

Optionally, however, a separate scanner reformatting element 355 can be meaningful if the scanner is operated in a stand-alone configuration with on-line data transfer to a user's host computer system.

A scanner interface 359 receives scanner command signals from a host machine and transmits the scanned pixel information. The scanner interface 359 is also coupled to the CCD controller 301.

Some of the elements of the system shown in FIG. 3 can be incorporated into a microprocessor controller. For example, the geometric processing system 347, the reseau processing system 337, the radiometric processing system 327, the scan line and transform buffer 335, the controller 301, the scanner interface 359, and the swath buffer and multiswath formatter 355, or any combination of these elements may be programmed into one or more commercially available microprocessors.

In order to understand more completely the errors created by lateral and rotational displacement of the scan head 101 of the scanner 112, it is helpful to refer to FIGS. 5A, 5B, 7A, and 7B. As discussed above, as the scan head 101 with the scanner 112 is moved in the X-axis 115 direction and the Y-axis 119 direction, its approximate position is calculated by controller 301 from inputs from stepper motor controls, electronic position sensors or other suitable position sensors, as described above. Due to mechanical limitations inherent to the movable components of scanning apparatus 100, errors are introduced that cause the true position of scanner 112 to deviate from the position calculated by controller 301. Such positional errors can create errors in the positional and compositional results of scanned object image 104, if they are not corrected. For example, the controller for scanner 112 might indicate that a certain pixel scanned on object image 104 is in one position on object image 104, when in fact it is in a different position on object image 104. Such errors can be created in both the X-axis 115 direction and the Y-axis 119 direction. Again, such errors are caused by many factors, including loose mechanical tolerance in drive or mounting mechanisms that allow small amounts of unintentional rotation of scan head 101 and/or scanner 112 about the X-axis (referred to as roll rotation ω), unintentional rotation of scanner 112 about the Y-axis (referred to as tip rotation ψ), and unintentional rotation of scanner 112 about the Z-axis (referred to as yaw rotation α). In addition, the errors can be created by loose tolerance in mechanical drives or in electrical sensors that allow imprecise or incorrect positioning of scan head 101 and/or scanner 112 in the X-axis 115 direction, Y-axis 119 direction, or Z-axis 117 direction. It is necessary, therefore, to calculate corrections to the positional and attitude information created by controller 301 so that the corrections can be made to the scanned object image 104.

As the fixed and immovable object image 104 and reseau 105 are scanned, therefore, the actual position and attitude of scanner 112 is determined relative to them. As discussed above, the difference between the position and attitude as determined by controller 301 and as determined by scanning the reseau 105 and measuring the scanner's 112 true position in relation to the reseau marks 106 is used to determine the exact position of the pixels on object image 104.

FIG. 5A and FIG. 5B illustrate some of the positional errors discussed above. In FIGS. 5A and 5B, NW/SE reseau marks 106 are indicated by 505a–505c, and SW/NE reseau marks 106 are indicated by 507a–507b. Controller 301 (not shown in FIG. 5A or FIG. 5B) has scan line 223 (FIG. 2) oriented relative to reseau 105 and reseau marks 106 as it theoretically should be in position 501. In reality, however, due to the errors introduced by the inherent mechanical limitations and tolerances of the moving components of scanning apparatus 100 and scanner 112 mounted therein, the actual orientation of scan line 223 relative to reseau 105 and reseau marks 106 is not position 501. FIG. 5A illustrates the errors that occur when the movable scan head 101 is unintentionally displaced laterally along the X-axis 115 direction or Y-axis 119 direction or both. FIG. 5B illustrates the errors that occur when the movable scan head 101 is unintentionally rotated around the Z-axis 117.

As shown in FIG. 5A, errors in both the X-axis 115 direction and the Y-axis 119 direction are created by the deviation of the actual scan line position 503 from the theoretical scan line position 501. The error along the X-axis 115 is ΔX while the error along the Y-axis 119 is ΔY. It is also possible to have errors along the Z-axis 117. Errors along the Z-axis 117 constitute the difference between what controller 301 has determined the distance between reseau 105 and photoreceptor array 215 to be and what the distance between reseau 105 and photoreceptor array 215 actually is. The error along the Z-axis 117 is manifested as a change in magnification of the scanned object image 104. When the situation illustrated in FIG. 5A occurs, the actual scan line position 503 is laterally displaced along the X-axis 115 and the Y-axis 119, but not rotationally displaced about the Z-axis 117, from theoretical position 501.

FIG. 5B illustrates the situation when the actual scan line position 503 is rotationally displaced about the Z-axis 117 (yaw rotation α), but not laterally displaced along the X-axis 115 or Y-axis 119. In FIG. 5B, scan line 223, as theoretically oriented in position 501, intersects the SW/NE reseau marks 507a–507b and the NW/SE reseau marks 505a–505c. The distance between the intersections of this theoretical position 501 and the SW/NE reseau marks 507a–507b is shown as $u_0$, while the distance between the intersections of this theoretical position 501 and the NW/SE reseau marks 505a–505c is denoted as $v_0$. The values for $u_0$ and $v_0$ would be preset by the user or manufacturer during creation and manufacture of the reseau 105. Scan line 223, as actually oriented in position 503, also intersects the SW/NE reseau marks 507a–507b and the NW/SE reseau marks 505a–505c. The distance between the intersections of this actual position 503 and the SW/NE reseau marks 507a–507b is shown as U, while the distance between the intersections of this actual position 503 and the NW/SE reseau marks 505a–505c is denoted as V.

As shown in FIG. 5B, the rotation of scanner 112, and hence the rotation of the movable scan head 101, about the Z-axis (the yaw rotation) creates an angle α between scan line 223 in the theoretical position 501 and scan line 223 in the actual position 503. This rotation creates an error ΔX' in the X-axis 115 direction and an error ΔY' in the Y-axis 119 direction.

The errors illustrated in FIG. 5A and FIG. 5B can happen simultaneously. That is, the movable scan 101 can be laterally displaced along the X-axis 115 or Y-axis 119 and simultaneously rotationally displaced about the Z-axis 117 (yaw rotation). In addition, lateral displacement along the Z-axis 117 and/or rotational displacement about the X-axis 115 (roll rotation) or Y-axis 119 (tip rotation) may also occur. Therefore, a rigorous and simultaneous correction of all lateral and rotational displacement errors is necessary and the method for doing so is provided in the discussion accompanying equations (2)–(29).

Figure 7B:
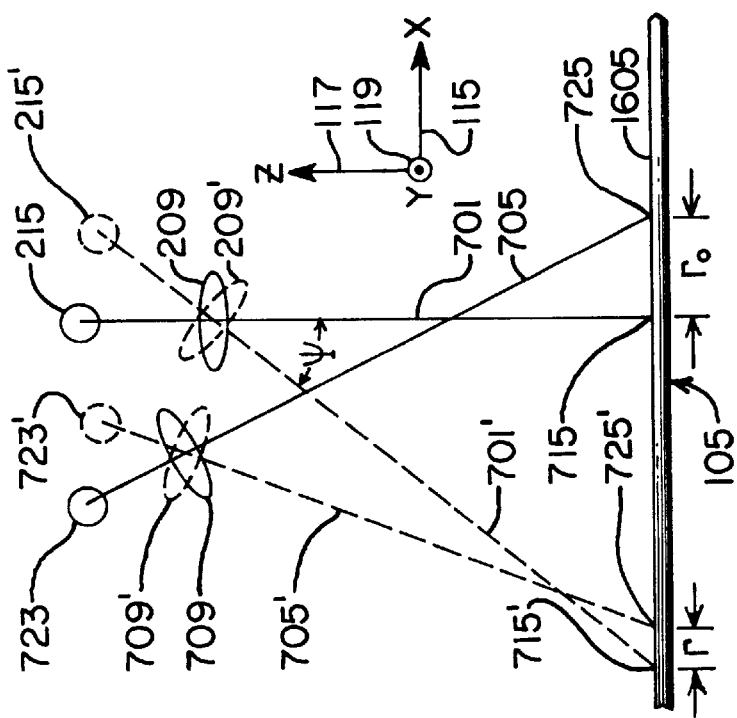
FIG. 7B is a line drawing showing one embodiment to detect tip rotation.
Figure 7A:
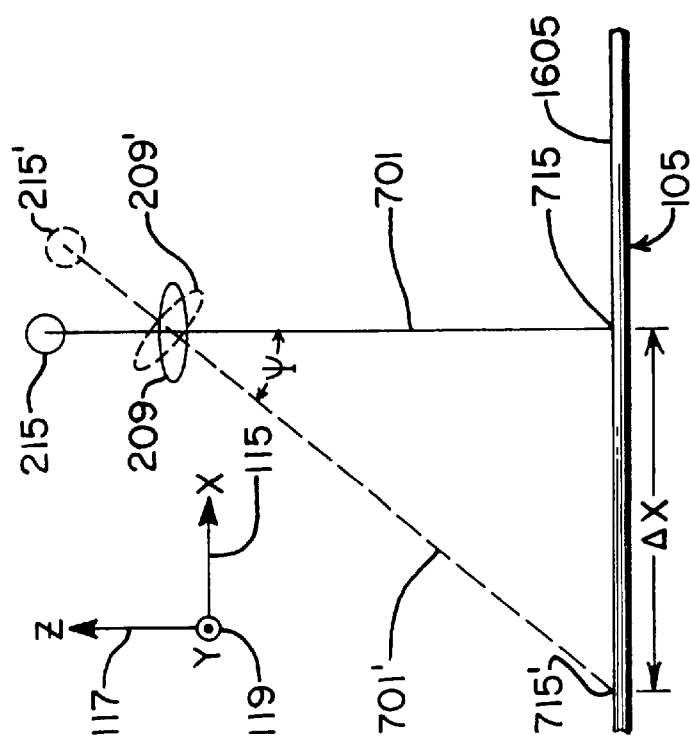
FIG. 7A is a line drawing showing the effect of tip and its detection.

FIGS. 7A and 7B illustrate that rotation of scanner 112 and scan head 101 about the Y-axis 119 (referred to as tip rotation $\psi$) also creates an error in the X-axis 115 direction. In FIG. 7A, the end of the CCD photoreceptor array 215 above the reseau 105 is shown in diagrammatic elevational view wherein reseau 105 is in the plane 1605 perpendicular to the plane of the paper containing FIG. 7A, and the Y-axis 119 direction is also perpendicular to the plane of the paper containing FIG. 7A. In the ideal condition, photoreceptor array 215 is in exactly the position controller 301 (FIG. 3) believes it to be in. Therefore, light ray 701 (or the absence of a light ray, if a reseau mark 106 is present) in this ideal condition passes through a pixel 715 reseau 105 and then through lens 209 in the Z-axis 117 direction perpendicular to the plane 1605 of the reseau 105 to the CCD photoreceptor array 215 where it is detected. If, however, scanner 112 is slightly rotated about a Y-axis 119 an angle of $\psi$ degrees (the tip angle) due to loose mechanical tolerance, as described above, photoreceptor array 215 will actually be slightly displaced into an offset position indicated by 215', as illustrated in FIG. 7A, and lens 209 will be slightly rotated into position 209'. Likewise, light ray 701 will be slightly displaced into position 701'. The arrows 115, 117, 119 of the X, Y, Z coordinate system illustrated in FIG. 7A are for the purpose of showing directional orientation the same as the orientation of FIGS. 1 and 2. Therefore, reference to rotation of the scanner 112 about a Y-axis extending in the Y-axis 119 direction refers to an axis of rotation that extends through, for example, the lens 209, not necessarily coincident with the Y-axis arrow 119 in the coordinate system indicator in FIG. 7A. Also, the diagrammatic rotation or tip angle $\psi$ is exaggerated in FIG. 7A over what would actually be expected for purposes of clarity. If controller 301 is not aware of the rotation, an error, called the tip error, is created along the X-axis and is denoted by $\Delta X$ in FIG. 7A. Instead of light ray 701 emanating through the pixel 715 plane 1605 of reseau 105 being detected by CCD photoreceptor array 215 for the position of the photoreceptor array 215 that controller 301 has determined it to be in, a different light ray 701 passing through a different pixel 715' on plane 1605 of reseau 105 is detected. This error would create inaccurate pixel information for the pixel 715' on reseau 105, because the controller 301 would have determined that pixel 715 was being scanned. Consequently, it is important to be able to distinguish between a $\Delta X$ error created by the tip angle $\psi$, and the $\Delta X$ and $\Delta X'$ errors illustrated in FIGS. 5A and 5B and discussed above, since different correction methods are used for each type of error. More specifically, the correction factor used for the error created by the tip angle $\psi$ is applied in the opposite direction in the object image from the correction factor used for $\Delta X$ and $\Delta X'$ errors illustrated in FIGS. 5A and 5B. In other words, if an error caused by the tip angle $\psi$ is incorrectly determined to be caused by the $\Delta X$ and $\Delta X'$ errors illustrated in FIGS. 5A and 5B, the correction factor for the scan head 101 in the X-axis 115 direction would be applied in the wrong direction.

It is possible to detect the tip error $\Delta X$ of FIG. 7A independently of the other $\Delta X$ and $\Delta X'$ error of FIGS. 5A and 5B by modifying scanner 112, as illustrated in FIG. 7B. In this embodiment, in addition to CCD photoreceptor array 215 and lens 209, a second CCD photoreceptor array 723 and a separate lens 709 are used to scan reseau 105 simultaneous with the scan by CCD photoreceptor array 215 and lens 209. This second CCD photoreceptor array 723 and second lens 709 are also mounted in scanner 112, with second CCD photoreceptor 723 being parallel to the first CCD photoreceptor array 215. However, the second CCD photoreceptor 723 is positioned so that it would scan a pixel 725 that is $r_0$ distance away in the X-axis 115 direction from the pixel 715 that would be scanned by photoreceptor array 215, if there was no tip rotation $\psi$, as described above. In such ideal condition, the first CCD photoreceptor array 215 and the second CCD photoreceptor array 723 would be in exactly the positions that controller 301 believes them to be in. Therefore, in the ideal condition, light ray 701 would pass through a pixel 715 in the plane 1605 of reseau 105 and then through lens 209 to where it is detected by the first CCD photoreceptor array 215. The ray 701 can, but does not have to, be perpendicular to plane 1605 of reseau 105, as illustrated in FIG. 7B. At the same time, another light ray 705 passes through a pixel 725 in the plane 1605 of reseau 105 and then linearly through lens 709 to where it is detected by the second CCD photoreceptor 723. If, however, scanner 112 is rotated about a Y-axis an angle of $\psi$ degrees (the tip angle), the first CCD photoreceptor array 215 will be displaced into the position indicated by 215'. Lens 209 will be displaced into position 209'. In addition, the second CCD photoreceptor array 723 will be displaced into position 723', and lens 709 will be displaced into position 709'. Light ray 701' from pixel 715' instead of light ray 701 from pixel 715, will be detected by the first CCD detector array 215 in the displaced position 215' and light ray 705' from pixel 725' instead of light ray 705 from pixel 725. These displacements will cause the measured distance in the X-axis 115 direction between the pixel 715' and 725' detected from respective light rays 701' and 705' to become r instead of the $r_0$ distance between the pixel 715 and 725. The tip angle $\psi$ can be determined from the value of r, since each possible value of r has a corresponding tip angle $\psi$. Also, if r in FIG. 7B has a value that is larger than $r_0$, scanner 112 rotation about a Y-axis is counterclockwise. If r has a value that is less than $r_0$, scanner 112 rotation about a Y-axis is clockwise.

Figure 10A:
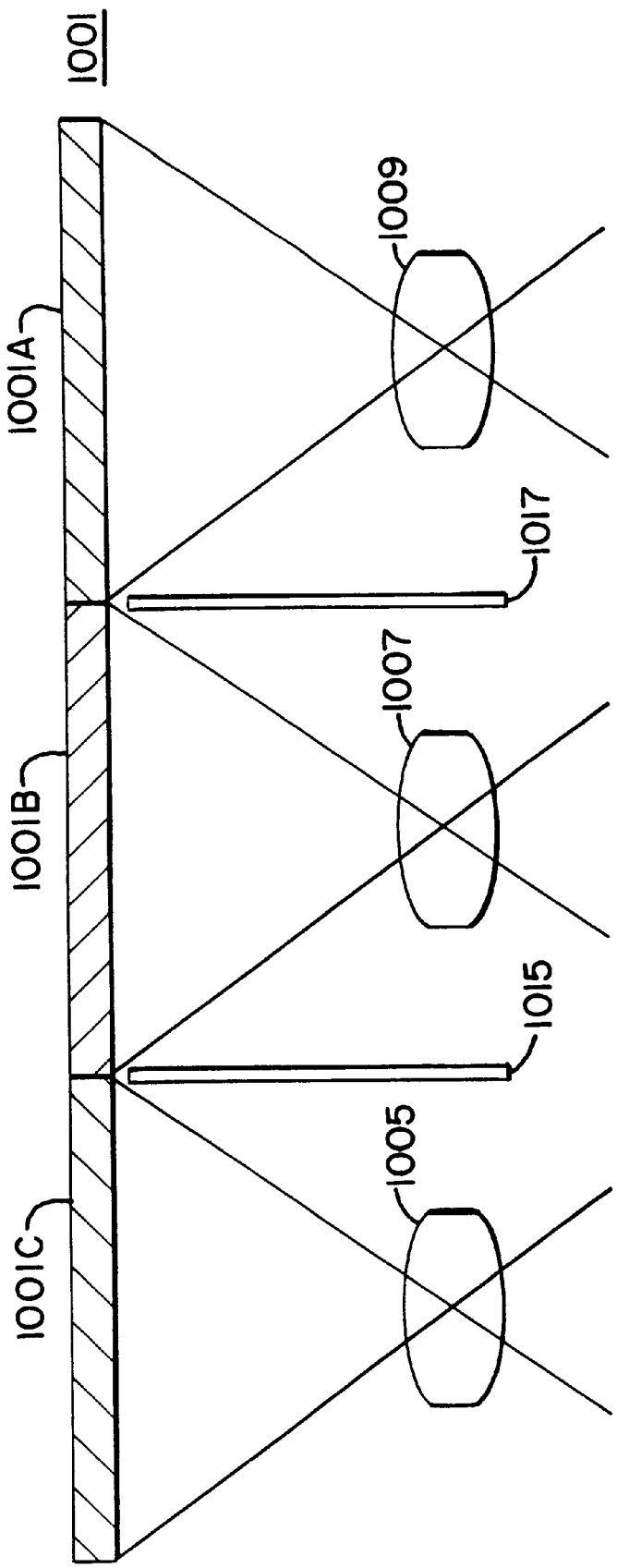
FIG. 10A is a representation of a multiple optic scanning system for distinguishing between tip $\Delta\psi$ and translation $\Delta X$ errors.
Figure 10B:
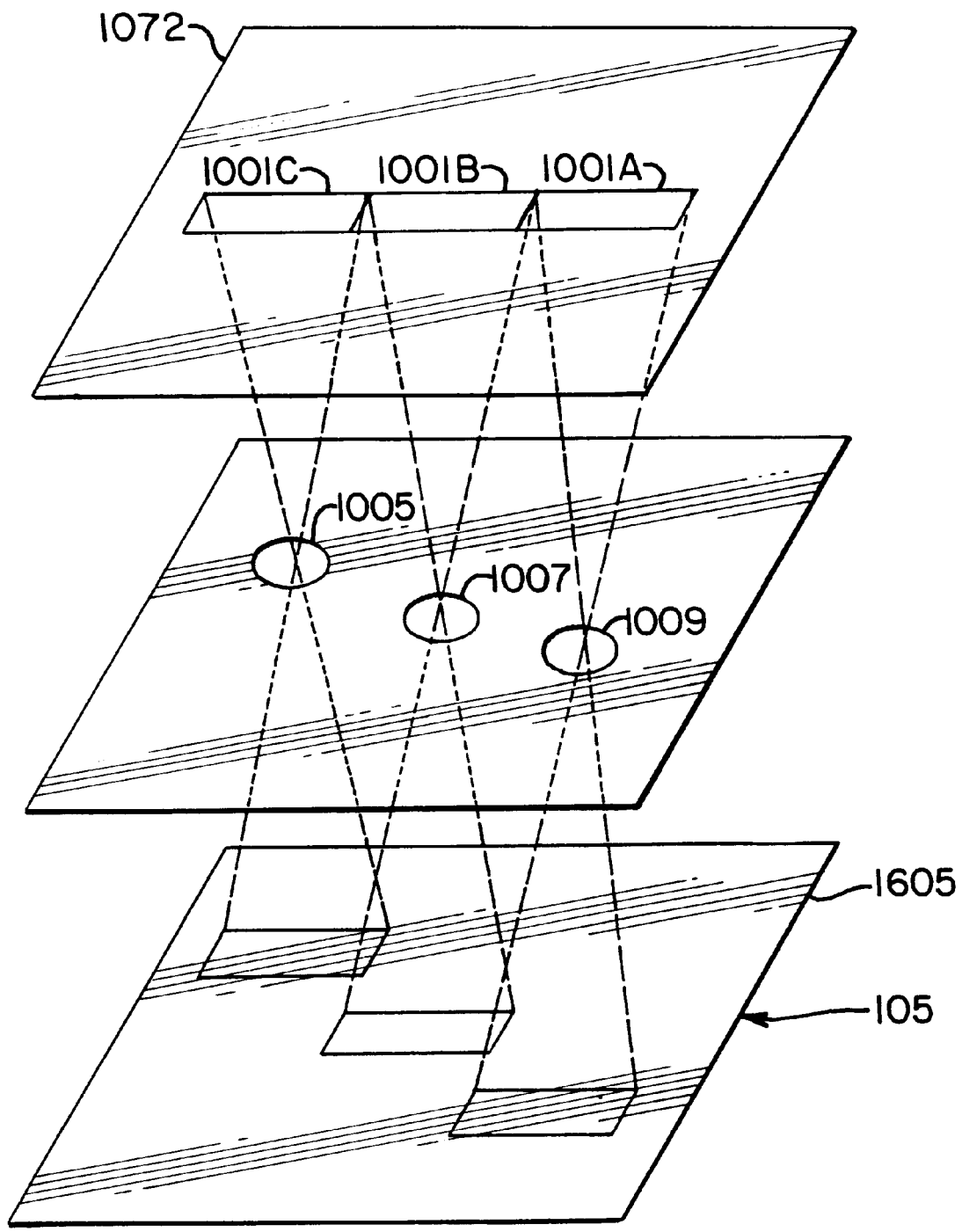
FIG. 10B is a second representation of a multiple optic scanning system for distinguishing between tip $\Delta\psi$ and translation $\Delta X$ errors.

An implementation of a dual (or even triple) line reseau imaging element to provide the tip rotation detection ability described above incorporates the use of a single element line array with two (or three) lens systems, as illustrated in FIGS. 10A and 10B. In FIG. 10A, a single photoreceptor array 1001 is used and includes three noncontiguous photoreceptor segments, 1001A, 1001B, and 1001C in the reseau plane. The photoreceptor array 1001 might comprise, for example, 6,000 (CCD) photoreceptor elements with segments 1001A, 1001B, and 1001C having 2,000 CCD photoreceptor elements each. Photoreceptor array 1001B is positioned between opaque shield 1015 and opaque shield 1017.

There are three separate lenses, 1005, 1007 and 1009, which focus the reseau image onto photoreceptor segments 1001A, 1001B, and 1001C respectively. Lens 1007 is positioned to focus the reseau 105 image onto photoreceptor segment 1001B. As shown in FIG. 10B, photoreceptor segments 1001A, 1001B, and 1001C are contiguous and lie in the same plane. Likewise, lenses 1005, 1007, and 1009 lie in the same plane.

Opaque shield 1017 (not shown in FIG. 10B) is perpendicular to the plane containing photoreceptor array 1001 and is positioned such that light rays passing through lens 1007 are not detected by photoreceptor segment 1001A, and light rays passing through lens 1009 are not detected by photoreceptor segment 1001B. Similarly, opaque shield 1015 (not shown in FIG. 10B) is perpendicular to the plane containing photoreceptor array 1001 and is positioned such that light rays passing through lens 1007 are not detected by photoreceptor segment 1001C, and light rays passing through lens 1005 are not detected by photoreceptor segment 1001B. Neither opaque shield 1015 nor opaque shield 1017 are in direct contact with photoreceptor array 1001.

Photoreceptor array 1001, lenses 1005, 1007, and 1009, and opaque shields 1015 and 1017 are rigidly and immovably fixed in relation to each other by an optical head frame (not shown) similar to those described above.

The lens system shown in FIGS. 10A and 10B operates in a manner similar to that of the lens system discussed above and shown in FIGS. 7A and 7B to detect rotation of the scanner 112 around a Y-axis (tip rotation). That is, any rotation of the lens system around a Y-axis (tip rotation) will create measurable displacement error r, which corresponds to a particular tip angle $\psi$. See FIG. 7B and related discussion above. In operation, the three lenses 1005, 1007, and 1009 focus the reseau image onto photoreceptor segments 1001C, 1001B, and 1001A respectively. Like photoreceptor arrays 211 and 215 discussed above, each CCD photoreceptor element in photoreceptor array 1001 generates an electric signal in proportion to the amount of light detected by the CCD photoreceptor element. The signals generated are analyzed and processed in the same manner as that discussed above.

Figure 10C:
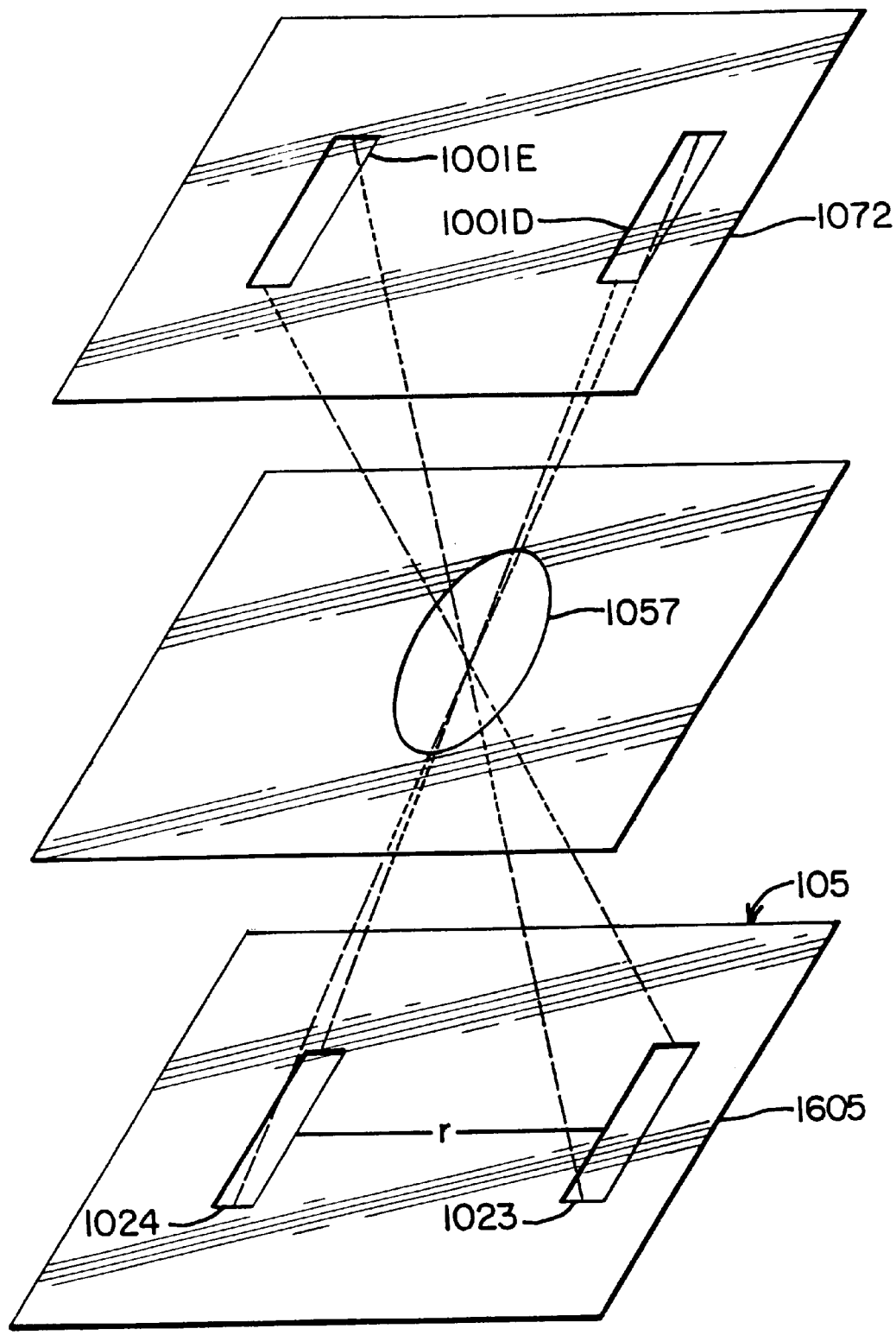
FIG. 10C is a third representation of a multiple optic scanning system for distinguishing between tip $\Delta\psi$ and translation $\Delta X$ errors.

Another preferred embodiment of the present invention that detects rotation around a Y-axis (tip rotation) is shown in FIG. 10C. Photoreceptor segments 1001D and 1001E lie in the same plane 1072 above lens 1057. Reseau 105 lies in a plane 1605 below lens 1057. The lens 1057 and photoreceptor segments 1001D and 1001E are held by a scanner frame (not shown in FIG. 10C, but similar to the scanner 112 in FIG. 2) in a rigid, fixed, relationship with each other. The system shown in FIG. 10C operates in a similar fashion to the system shown in FIG. 7B and described above. In normal operation, there is a distance r between the swath 1023 scanned by photoreceptor segment 1001E and the swath 1024 scanned by photoreceptor 1001D. Rotation of the scanner 112 about a Y-axis (tip rotation) win cause displacement of the swaths 1023 and 1024, thus causing a measurable change in the distance r with corresponds to a specific tip angle $\psi$ of rotation about the Y-axis. The signal processing is done in a similar manner as that described above.

This embodiment in FIG. 10C has several advantages over the previous embodiment shown in FIG. 10B. Primarily, since it requires fewer components, the cost, the complexity, and the size of the scanning apparatus is reduced.

Figure 10D:
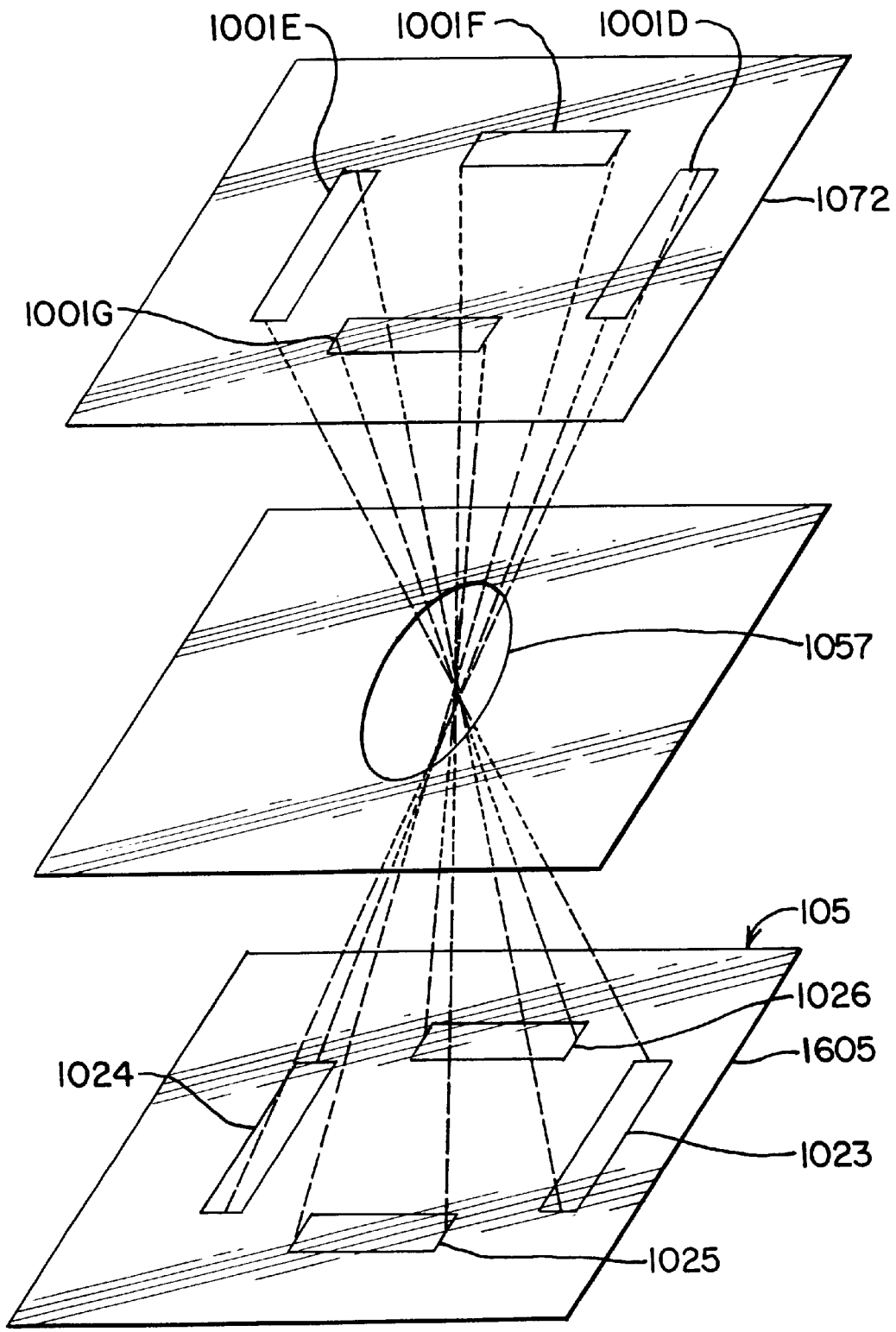
FIG. 10D is a fourth representation of a multiple optic scanning system for distinguishing between tip $\Delta\psi$ and translation $\Delta x$ errors that also distinguishes between roll $\Delta\omega$ and translation $\Delta y$ errors.

It should be noted that a problem similar to the problem discussed above for $\Delta X$ errors caused by lateral displacement and of the scan head 101 along the X-axis 115 and rotational displacement of the scan head 101 about the Y-axis 119 also exists for $\Delta Y$ errors. The $\Delta Y$ errors can be caused by rotational displacement of the scan head 101 about the X-axis 115 (referred to as roll rotation $\omega$) and lateral displacement of the scan head 101 along the Y-axis 119. As previously discussed above for $\Delta X$ errors, it is important to be able to distinguish between a $\Delta Y$ error created by the roll rotation w of the scan head 101 about the X-axis 115 and lateral displacement of the scan head 101 along the Y-axis 119. The problem can be solved by, for example, adding additional photoreceptor segments 1001F, 1001G to the photoreceptor segments 1001D, 1001E shown in FIG. 10C to obtain the lens system shown in FIG. 10D. The photoreceptor segments 1001F, 1001G and the scan lines 1025, 1026 work in a similar fashion to the photoreceptor segments 1001D, 1001E and the scan lines 1023, 1024 described above. Alternatively, the photoreceptor segments 1001D, 1001E can be oriented (not shown) so that they are able to detect both tip rotation $\psi$ and roll rotation $\omega$ of the scan head 101. Other lens configurations are also possible that can detect both tip rotation $\psi$ and roll rotation $\omega$ of the scan head 101.

An alternative embodiment for mounting the reseau 105 out of the optic path of the object image 104 scanner is illustrated diagrammatically in FIG. 6. A frame 601 rigidly holds the object 103, which contains the object image 104 and the reseau 105, which further contains the reseau marks 106, in a fixed and immovable spatial relationship to each other, preferably in the same plane for this embodiment. Scanner carrier 607 includes optics system 609 and optics system 611. Optics system 611 includes lens 207 and photoreceptor array 211 and is similar in design to the optical systems described above for FIG. 2. Likewise, optics system 609 includes lens 209 and photoreceptor array 215. Scanner carrier 607 holds optics system 611 in a fixed position in relation to optics system 609. Optics system 611 scans object image 104 while optics system 609 simultaneously scans reseau 105 in manner similar to that described above for FIGS. 1 and 2. The signal processing and error correction are done in a manner similar to that discussed above.

Figure 8:
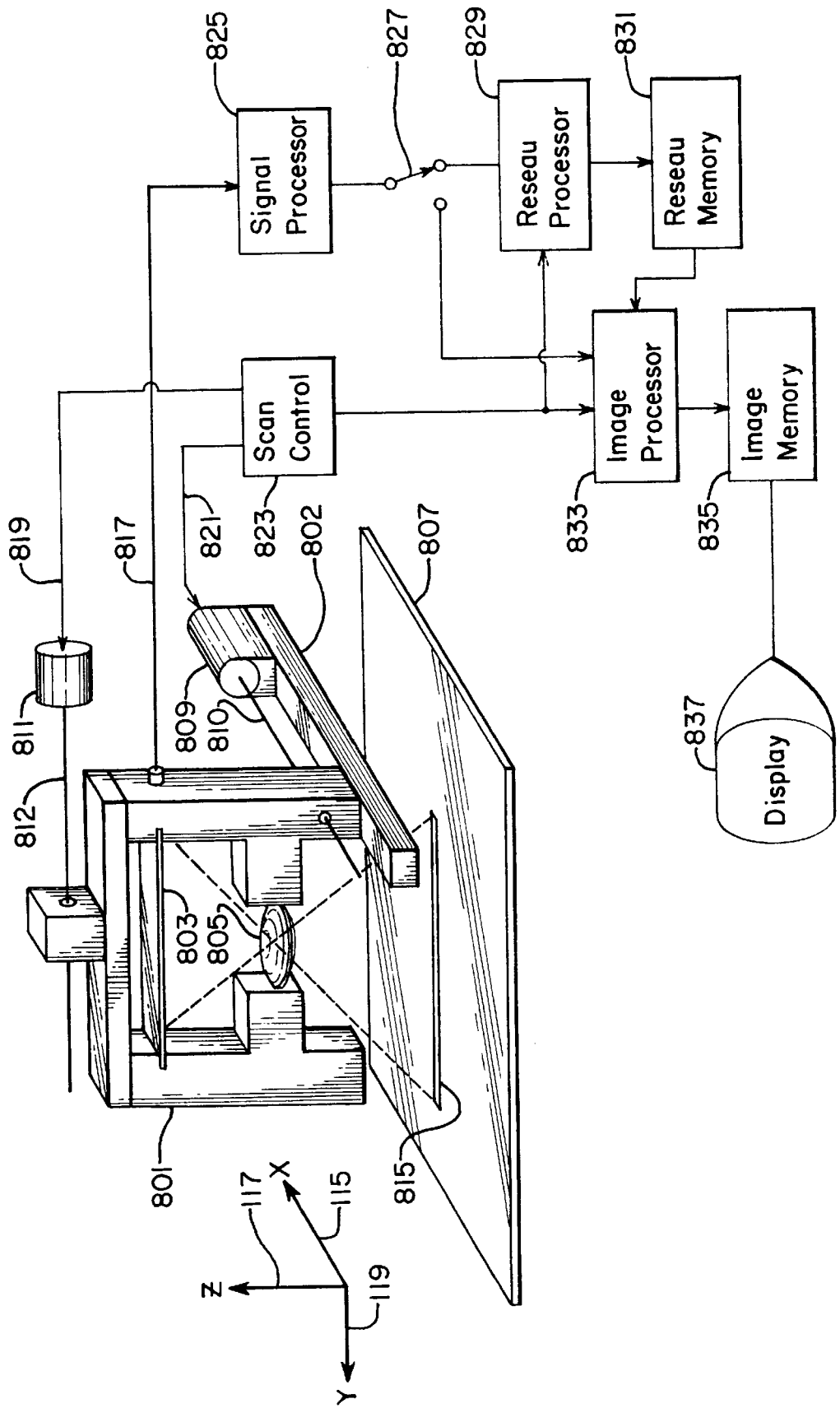
FIG. 8 is a block diagram of a single scan arrangement for storing errors in the scan optics positioning and reseau errors.

Another embodiment of the present invention that will prevent the image of the reseau marks 106 from overlaying the scanned object image 104 is illustrated in FIG. 8. A movable frame 801 includes a linear photoreceptor 803 and a lens system 805. Movable frame 801 is moved in the Y-axis 119 direction by a computer controlled stepper motor 811 using a threaded rod 812 bearing nut 813 and in the X-axis 115 direction by a computer controlled stepper motor 809 using a threaded rod 810 and bearing nut 814. Motor 809 and threaded rod 810 are mounted on a part 802 of movable frame 801. The lens system 805 focuses a scan line 815 from an imaging plane 807 as movable frame 801 is controlled and moved by a scan control 823. Scan control 823 controls and operates the motor 811 via a cable 819, and it operates the motor 809 via a cable 821. Example bearing and drive mechanisms for moving the moveable frame 801 in the X-axis 115 direction and for moving the movable frame 801 in the Y-axis 119 direction can include worm gear and follower components driven by stepper motors similar to those shown and described above for FIGS. 1 and 2 and those in U.S. Pat. No. 4,928,169, which is incorporated herein by reference, or by any other suitable mechanisms and components.

Signals from the photoreceptor array 803 are transmitted to a signal processor 825 by a cable 817. The signal processor 803 conditions the signals, correcting for the effects and errors of the position of movable frame 801 as previously described for FIGS. 1, 2, 3, 4, 5, and 7. The conditioned signals are transmitted to a switch 827 and then transmitted to either reseau processor 829 or image processor 833, depending on whether the reseau 105 or the object image 104 respectively is being scanned.

Initially, a reseau 105 is placed in the image plane 807, and the switch 827 is positioned to allow transmission of the signals from the photoreceptor 803 to a reseau processor 829. The reseau 105 is then scanned, as described above, and information regarding the actual position of movable frame 801 in relation to the reseau 105 is transmitted to reseau processor 829. Reseau processor 829 also receives position signals from scan control 823 that contain information regarding the position of movable frame 801, as calculated by scan control 823. This information enables reseau processor 829 to determine the deviation between the actual position of movable frame 801 and the position of movable frame 801 that has been determined by scan control 823. The reseau processor 829 then computes and stores a map of positional errors of the movable frame 801 in reseau memory 831. The map of positional errors of the movable frame 801 contains the repeatable (thus systematic) errors of the movable frame 801 which will be used when an object 103 is placed in the scanning plane 807 and replaces the reseau 105. The map of positional errors does not, however, contain the random (non-repeatable) errors that occur during movement of the movable frame 801.

After the reseau 105 has been scanned, the reseau 105 is removed and an object 103 is placed in the scanning plane 807. The switch 827 is positioned to allow the transmission of the signals from the signal processor 825 to an image processor 833. The object image 104 on the object 103 is then scanned as described above and information regarding the actual position of movable frame 801 is transmitted to image processor 833. Image processor 833 also receives position signals from scan control 823 that contain information regarding the position of movable frame 801 as calculated by scan control 823. In addition, image processor 833 retrieves the positional error signals created from the prior scan of the reseau from the reseau memory 831. The positional error signals are used to correct the positional signals generated by scan control 823 to ensure that the object image is accurately scanned. The correction methods used are similar to those described above and are well known in the art.

The corrected image pixel information is then stored in an image memory 835 which can be used by a utilization device such as a display system 837 for measurements, viewing, and other applications.

The reseau 105 and object image 104 are considered to be imaged sufficiently close in time such that error sources which may change with time, e.g., ambient temperature, can be considered constant. Thus, the corrections normally supplied simultaneously with the scanning of the object image 104 as described above in relation to FIGS. 1, 2, and 3 are simulated by scanning the reseau 105 separately and storing the results, which are then used for scanning the object image 104.

Another embodiment employs the reseau image to compute corrections to the object image and stores those corrections as a calibration table. Any subsequent object images are then corrected using the values contained in the calibration table. Such corrections represent the repeatable (thus systematic) errors of the scan head geometry, but ignores the random errors which do not repeat.

Figure 11A:
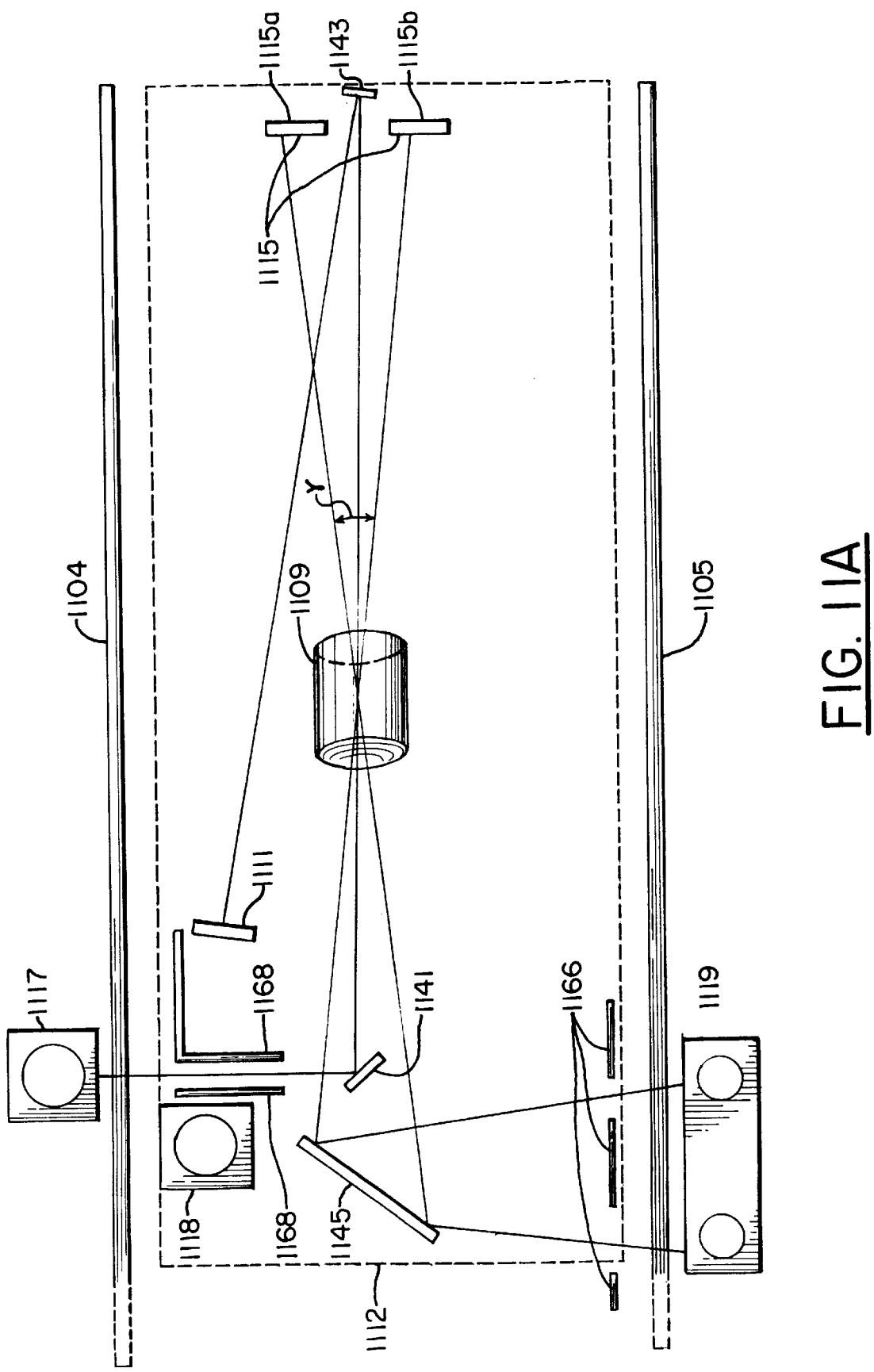
FIG. 11A is a representation of an alternative scanner utilizing folded optics and a single lens to reduce the overall dimensions of the invention.

In another embodiment 1112 of the scanner of this invention is shown diagrammatically in FIG. 11A, wherein the physical dimensions of scanner 1112 are reduced by folding the optics. This reduction in size is accomplished by coupling the optical system that scans the reseau 1105 and the optical system that scans object image 1104. In addition, mirrors 1141, 1143, and 1145 are used to alter the optical paths of the light rays detected by the object image photoreceptor array 1111 and by the reseau photoreceptor array 1115 such that the over-all dimensions of scanner 1112 are reduced. In this embodiment 1112, only a single lens 1109 is used.

Object image backlight 1117 illuminates the object image 1104, while reseau backlight 1119 illuminates the reseau 1105. Alternatively, object image 1104 can be illuminated by object image frontlight 1118.

The frame and the supporting structure for the lens 1109, mirrors 1141, 1143 and 1145, and photoreceptor arrays 1115 and 1111 are not shown in the diagrammatic view of FIG. 11A. The methods and materials for constructing a frame and optical supporting structure for this embodiment of scanner 1112 are within the capabilities of persons skilled in the art once the principles of this invention and the structures described above are understood or known. In diagrammatic FIG. 11A, the object image 1104 and reseau 1105 are considered to be fixed in a rigid position by such a frame (not shown). Likewise, lens 1109, mirrors 1141, 1143, and 1145, and photoreceptor arrays 1111 and 1115 are considered to be rigidly fixed within the frame.

Mirror 1145 is positioned such that light rays emanating from reseau backlight 1119 and passing through reseau 1105 reflect off mirror 1145 in such a direction that they pass through lens 1109 and then are detected by photoreceptor array 1115. Light rays that strike mirror 1145 which do not emanate from reseau backlight 1119 are not reflected through lens 1109 and are not detected by photoreceptor array 1115.

Mirrors 1141 and 1143 are positioned such that light rays emanating from object image backlight 1117, or object image frontlight 1118 passing through or reflecting from object image 1104, reflect off mirror 1141 in such a direction that they also pass through lens 1109 and reflect off mirror 1143 and then are detected by photoreceptor array 1111. Light rays that strike mirror 1141 or mirror 1143 which did not emanate from object image backlight 1117 or object image frontlight 1118 are not reflected through lens 1109 and they are not detected by photoreceptor array 1111.

Diaphragm 1166 completely blocks some of the light rays emanating from reseau backlight 1119 and passing through reseau 1105. More specifically, some of the light rays emanating from backlight 1119 and passing through reseau 1105 could, upon reflecting off mirror 1145 and passing through lens 1109, be further reflected off of mirror 1143 and detected by photoreceptor array 1111 instead of being detected by photoreceptor array 1115. Diaphragm 1166 blocks those light rays emanating from reseau backlight 1119 that would otherwise strike mirror 1143 and be detected by photoreceptor array 1111 if they were allowed to propagate. Therefore, all of the light rays emanating from reseau backlight 1119 and passing through reseau 1105 and diaphragm 1166 reflect off of mirror 1145, pass through lens 1109, and are detected by photoreceptor array 1115. Diaphragm 1166 also ensures that extraneous or spurious light rays that might otherwise strike mirror 1143 or pass through lens 1109 are not allowed to propagate into scanner 1112. Using the two photoreceptor segments 1115$a$ and 1115$b$ to comprise photoreceptor array 1115 provides for the detection of scanner 1112 rotation as described above in relation to FIGS. 7B, 10A, 10B, and 10C.

In a similar manner to diaphragm 1166, diaphragm 1168 completely blocks some of the light rays emanating from object image backlight 1117 and passing through object image 1104. This ensures that only light rays emanating from object image backlight 1117 and passing through object image 1104 that will strike mirror 1141 are allowed to propagate into scanner 1112 and that extraneous or spurious light rays that might otherwise strike mirror 1143 or pass through lens 1109 are not allowed to propagate into scanner 1112.

Like photoreceptor arrays 211 and 215 discussed above, each photoreceptor element 212 in photoreceptor array 1111 and photoreceptor array 1115 generates an electric signal in proportion to the amount of light detected by the photoreceptor element 212. The signals generated are analyzed and processed in a similar manner as that discussed above.

Figure 11B:
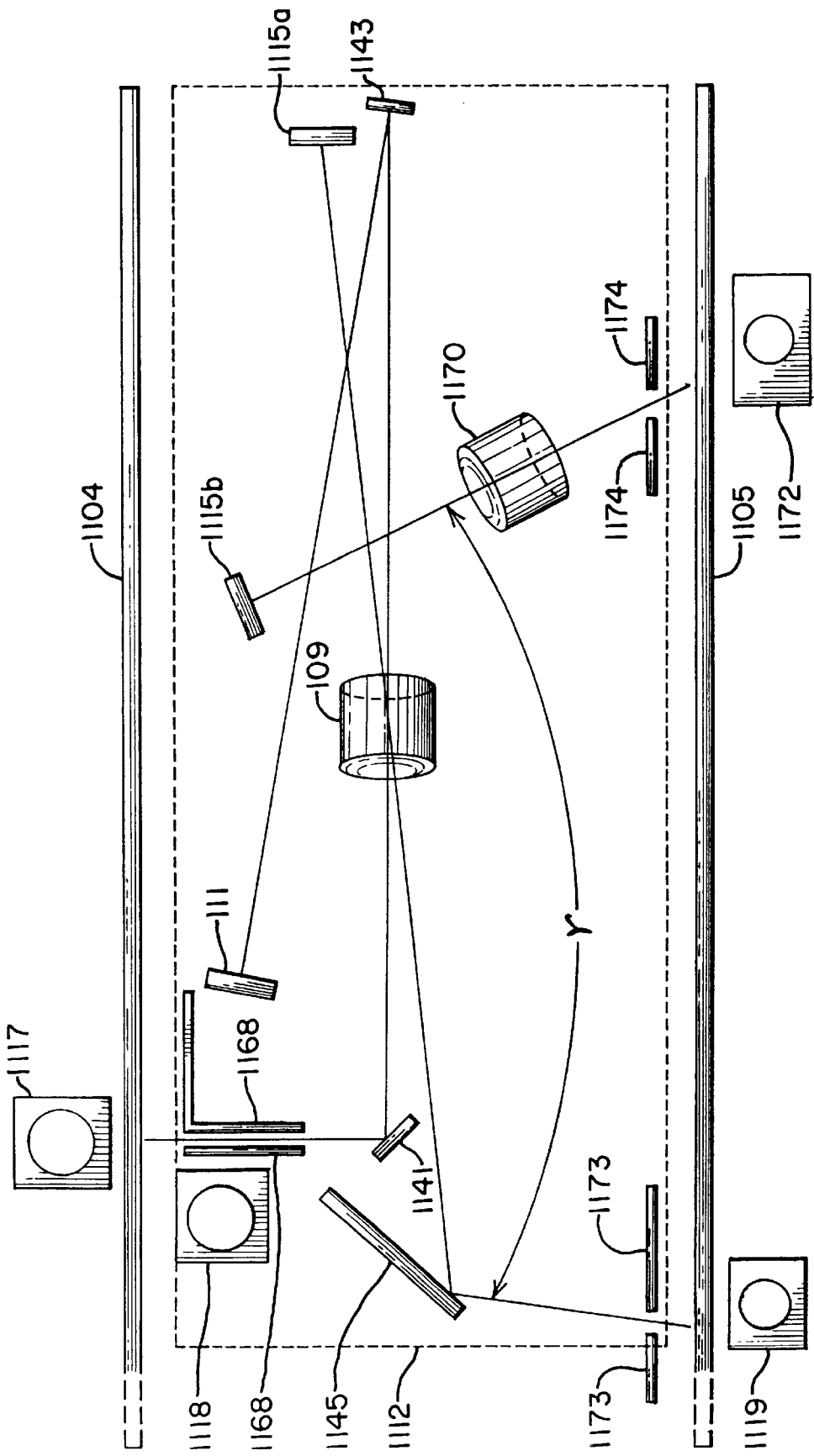
FIG. 11B is a representation of an alternative scanner utilizing folded optics and two lenses to reduce the overall dimensions of the invention, while increasing the angle under which the reseau is being scanned.

In the embodiment 1112 of the scanner of this invention shown diagrammatically in FIG. 11A, wherein the physical dimensions of scanner 1112 are reduced by folding the optics, it is desirable and preferred to have the angle γ formed between the photoreceptor segments 1115a, 1115b and the lens 1109 be as large as possible in order to better distinguish between errors caused by lateral displacement of the scan head 101 and rotational displacement of the scan head 101. Preferably, the angle γ is greater than forty-five degrees and is optimally approximately ninety degrees. The angle γ can be enlarged, as shown in FIG. 11B, by including a second lens 1170 and an additional reseau backlight 1172 to illuminate the reseau 1105, and by changing the diaphragm 1166 to the diaphragm 1173 to reduce the light emanating from the reseau backlight 1119 that passes through the reseau 1105 and reflects off of the mirror 1145. The reseau backlight 1119 can also be shortened, as shown in FIG. 11B.

In this embodiment, the mirror 1145 is positioned such that light rays emanating from reseau backlight 1119 and passing through the reseau 1105 reflect off the mirror 1145 in such a direction that they pass through the lens 1109 and then are detected by photoreceptor array 1115a. Light rays that strike the mirror 1145 which do not emanate from the reseau backlight 1119 are not reflected through the lens 1109 and are not detected by the photoreceptor array 1115a. In addition, light rays emanating from the reseau backlight 1172 pass through the lens 1170 and are detected by the photoreceptor array 1115b. In a similar manner to the diaphragm 1166 discussed above, the diaphragm 1173 completely blocks some of the light rays emanating from the reseau backlight 1119 and passing through the reseau 1105. Likewise, the diaphragm 1174 completely blocks some of the light rays emanating from the reseau backlight 1172 and passing through the reseau 1105. With the addition of the lens 1170, the angle My shown in FIG. 11B is now considerably larger than the angle γ shown in FIG. 11A.

Figure 12:
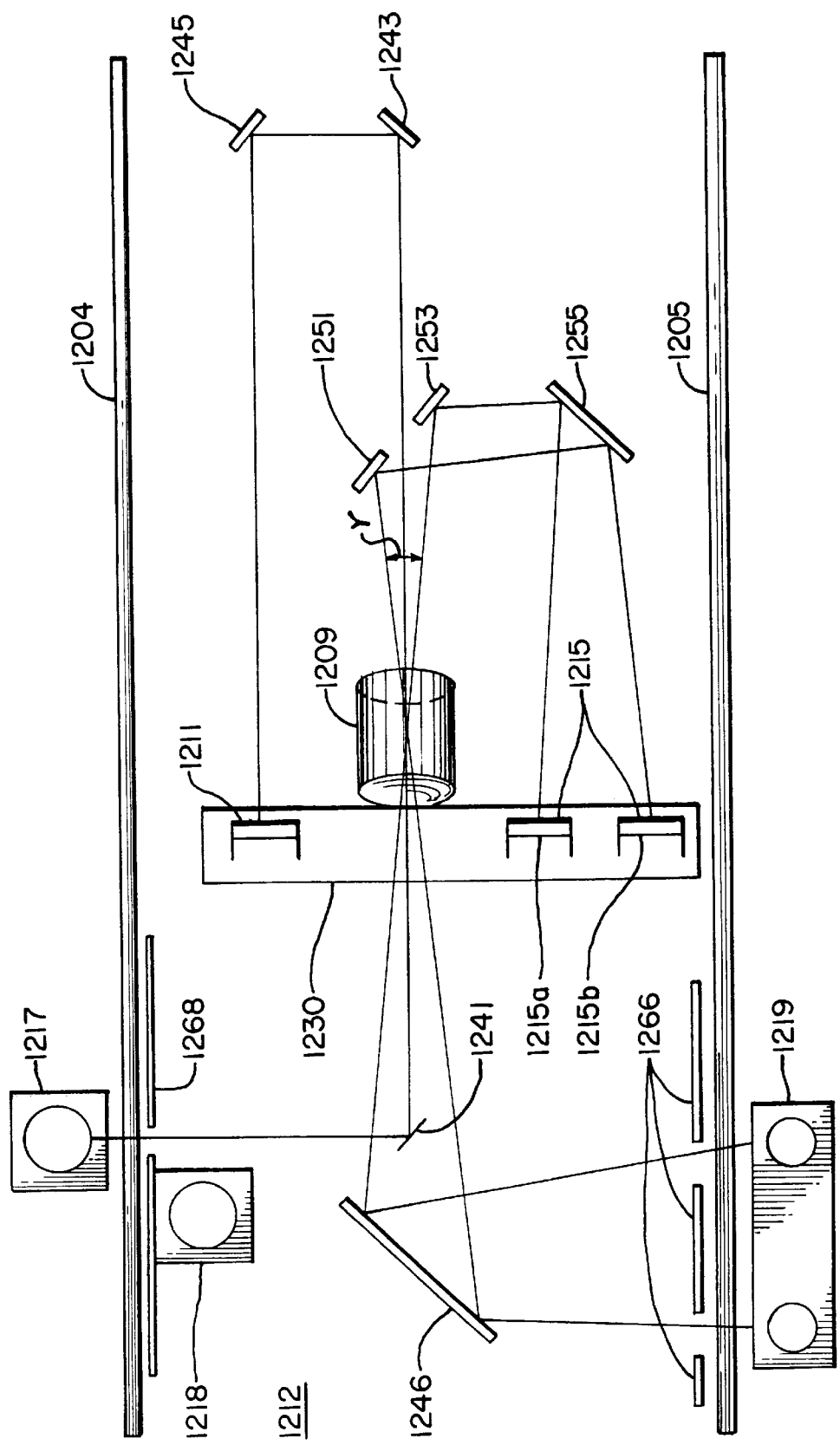
FIG. 12 is a representation of another alternative scanner utilizing a different folded optics variation and a single lens to reduce the overall dimensions of the invention.

In another embodiment of scanner 1212 shown diagrammatically in FIG. 12, the physical dimensions of scanner 1212 are reduced by coupling the optical system scanning reseau 1205 and the optical system scanning object image 1204. In addition, mirrors 1241, 1243, 1245, 1251, 1253, and 1255 are used to alter the optical paths of the light rays detected by object image photoreceptor array 1211 and reseau photoreceptor array 1215 such that the dimensions of scanner 1212 are reduced. In this embodiment, only a single lens 1209 is used. it is possible, however, to include other lenses (not shown) to increase the angle γ, as previously discussed and as shown in FIG. 11B.

Object image backlight 1217 illuminates the object image 1204, while reseau backlight 1219 illuminates the reseau 1205. Alternatively, object image 1204 can be illuminated by object image frontlight 1218.

The frame and the supporting structure for the lens 1209, mirrors 1241, 1243, 1245, 1251, 1253, and 1255, and photoreceptor arrays 1215 and 1211 are not shown in the diagrammatic view of FIG. 12, but they can be constructed by persons skilled in this art, once the principles of this invention are understood from the description above. The methods and materials for constructing a frame and optical supporting structure for this embodiment of scanner 1212 are well known in the art. In FIG. 12, the object image 1204 and reseau 1205 are fixed in a rigid position by such a frame.

Likewise, lens 1209, mirrors 1241, 1243, 1245, 1251, 1253, and 1255, and photoreceptor arrays 1211 and 1215 are rigidly fixed within the frame. Photoreceptor arrays 1211 and 1215 are held in a fixed and immovable position by assembly-block 1230.

Mirror 1246 is positioned such that light rays emanating from reseau backlight 1219 and passing through reseau 1205 reflect off of mirror 1246 in such a direction that they pass through lens 1209, reflect off of mirrors 1251 or 1253, and then reflect off of mirror 1255. The light rays reflecting off of mirrors 1251 or 1253, and then 1255 are then detected by photoreceptor array 1215. Light rays that strike mirrors 1246, 1251, 1253, or 1255 which do not emanate from reseau backlight 1219 are not reflected through lens 1209 and they are not detected by photoreceptor array 1215.

Mirrors 1241, 1243, and 1245 are positioned such that light rays emanating from object image backlight 1217, or object image frontlight 1218, and passing through object image 1204 reflect off of mirror 1241 in such a direction that they pass through lens 1209, reflect sequentially off of mirrors 1243 and 1245, and then are detected by photoreceptor array 1211. Light rays that strike mirrors 1241, 1243, or 1245 which do not emanate from object image backlight 1217 or object image frontlight 1218 are not reflected through lens 1209 and they are not detected by photoreceptor array 1211. Using the two photoreceptor segments 1215a and 1215b to comprise photoreceptor array 1215 and the associated mirrors 1251, 1253, and 1255 provides for the detection of scanner 1112 rotation as described above in relation to FIGS. 7B, 10A, 10B, and 10C.

Diaphragm 1266 completely blocks some of the light rays emanating from reseau backlight 1219 that passes through reseau 1205. More specifically, some of the light rays that emanate from backlight 1219 and pass through reseau 1205 could, upon reflecting off of mirror 1246 and passing through lens 1209, be further reflected off of mirrors 1243 and 1245 and detected by photoreceptor array 1211 instead of being reflected off of mirrors 1251 or 1253, then mirror 1255 and then detected by photoreceptor array 1215. Diaphragm 1266 blocks those light rays that emanate from reseau backlight 1219 that would otherwise strike mirrors 1246, 1243, and 1245 and be detected by photoreceptor array 1211, if they were allowed to propagate. Therefore, all of the light rays emanating from reseau backlight 1219 and passing through reseau 1205 and diaphragm 1266 reflect off of mirror 1246, pass through lens 1209, reflect off of mirrors 1251 or 1253, reflect off of mirror 1255, and are detected by photoreceptor array 1215. Diaphragm 1166 also ensures that extraneous or spurious light rays that might otherwise strike mirrors 1243, 1245, 1251, 1253, or 1255, or pass through lens 1209 are not allowed to propagate into scanner 1212.

In a similar manner to diaphragm 1266, diaphragm 1268 completely blocks some of the light rays that emanate from object image backlight 1217 and pass through object image 1204. This diaphragm 1268 ensures that only light rays that emanate from object image backlight 1217 and pass through object image 1204 that will strike mirror 1241 are allowed to propagate into scanner 1212 and that extraneous or spurious light rays that might otherwise strike mirrors 1243, 1245, 1251, 1253, or 1255 or pass through lens 1209 are not allowed to propagate into scanner 1212.

Like the photoreceptor arrays 211 and 215 discussed above, each photoreceptor element 212 in the photoreceptor array 1211 and the photoreceptor array 1215 generates an electric signal in proportion to the amount of light detected by the photoreceptor element 212. The signals generated are analyzed and processed in a similar manner as that discussed above.

The previous discussion has described the use of a reseau 105 that is scanned either simultaneously with the object image 104 to detect both the repeatable and the random errors in the position and attitude of the scan head 101, or sequentially before the object image 104 is scanned to assess the repeatable error in the position and attitude of the scan head 101. If only the repeatable errors are detected, a residual error may be left undetected which might distort the final digital image. The following procedure is preferably used to detect any residual error and remove it from the final digital image. The procedure is typically implemented in a "post-processing" step, using previously collected pixels which are kept in a buffer memory, processed, and only then transferred as a final output to the user's host computer.

Figure 18:
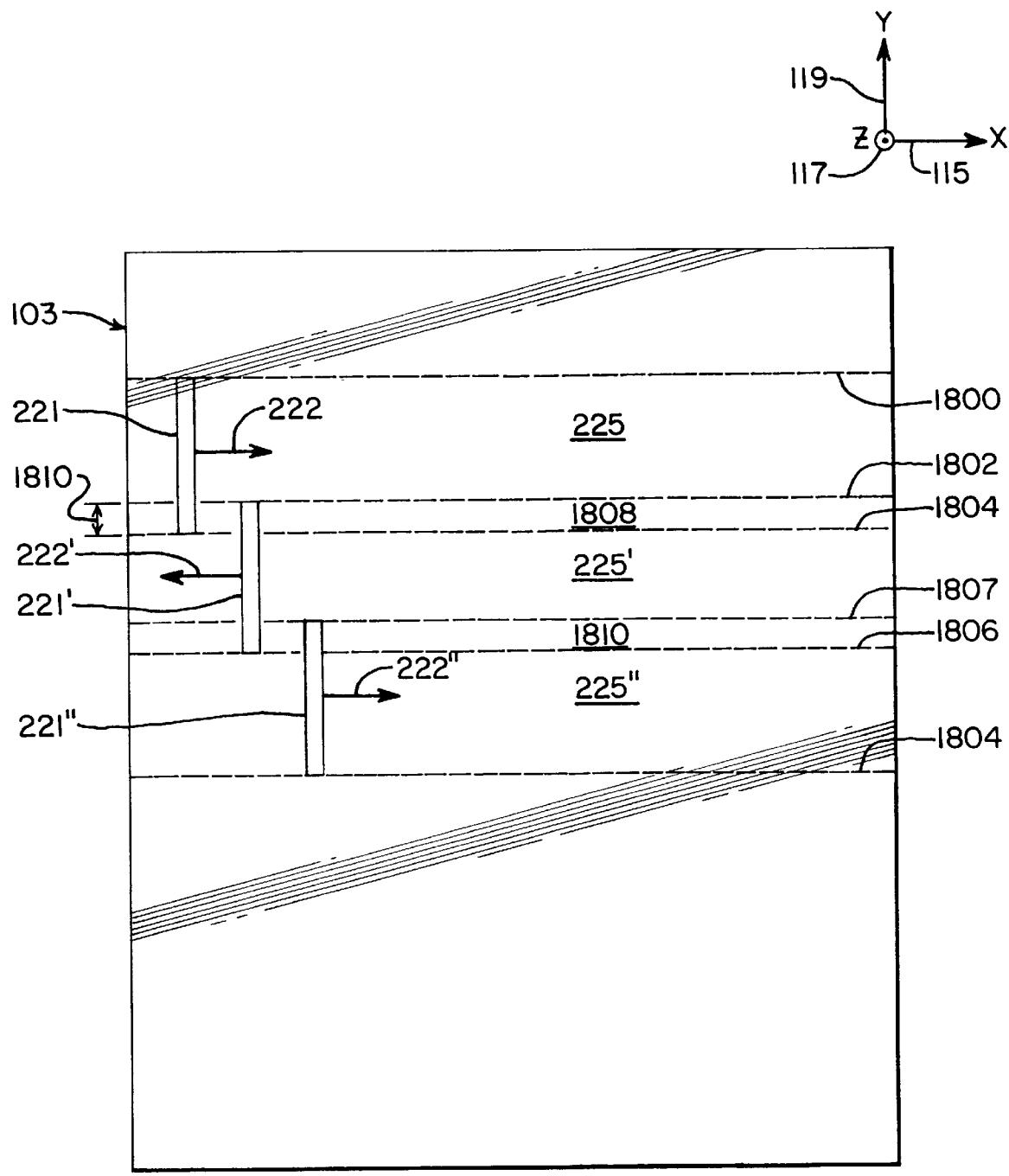
FIG. 18 is a representation of the relationship between adjacent and overlapping swaths on the object image created by the photoreceptor array and scan head scanning the object.
Figure 19:
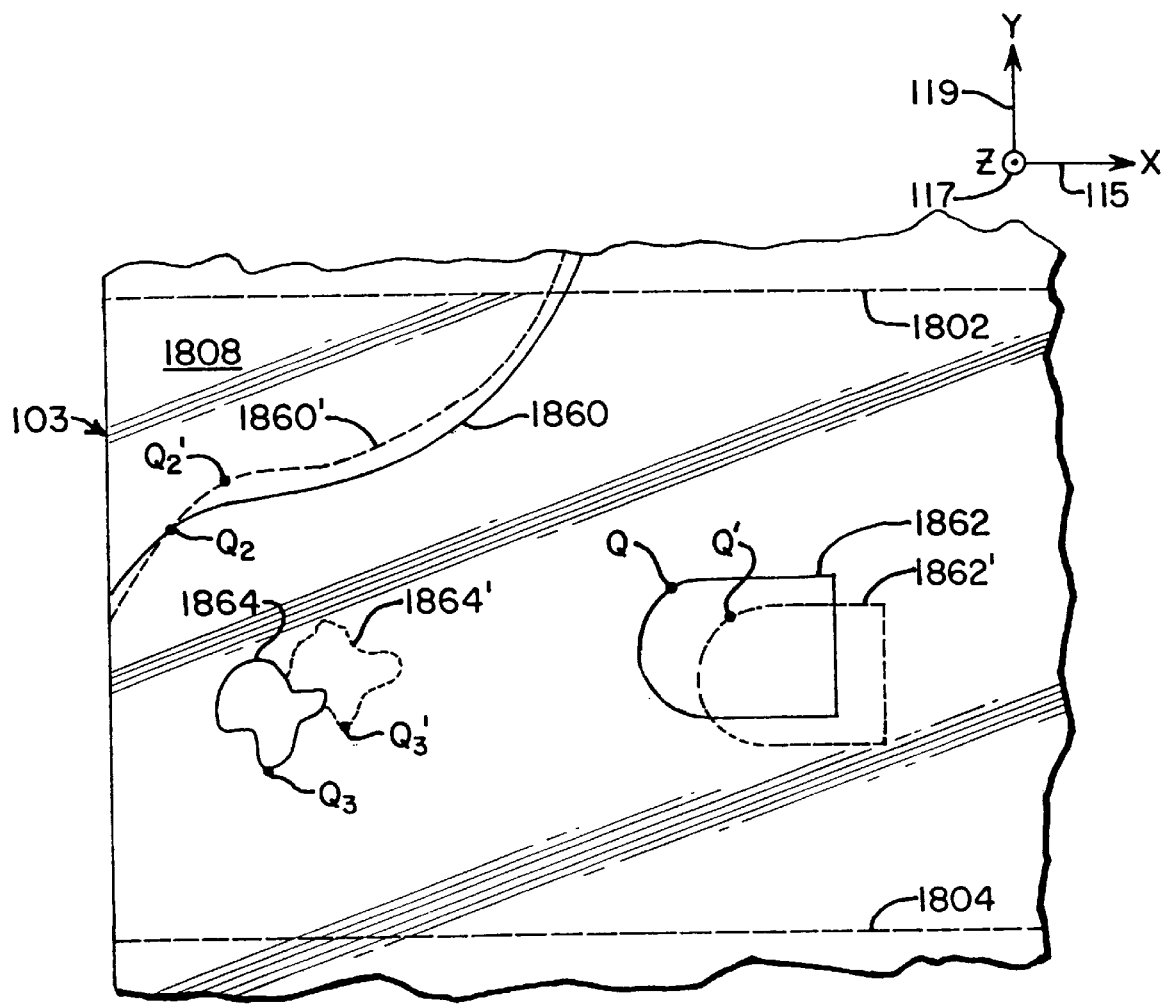
FIG. 19 is a representation of common features in two overlapping swaths creating by scanning the object image.

More specifically, in all of the embodiments previously discussed, it is possible for adjacent swaths 225, 225', 225" to overlap, as shown in FIG. 18, to create areas of overlap 1808, 1810. The sizes of the swaths 225, 225', 225" and the scan lines 221, 221', 221" are exaggerated in FIGS. 18–22 for purposes of illustration. Now referring to FIG. 18, during scanning of the object 103, the scan line 221 moves in the raster path 222 (see FIG. 2 also) defined by the dashed lines 1800, 1802 to create swath 225. Likewise, the adjacent scan line 221' moves in the raster path 222' defined by the dashed lines 1804, 1806 to create the swath 225', and the scan line 221" moves in the raster path 222" defined by the dashed lines 1807, 1809 to create the swath 225". An area of overlap 1808 is formed between the dashed lines 1802, 1804 that is scanned twice, first during movement of the scan head 101 in the raster path 222 to form the swath 225 and a second time during the movement of the scan head 101 in the raster path 222' to form the swath 225'. Similarly, an area of overlap 1810 is formed between the dashed lines 1807, 1809 that is scanned twice, first during movement of the scan head 101 in the raster path 222' to form the swath 225' and a second time during the movement of the scan head 101 in the raster path 222" to form the swath 225".

When the areas of overlap 1808, 1810 occur, redundant image information is created that can be used to align the image generated by the swath 225' with the image generated by the previous swath 225. Likewise, redundant image information is created that can be used to align the image generated by the swath 225" with the image generated by the previous swath 225', and so for all of the swaths created by movement of the scan head 101. The redundant image information, however, could create visible errors in the final output image if errors are not removed.

The optional alignment process is especially useful in obtaining seamless images when the object image 104 has been scanned without a simultaneous scanning of the reseau 105. When the object 104 and the reseau 105 are scanned simultaneously, as described above, the alignment process may not be required due to the accuracy of the determination of the repeatable and the random errors, and the redundant image information may simply be discarded as the final image is being created.

The alignment process consists of three major steps, as will be discussed in more detail below. The first step is, in general, an image matching process performed on the swaths 225, 225' which will find points Q, Q' (see FIG. 19) in the area of overlap 1808 corresponding to distinct features (for example 1860, 1862, 1864) of the scanned object image 104 in the swath 225 that are identical or approximately identical to distinct features (for example 1860', 1862', 1864') of the object image 104 in the swath 225'. That is, the image matching process determines points Q, Q' for features of the object image 104 that are identical or nearly identical for the swath 225 and the swath 225'. The points Q, Q' are used to align the image generated by the scan line 221' with the image generated by the scan line 221. The redundant pixels from the swath 225' for the area of overlap 1808 are then eliminated from the final output image.

The procedure used to detect corresponding pairs of image features Q, Q' is called "image matching", "image registration", or "image correlation" and is a process amply documented in the literature on image processing, image warping, computer vision, or image pattern recognition. As image matching is well known to persons having ordinary skill in the art, a complete discussion is not necessary for purposes of present invention.

The scanning process is set up in such a way that the area of overlap 1808 occurs and that the area of overlap 1808 is preferably several hundred pixels wide. The image generated by the swath 225' can be aligned with the image generated by the swath 225. For this purpose, the errors detected by the redundant image information and by the image matching process leading to the pairs of points Q, Q' can be reduced and possibly eliminated by the following process.

As previously discussed, a plurality of points Q (see FIG. 19) in the area of overlap 1808 created by the swath 225 are found that are image matched to a plurality of points Q' in the area of overlap 1808 created by the swath 225'. Each point Q will therefore have an associated point Q', and vice versa. That is, the point $Q_1$ is associated with the point $Q_1'$, the point $Q_2$ is associated with the point $Q_2'$, etc. The number of pairs of points Q, Q', and, therefore, their density in the area of overlap 1808, will depend on the desired accuracy, the type of image being scanned, and the required speed or throughput of the scanning process.

The first step results in a table of match points that contains the differences in the gray values for the image matched points and the differences in the X and Y coordinates for each location of a point Q'. For example, the difference in the gray values for the points $Q_1$ and $Q_1'$ as well as the differences between the X,Y coordinates for the points $Q_1$ and $Q_1'$ are stored in the table. Therefore, the table contains $\Delta X$, $\Delta Y$, and $\Delta$gray values for each point Q'. For $Q_1'$, the $\Delta X_1$ value is equal to $X_{Q1} - X_{Q1'}$, the $\Delta Y_1$ value is equal to $Y_{Q1} - Y_{Q1'}$, and the $\Delta$gray value is equal to gray value$_{Q1}$–gray value$_{Q1'}$. It should be noted that for purposes of illustration and explanation, the positional errors between the points Q and Q' are exaggerated in FIG. 19. The actual positional errors between the points Q and Q' are, in reality, extremely small, namely only in the range of the residual effects of random, non-repeatable errors of the scan head's 101 position and attitude. The table is created for the entire area of overlap 1808 and will grow with each new scan line for the swath 225'.

Figure 20:
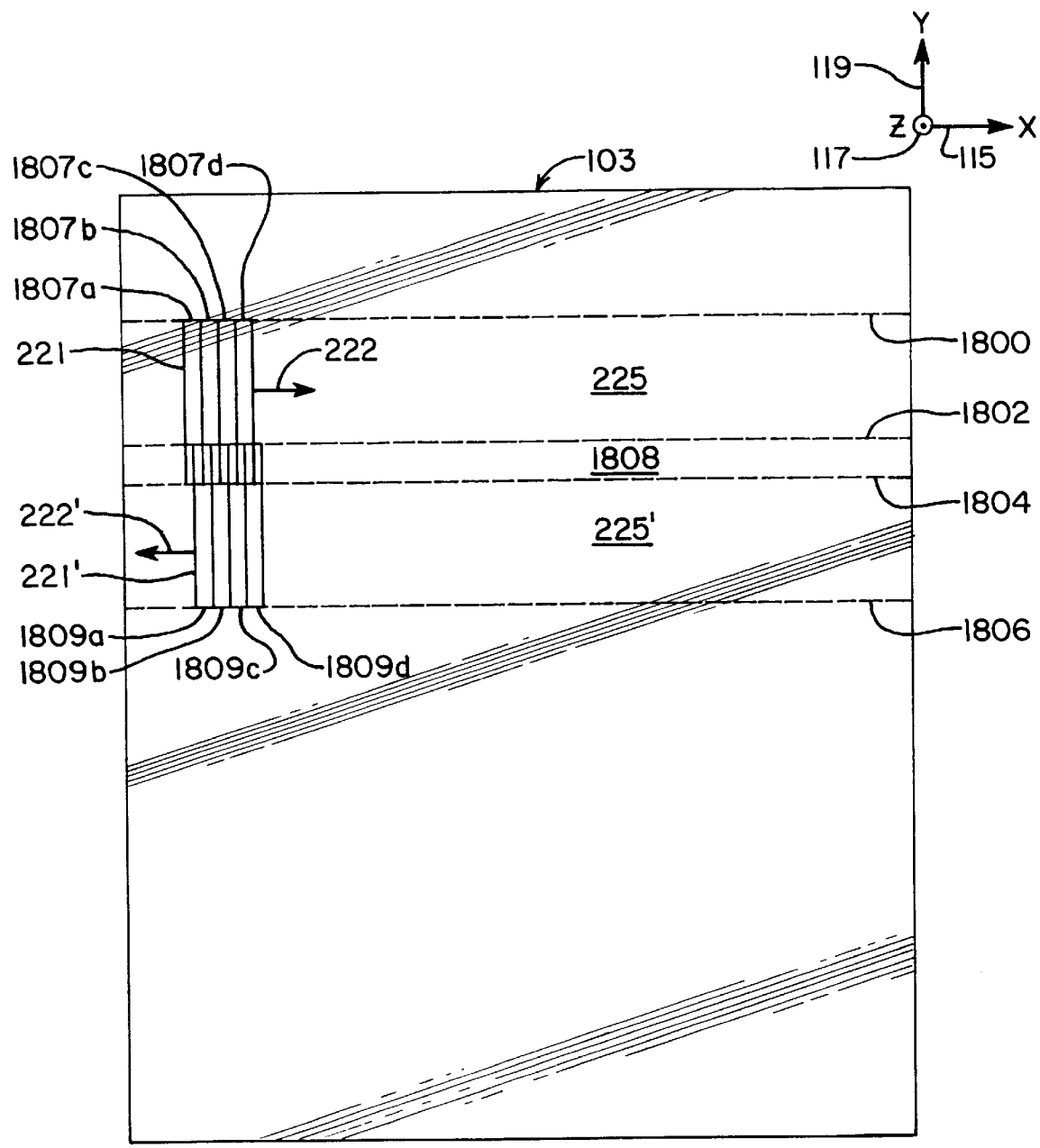
FIG. 20 is a representation of overlapping scan lines between adjacent and overlapping swaths on the object image created by the photoreceptor array.

As previously discussed, the movement of the scan head 101 and the imaging of the pixels of the object image 104 in the raster path 222 by the photoreceptor array 211 (see FIG. 20) creates the swath 225 with a series of adjacent scan lines 1807a, 1807b, 1807c, 1807d, etc. Likewise, the movement of the scan head 101 and the imaging of the pixels of the object image 104 in the raster path 222' by the photoreceptor array 211 (see FIG. 20) creates the swath 225' with a series of scan lines 1809a, 1809b, 1809c, 1809d, etc. The scan lines 1807a–1807d overlap the scan lines 1809–1809d, etc., imperfectly due to residual errors of the scan head's 101 position and attitude, as shown in FIG. 20.

The table of $\Delta X$, $\Delta Y$, and $\Delta$gray values will now be used to accomplish the alignment of the scan lines and the swaths 225, 225' by applying a transformation of each scan line in the swath 225'. For example, the scan line 1809a in the swath 225' is aligned to the scan line 1807a in the swath 225, the scan line 1809b in the swath 225' is aligned to the scan line 1807b in the swath 225', etc. Since the alignment process is identical for each scan line in the swath 225', only the alignment of the scan line 1809a will be discussed in further detail.

Referring again to FIG. of the pairs of points Q,Q' in the area of overlap 1808 are used to align the scan line 1809a within the example of aligning the scan line 1809a with the scan line 1807a, the pair of points $Q_0$, $Q_0'$ are used. Point $Q_0'$ is chosen for use for the alignment of the scan line 1809a with the scan line 1807a since the point $Q_0'$ falls on the scan line 1809a (see FIG. 21). Normally, however, the overlap of scan lines in the area of overlap 1808 will not contain any image matched points Q,Q' for the particular scan line being aligned. In which case, an interpolation process must be used to interpolate the $\Delta X$, $\Delta Y$, $\Delta$gray values from the surrounding image matched points $Q_i$, $Q_i'$ where i=1, 2, etc. For example, if point $Q_0'$ did not exist, the $\Delta X$, $\Delta Y$, $\Delta$gray values would be computed using the surrounding values for $Q_4'$, $Q_5'$, $Q_6'$, $Q_7'$, $Q_8'$ and any other surrounding points Q' contained in the table of matched points. Interpolation procedures are well-established and well-known mathematical tools, and a great number of such procedures are being used in many different applications. The present invention, which seeks to compute values for $\Delta X$, $\Delta Y$, $\Delta$gray at a location $Q_0'$ on the scan line 1809a using known values for $\Delta X$, $\Delta Y$, $\Delta$gray at other locations $Q_4'$ to $Q_8'$ is a common example of interpolation. Great care must be taken, however, in cases where "interpolation" becomes "extrapolation" when, for example, there are no entries in the table of matched points for on side of the scan line 1809a. This can occur when, for example, the image is empty and no features can be found for image matching. Fortunately, in such a case where no features can be found for image matching, the discrepancies between the swaths 225, 225' become invisible, i.e., for the final digital image to show a visible defect, there must be a recognizable feature in the area of overlap 1808 between the swath 225 and the swath 225'.

Figure 21:
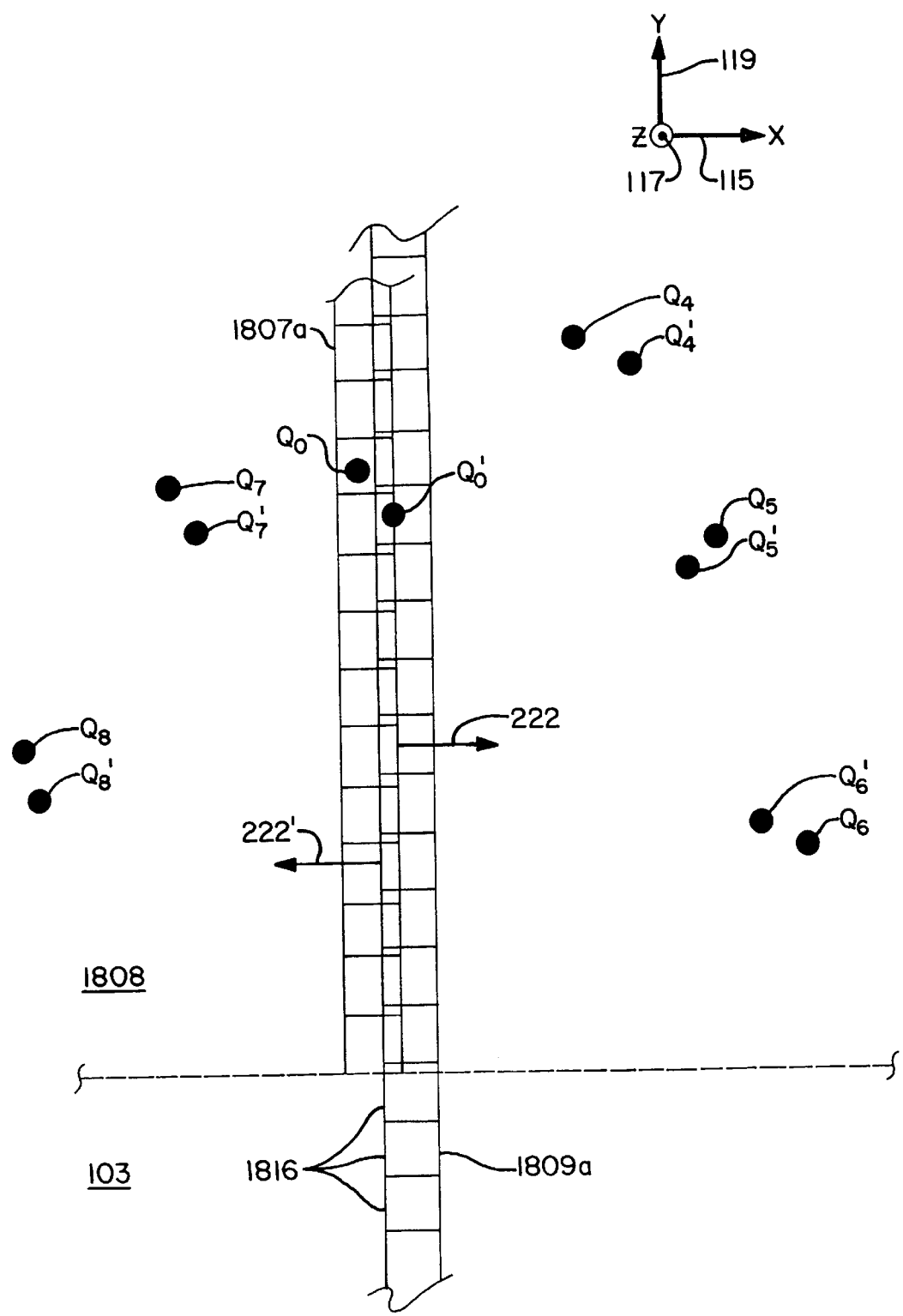
FIG. 21 is a representation of match points in the vicinity of a particular scan line for swaths on the object image created by the photoreceptor array scanning the object.
Figure 22:
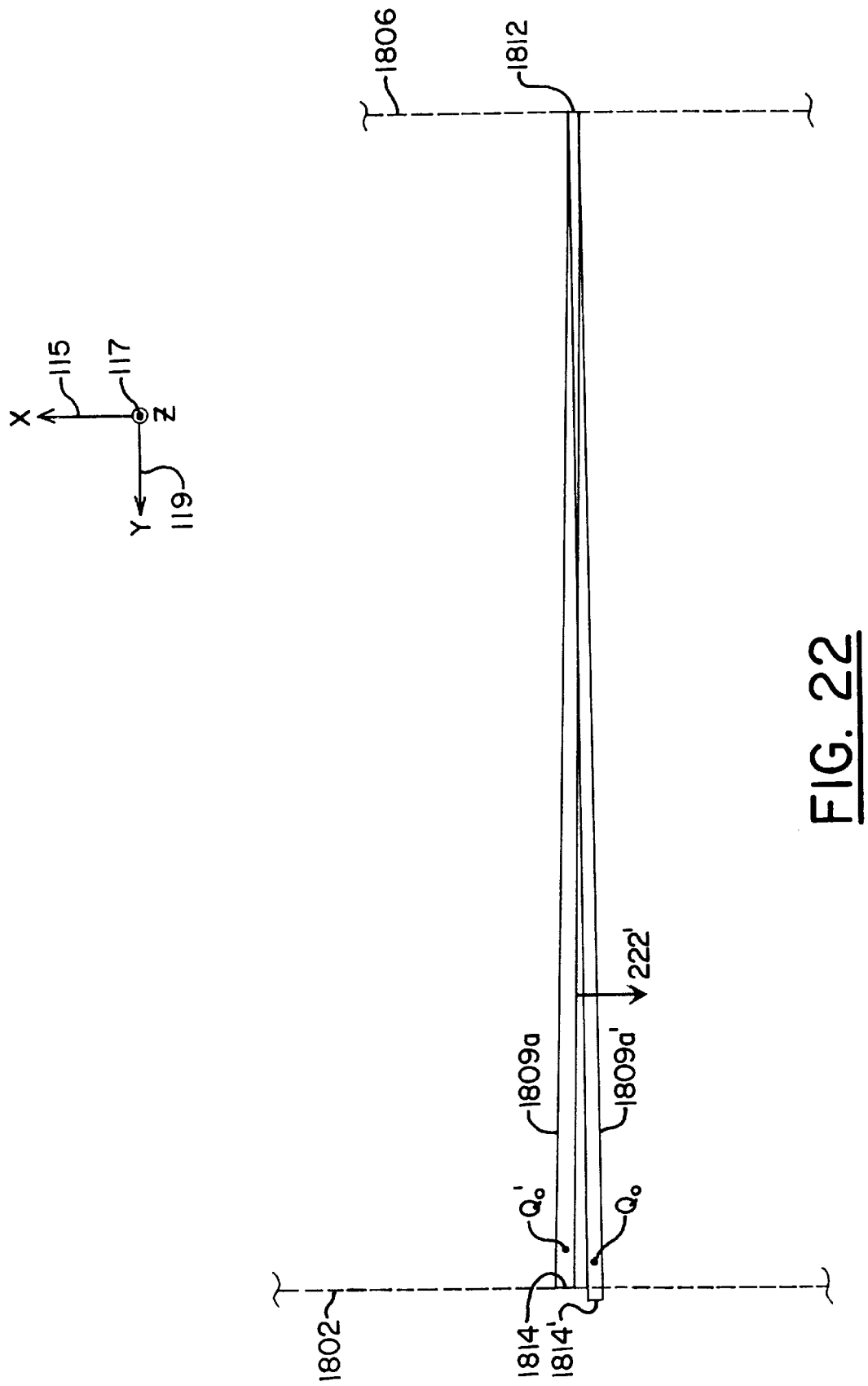
FIG. 22 is a representation of the alignment process of scan lines from adjacent swaths of the object image.

As a result of this step of the alignment procedure, the $\Delta X$, $\Delta Y$, $\Delta$gray values for the point $Q_0'$, either determined directly from the table of matched points or by interpolation, are used to align the scan line 1809a with the scan line 1807a and are used to project the pixels 1816 in the scan line 1809a onto the scan line 1809a' (see FIG. 21). More specifically, the alignment is accomplished by holding the end 1812 of the scan line 1809a fixed and projecting the pixel on the scan line 1809a containing the point $Q_0'$ such that the X,Y coordinates for the pixel on the scan line 1809a containing the point $Q_0'$ are adjusted by $\Delta X$, $\Delta Y$ so that $Q_0'$ aligns with $Q_0$. In addition, the gray value for the pixel containing the point $Q_0'$ is adjusted by the $\Delta$gray value so that the points $Q_0$, $Q_0'$ have identical gray values.

This alignment of an individual scan line 1809a is being accomplished by a "forward sampling" process which is similar to the forward sampling process previously described in the FIGS. 15a and 15B and the associated text. For each of the pixels of the scan line 1809a, that is, for each pixel from the end 1812 (which is not changed) to the end 1814 (which is changed the most), the X, Y, gray value changes are known since they are linearly interpolated and derived from $\Delta X=0$, $\Delta Y=0$, $\Delta$gray=0 at the end 1812 and the $\Delta X$, $\Delta Y$, $\Delta$gray values for the point $Q_0'$ on the scan line 1809a. In this manner, the scan line 1809a is used to create gray values in the output image pixel array from the dashed line 1804 to the dashed line 1806 in the swath 225'.

After the projection (forward sampling) process is complete, the output scan line 1809a' of the final digitized copy of the object image 104 may be longer (as shown in FIG. 21) or shorter than the input scan line 1809a. All pixels belonging to the scan line 1809a' that do fall within the area of the object image 104 defined by the lines 1804, 1806 are deleted by the image transform computer 346. The output image has now been filled in with output pixels up to and including scan line 1809a'. The process is now repeated for each scan line in the swath 225' until the swath 225' is completed. After the swath 225' is completed, the scan head 101 is displaced laterally to begin a new swath 225" extending from the dashed line 1807 to the dashed line 1809 (see FIG. 18). The same procedure discussed above, i.e., image matching, error interpolation, and forward sampling, can be repeated to align the scan lines in the swath 225" with the scan lines in the swath 225' using the area of overlap 1810.

With the image matching element of the scanning process, it is now possible to operate the scanning apparatus 100 in various different modes. In the first mode, the reseau 105 is scanned simultaneously with the object image 104 and positional and attitude errors in the scan head 101 are corrected on the fly and image matching is not used. In the second mode, the reseau 105 is scanned simultaneously with the object image 104 and positional and attitude errors in the scan head 101 are corrected on the fly and image matching is used as an extra safeguard and quality assurance feature to further increase the accuracy of the scanning apparatus 100. In the third mode, the reseau 105 is not being scanned simultaneously with the object image 104. Instead, the reseau 105 is being employed only occasionally for calibration purposes to detect and compute the repeatable errors in the scan head's 101 position and attitude. Image matching is not being used. The reseau 105 is employed in the plane of the object image 104, thus reducing the cost and complexity of the scanning apparatus 100 by eliminating additional photoreceptors, lenses, illumination elements, processing circuitry, etc. In the fourth mode, which is substantially identical to the third mode, image matching is used to increase the accuracy of the scanning apparatus 100 and improve the quality assurance.

Other modes of operation become feasible by saving computer processing time if the processes applied to pixels and processes addressing coordinates are intelligently separated. For example, the forward sampling of a scan line to remove the effects of repeatable error of the scan head 101 and forward sampling to remove errors found by image matching can be combined into a single forward sampling process.

While the invention has been particularly shown and described with reference to a preferred embodiment thereof, it will be understood by those skilled in this art that various changes and modifications in form and details may be made therein without departing from the spirit and scope of the invention according to the following claims.

The embodiments of the invention in which an exclusive property or privilege is claimed are defined as follows:

1. A photogrammetric apparatus comprising:
   a planar object to be scanned for digital storage;
   a reseau to be imaged simultaneously with the planar object;
   light source means for producing light and simultaneously illuminating said planar object and said reseau with said light;
   reseau photoreceptor means for converting an image of the reseau focussed thereon to reseau electrical signals;
   planar object photoreceptor means distinct from said reseau photoreceptor means for converting an image of the planar object focussed thereon to object electrical signals;

optic means for focussing said light produced by said light source means when said light source means is simultaneously illuminating the reseau and the planar object to form images of the reseau onto the reseau photoreceptor means and images of the planar object onto the planar object photoreceptor means;

first support means for maintaining the planar object and reseau in fixed parallel relationship; and second support means for maintaining the reseau photoreceptor means, the planar object photoreceptor means, and the optic means in fixed relationship whereby an aspect of the reseau is out of focus with respect to the planar object photoreceptor means but in focus with respect to the reseau photoreceptor means, and an aspect of the planar object is out of focus with respect to the reseau photoreceptor means but in focus with respect to the planar object photoreceptor means, when said light source means is simultaneously illuminating the reseau and the object image.

2. The apparatus as claimed in claim 1 wherein the reseau photoreceptor means includes two arrays of photosensitive elements positioned parallel to each other.

3. The apparatus as claimed in claim 1 wherein the reseau photoreceptor means and the planar object photoreceptor means include a linear array of photosensitive elements for converting a single swath of the reseau and planar object, respectively, focussed thereon to electrical signals representing a one-dimensional swath of pixels.

4. The apparatus as claimed in claim 3 including:

transport means attached to the first support means for moving the first support means with respect to the second support means to enable scanning areas with the linear array of photosensitive elements.

5. The apparatus as claimed in claim 3 including;

transport means attached to the second support means for moving the second support means with respect to the first support means to enable scanning areas with the linear array of photosensitive elements.

6. The apparatus claimed in claim 4 including:

memory means for bit mapping pixel signals represented by object electrical signals;

means coupled to the transport means for supplying signals representing the displacement between the first and second support means; and storing means responsive the reseau electrical signals and the object electrical signals for storing object electrical signals in the memory means at locations corresponding to the location of the optic means.

7. The apparatus as claimed in claim 6 wherein the storing means includes:

correction means responsive to the reseau electrical signals and the signals representing the displacement between the first and second support means for supplying a corrected location in the memory means at which to store object electrical signals.

8. The apparatus as claimed in claim 7 wherein the correction means includes:

means for determining from received reseau electrical signals the position of the optic means with respect to the reseau; and means for ascertaining the difference between the position determined from the reseau electrical signals and a position determined from the signals representing the displacement between the first and second support means.

9. A method for scanning an object image and a reseau so as to prevent reseau images from appearing on the scanned object image comprising the steps of:

positioning a reseau in a scanning plane;

scanning the reseau;

storing positional errors detected by scanning the reseau;

replacing the reseau with an object image to be scanned and positioning the object image in said scanning plane;

scanning the object image; and correcting the scan signals from the object image using the stored positional error signals.

10. The method of claim 9 including second and third steps comprising:

accessing positional signals representative of the location of a scanner device; and determining errors between the represented location of the scanner device and the position according to the scanned reseau.

11. The method of claim 10 including storing the object image signals at locations in a memory corresponding to corrected location values.

12. A method of scanning and storing pixel signals representative of a planar object using a scanning device, comprising the steps of:

illuminating a reseau located in a first scanning plane with a first light ray and illuminating a planar object located in a second scanning plane with a second light ray, wherein said first light ray does not pass through and is not reflected by said planar object, and said second light ray does not pass through and is not reflected by said reseau;

scanning said reseau to produce electrical signals representing pixels of said reseau;

scanning said planar object to produce electrical signals representing pixels of said planar object;

deriving error values representing differences between coordinates of the location of the scanning device relative to said first scanning plane and coordinates of the scanning device relative to said planar object;

adjusting said electrical signals representing pixels of the planar object with said error values; and storing pixel signals representing said adjusted electrical signals representing pixels of the planar object in a memory.

13. The method of claim 12, wherein said step of scanning a planar object includes scanning said planar object in overlapping swaths and said step of adjusting said electrical signals representing pixels of the planar object with said error values includes image matching two of said overlapping swaths.

14. The method of claim 12, including the step of storing said error values in a second memory.

15. The method of claim 13, wherein said image matching includes identification of features in said two overlapping swaths that are approximately identical.

16. The method of claim 15, wherein redundant pixel signals are eliminated before said pixel signals are stored in said memory.

17. The method of claim 12, including the steps of determining repeatable position and attitude errors of the scanning device and storing said position and attitude errors in a second memory.

18. The method of claim 12, wherein said step of scanning said reseau occurs simultaneously with said step of scanning said planar object.

19. A method of scanning and storing pixel signals representative of an object image using a scanning device, comprising the steps of:

illuminating a reseau located in a first scanning plane with a first light ray and illuminating an object image in a second scanning plane with a second light ray, wherein said first light ray does not pass through and is not reflected by said object image, and said second light ray does not pass through and is not reflected by said reseau;

scanning said object image to produce electrical signals representing said object image;

scanning said reseau to produce electrical signals representing said reseau;

supplying position signals representing coordinates of the scanning device relative to said first scanning plane;

adjusting said electrical signals representing the object image with said position signals; and storing pixel signals representing said adjusted electrical signals representing the object image in a memory.

20. The method of claim 19, including the steps of determining repeatable position and attitude errors of the scanning device.

21. The method of claim 20, wherein said step of adjusting said electrical signal representing the object image with said position signals includes forward sampling to remove effects created by said repeatable position and attitude error.

22. The method of claim 21, including said step of scanning said reseau occurs simultaneously with said step of scanning said object image.

23. The method of claim 22, including the steps of determining random position and attitude errors of the scanning device.

24. The method of claim 23, wherein said step of scanning a object image in a second scanning plane includes scanning said object image in overlapping swaths.

25. The method of claim 24, wherein said step of adjusting said electrical signals representing the object image with said position signals includes image matching two of said overlapping swaths.

26. The method of claim 25, wherein said image matching includes identification of features said two overlapping swaths that are approximately identical.

27. The method of claim 26, wherein redundant pixel signals are eliminated before said pixel signals are stored in said memory.

28. The method of claim 25, wherein said image matching and said forward sampling occur approximately simultaneously.

29. The method of claim 20, including the step of storing said repeatable position and attitude errors of the scanning device in a second memory.

30. The method of claim 23, including the step of storing said random position and attitude errors of the scanning device in a third memory.

31. A photogrammetric apparatus comprising:

a planar object to be scanned for digital storage;

a reseau to be imaged simultaneously with the planar object;

reseau photoreceptor means for converting an image of a single swath of the reseau focussed thereon to reseau electrical signals representing a one-dimensional swath of pixels, wherein said reseau photoreceptor means includes a linear array of photosensitive elements;

planar object photoreceptor means for converting an image of a single swath of the planar object focussed thereon to object electrical signals representing a one-dimensional swath of pixels, wherein said planar object photoreceptor means includes a linear array of photosensitive elements;

optic means for focussing images of the reseau onto the reseau photoreceptor means and images of the planar object onto the planar object photoreceptor means;

first support means for maintaining the planar object and reseau in fixed parallel relationship;

second support means for maintaining the reseau photoreceptor means, the planar object photoreceptor means, and the optic means in fixed relationship whereby an aspect of the reseau is out of focus with respect to the planar object photoreceptor means and an aspect of the planar object is out of focus with respect to the reseau photoreceptor means;

transport means attached to the first support means for moving the first support means with respect to the second support means to enable scanning areas with the linear array of photosensitive elements;

memory means for bit mapping pixel signals represented by said object electrical signals;

means coupled to the transport means for supplying signals representing the displacement between the first and second support means;

storing means responsive the reseau electrical signals and the object electrical signals for storing object electrical signals in the memory means at locations corresponding to the location of the optic means; and correction means responsive to the reseau electrical signals and the signals representing the displacement between the first and second support means for supplying a corrected location in the memory means at which to store object electrical signals.

32. The apparatus as claimed in claim 31 wherein said correction means includes:

means for determining from received reseau electrical signals the position of the optic means with respect to the reseau; and means for ascertaining the difference between the position determined from the reseau electrical signals and a position determined from the signals representing the displacement between the first and second support means.

* * * * *